United States Patent [19]

Okamura et al.

[11] Patent Number: 5,572,343

[45] Date of Patent: Nov. 5, 1996

[54] VISUAL DISPLAY HAVING SEE-THROUGH FUNCTION AND STACKED LIQUID CRYSTAL SHUTTERS OF OPPOSITE VIEWING ANGLE DIRECTIONS

[75] Inventors: Toshiro Okamura; Seiichiro Tabata; Naoto Shimada; Keiichi Kuba; Masato Yasugaki; Yoichi Iba; Akiyoshi Tochigi, all of Tokyo, Japan

[73] Assignee: Olympus Optical Co., Ltd., Tokyo, Japan

[21] Appl. No.: 67,130

[22] Filed: May 26, 1993

[30] Foreign Application Priority Data

| May 26, 1992 | [JP] | Japan | 4-133854 |
| Oct. 6, 1992 | [JP] | Japan | 4-267505 |
| Dec. 25, 1992 | [JP] | Japan | 4-346087 |
| Dec. 25, 1992 | [JP] | Japan | 4-346089 |
| Mar. 10, 1993 | [JP] | Japan | 5-010163 U |
| Mar. 26, 1993 | [JP] | Japan | 5-014401 U |

[51] Int. Cl.$^6$ .......................... G02B 27/02; G02F 1/1347
[52] U.S. Cl. .................. 359/53; 359/40; 359/63; 359/78; 359/631; 345/8
[58] Field of Search .................. 359/53, 36, 63, 359/39, 75, 40, 78, 41, 103, 630, 631; 351/158; 345/7, 8, 9

[56] References Cited

U.S. PATENT DOCUMENTS

| 4,039,254 | 8/1977 | Harsch | 359/53 |
| 4,231,639 | 11/1980 | Banda | 359/53 |
| 4,257,691 | 3/1981 | Brooks | 351/158 |
| 4,376,567 | 3/1983 | Banda | 359/53 |
| 4,443,065 | 4/1984 | Funada et al. | 359/53 |
| 4,927,240 | 5/1990 | Stolov | 359/53 |
| 5,153,569 | 10/1992 | Kawamura et al. | 345/8 |
| 5,264,952 | 11/1993 | Fukutani et al. | 359/53 |
| 5,281,957 | 1/1994 | Schoolman | 359/466 |
| 5,307,188 | 4/1994 | Dingwall et al. | 359/53 |
| 5,384,654 | 1/1995 | Iba | 359/630 |

FOREIGN PATENT DOCUMENTS

| 56-146119 | 11/1981 | Japan | 359/78 |
| 57-44123 | 3/1982 | Japan | 359/53 |
| 60-120391 | 6/1985 | Japan . | |
| 64-10223 | 1/1989 | Japan . | |
| 3189677 | 8/1991 | Japan . | |
| 3226198 | 10/1991 | Japan . | |
| 426289 | 1/1992 | Japan . | |
| 41717 | 1/1992 | Japan . | |
| 4296824 | 10/1992 | Japan . | |
| 4296825 | 10/1992 | Japan . | |
| 4296826 | 10/1992 | Japan . | |

OTHER PUBLICATIONS

M. Schadt "Nematic Liquid Crystal and Electro–Optical Effects: Display Applications" Chimia 41—No. 10—Oct. 1987.

T. Scheffer "New Multicolor Liquid Crystal Displays that use a twisted nematic Electro–Optical Cell" J. Appl. Phys. vol. 44—No. 11—Nov. 1973—pp. 4799–4803.

*Primary Examiner*—William L. Sikes
*Assistant Examiner*—Tai V. Duong
*Attorney, Agent, or Firm*—Cushman, Darby & Cushman

[57] ABSTRACT

A head-mounted see-through display which enables an outside image and an electronic image to be selectively observed by making a liquid crystal shutter transparent or opaque. To eliminate the problem that during the observation of the electronic image the outside image is undesirably seen through the peripheral region of the electronic image, display light from a two-dimensional display device (11) is first transmitted by a half-mirror (12), and the transmitted light is reflected by a concave mirror (13). Then, the reflected light is reflected by the half-mirror (12) so as to be led to the observer's eye as an enlarged image. To prevent the outside light from entering the eye through the half-mirror (12) during the observation of the electronic image, a negative or positive type TN or STN liquid crystal shutter (10) is disposed in front of the half-mirror (12). When the electronic image is to be viewed, the shutter (10) is made opaque, whereas, when the outside image is to be viewed, the shutter (10) is made transparent.

9 Claims, 40 Drawing Sheets

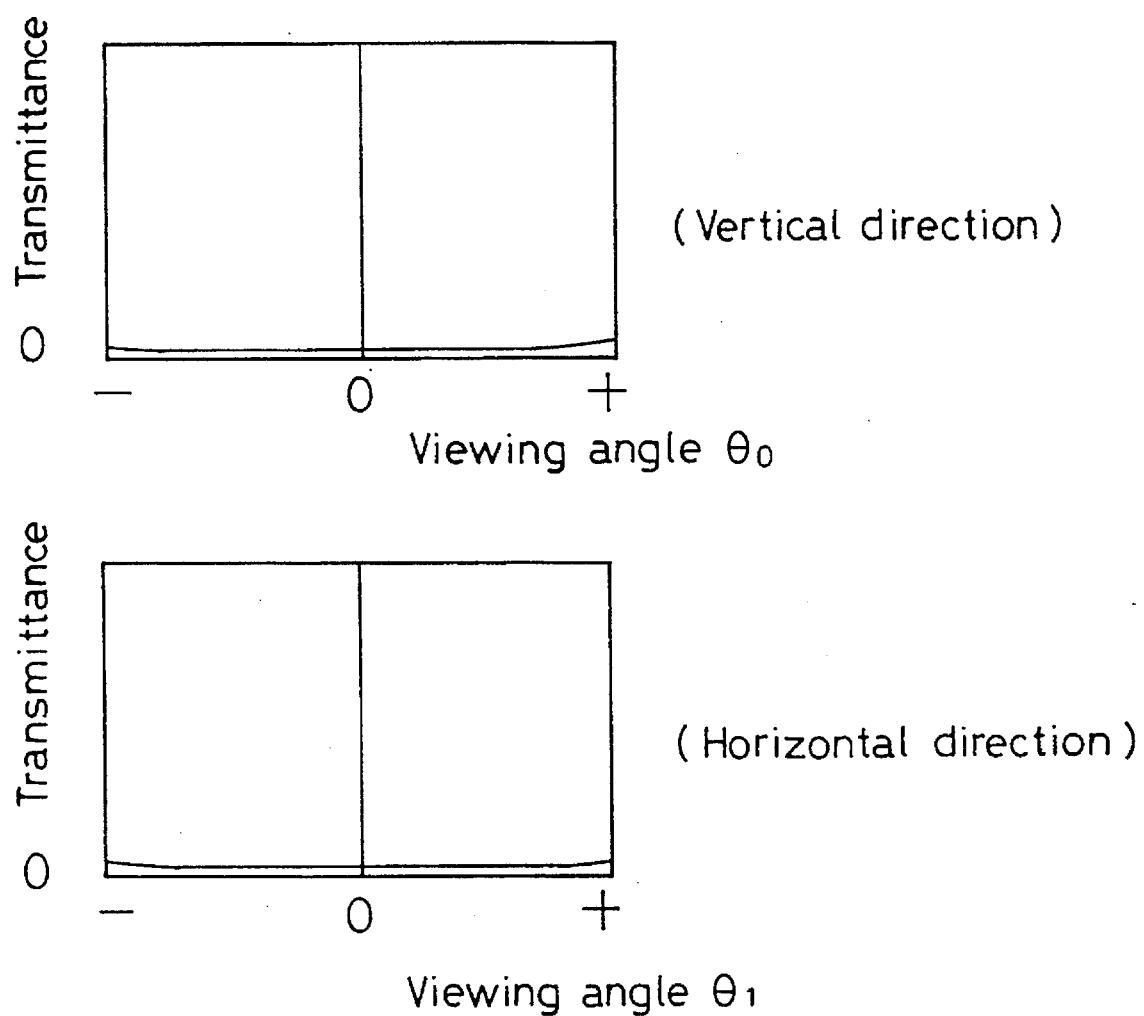

Viewing angle direction indicating mark

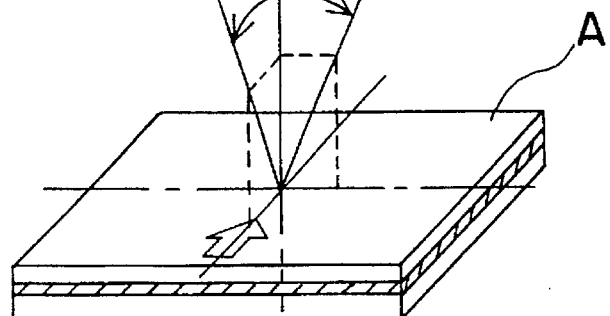
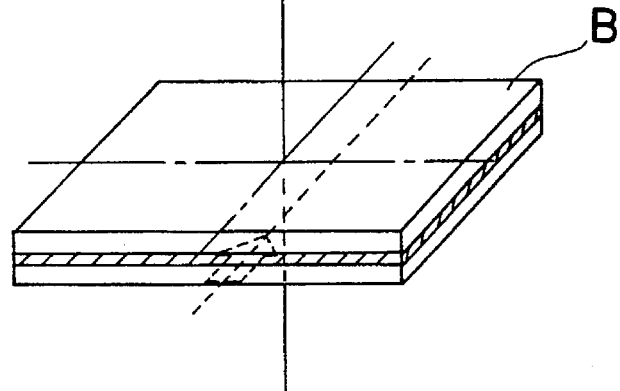
FIG. 6(a)
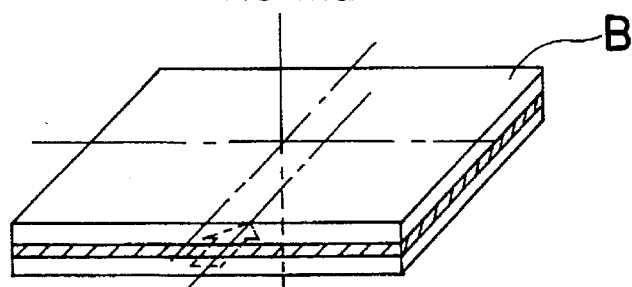
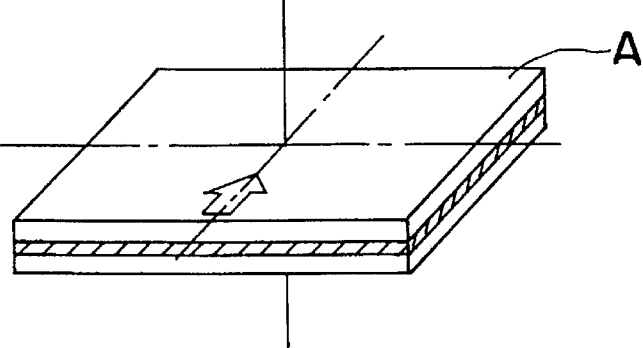
FIG. 6(b)

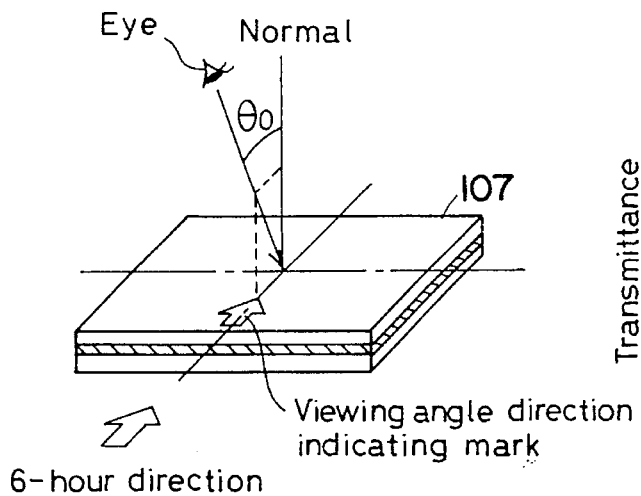
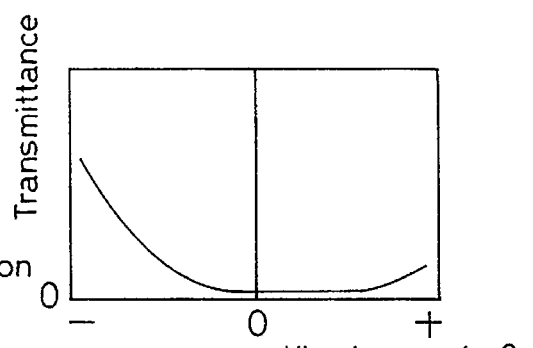
FIG. 11(a)
FIG. 11(b)
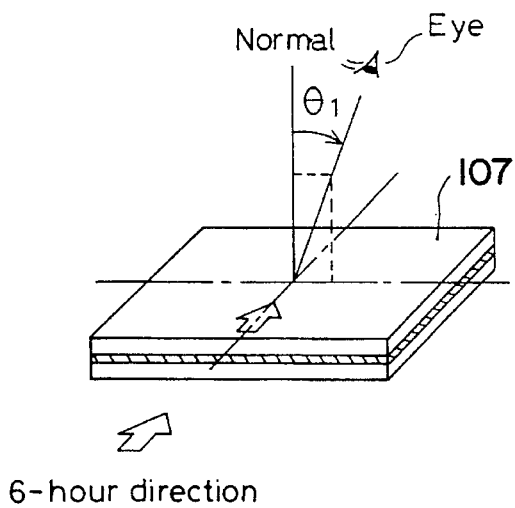
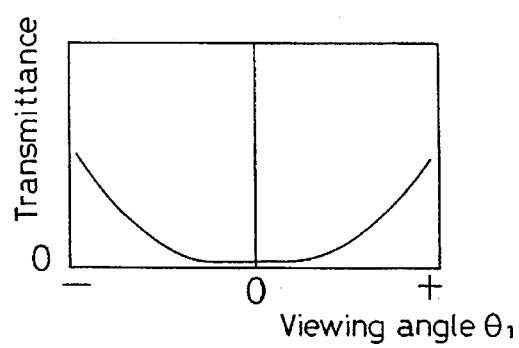
FIG. 12(a)
FIG. 12(b)

Viewing angle direction indicating mark

FIG. 17
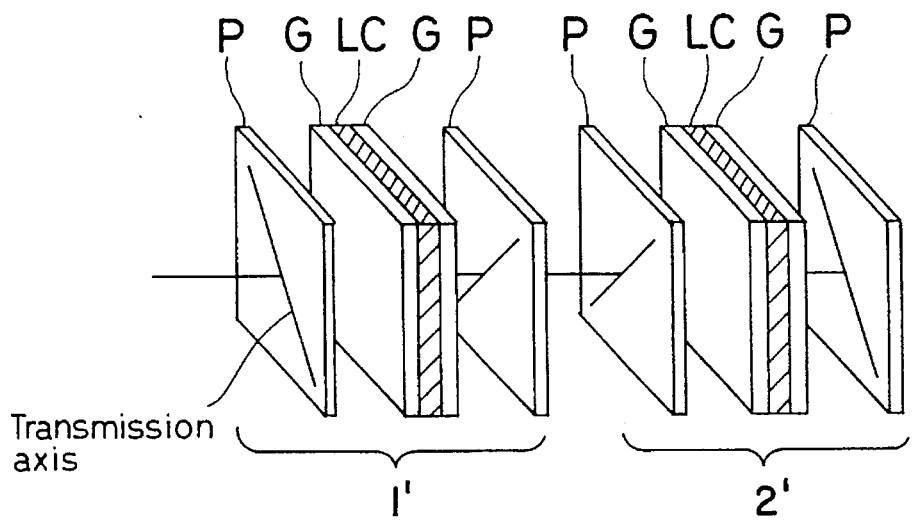
FIG. 18
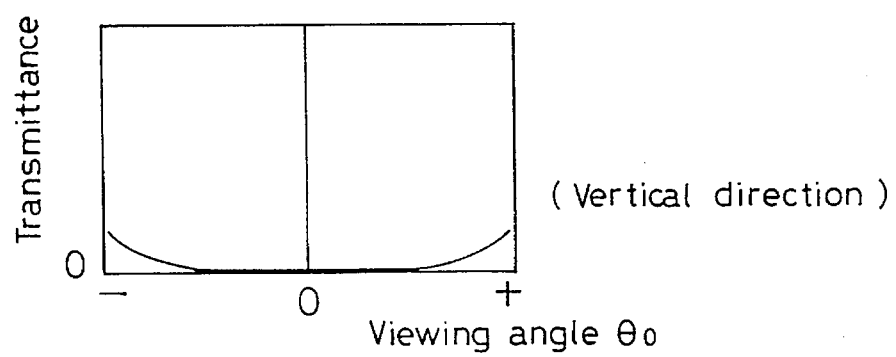
(Vertical direction)
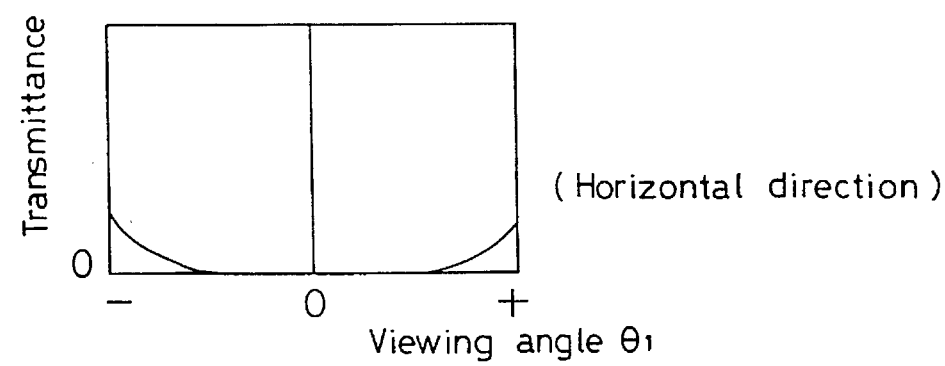
(Horizontal direction)

Left eye   Right eye

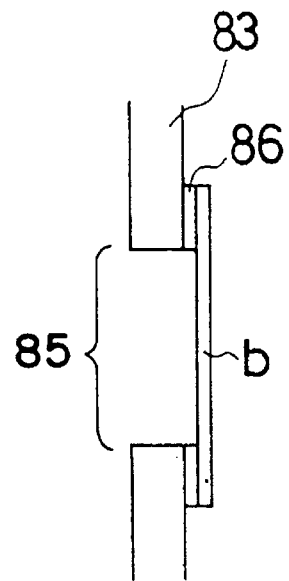
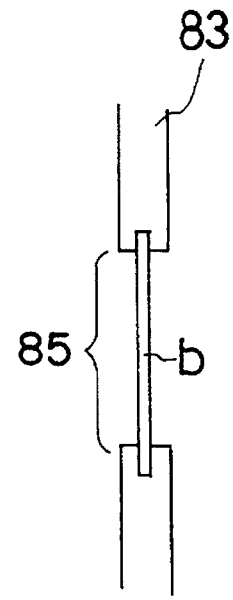
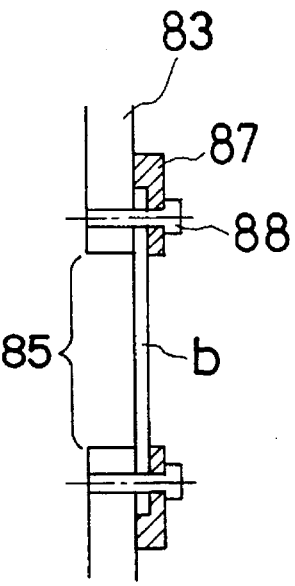
FIG. 4l(a)   FIG. 4l(b)   FIG. 4l(c)
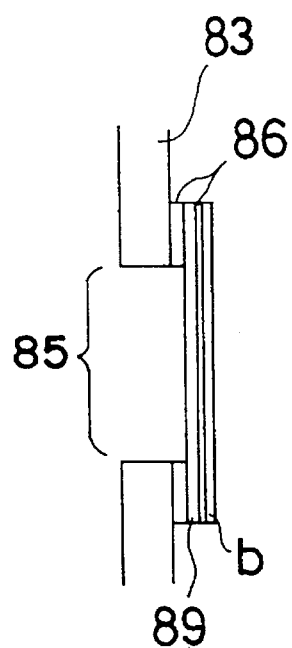
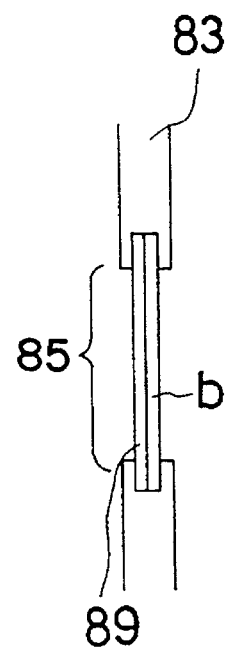
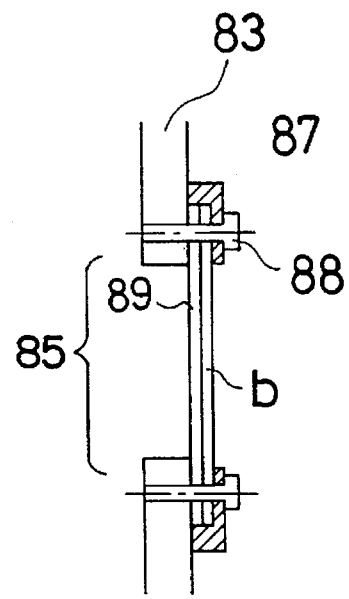
FIG. 42(a)   FIG. 42(b)   FIG. 42(c)

VISUAL DISPLAY HAVING SEE-THROUGH FUNCTION AND STACKED LIQUID CRYSTAL SHUTTERS OF OPPOSITE VIEWING ANGLE DIRECTIONS

BACKGROUND OF THE INVENTION

The present invention relates to a portable visual display and, more particularly, to a head-mounted visual display having see-through function (hereinafter referred to as head-mounted see-through display), which can be retained on the observer's head or face.

Helmet- and goggle-type visual displays have heretofore been developed for the purpose of enabling the user to enjoy virtual reality or a wide-screen image by oneself. In particular, a visual display having see-through function has recently been developed to enable a real world image outside the user and an electronic image displayed on a two-dimensional display device to be superimposed on one another or to allow the user to change over these two images from one to the other by a switching operation.

Japanese Patent Application Laid-Open (KOKAI) No. 3-226198 (1991) discloses a method wherein a liquid crystal shutter is used as a means for changing over the electronic image and the outside image in a visual display of the type described above. However, Japanese Patent Application Laid-Open (KOKAI) No. 3-226198 makes no mention of a specific arrangement of the liquid crystal shutter, although it discloses an idea of using a liquid crystal shutter for the see-through function.

As another prior art, Japanese Patent Application Laid-Open (KOKAI) No. 3-189677 (1991) discloses a technique in which a single liquid crystal shutter is used in such a way that when an outside image is to be viewed, the shutter is made transparent, whereas, when an electronic image is to be viewed, the shutter is made opaque. However, no mention is made of a specific arrangement of the liquid crystal shutter. Accordingly, this is a first problem to be solved by the present invention.

Further, the present inventors noticed the fact that a liquid crystal shutter which employs a twisted nematic (TN) liquid crystal or a super-twisted nematic (STN) liquid crystal has viewing angle dependence. That is, when such a liquid crystal shutter is seen from a specific direction, it exhibits a high contrast (this direction is referred to as "viewing angle direction"; the term is also applied to projection that is made on the liquid crystal shutter in this direction). However, when the liquid crystal shutter is seen from other directions, the contrast is relatively low.

In the case, for example, of a positive type liquid crystal shutter (the term "positive type" denotes a type of liquid crystal shutter which becomes opaque when a voltage is applied thereto) of 6-hour viewing angle in which the viewing angle direction is the 6-hour direction, as shown in FIG. 11(a), the relationship between the viewing angle $\Theta_0$ in the vertical direction (the 12- to 6-hour direction) and transmittance of the liquid crystal shutter when a voltage is applied thereto, that is, when the shutter is opaque, exhibits characteristics as shown in FIG. 11(b). The relationship between the viewing angle $\Theta_1$ in the horizontal direction (the 3- to 9-hour direction) and the transmittance at that time is such as that shown in FIG. 12(b). As will be clear from FIGS. 11(b) and 12(b), the region where a favorable opaque condition is available is approximately symmetric in the horizontal direction, but it is asymmetric in the vertical direction.

Accordingly, a head-mounted display with see-through function that employs a positive type liquid crystal shutter involves the following problems: When an electronic image is viewed, in a region close to the center of the electronic image (i.e., a region in which the field angle is small) the viewing angles $\Theta_0$ and $\Theta_1$ with respect to the liquid crystal shutter are small and hence the opacity is high. Therefore, substantially no outside image can be seen through the liquid crystal shutter in the central region of the electronic image. However, the viewing angles $\Theta_0$ and $\Theta_1$ become larger as the distance from the central region increases toward the peripheral region (where the field angle is large), and it becomes difficult to obtain an adequate opacity. Consequently, the outside image is undesirably seen through the liquid crystal shutter, so that the electronic image becomes difficult to view.

When the field angle of the electronic image is further increased as in the case of wide vision, it becomes further difficult to obtain an adequate opacity in the peripheral region of the electronic image, and the outside image is undesirably seen through the liquid crystal shutter.

Even if the system is successfully arranged so that the electronic image can be put within a viewing angle range in which the opacity of the positive type liquid crystal shutter can be sufficiently obtained by reducing the field angle of the electronic image, such an arrangement imposes restrictions on the position and angle where the liquid crystal shutter is attached to the head-mounted display body, thus making it difficult to reduce the overall size of the head-mounted display. This is a second problem to be solved by the present invention.

In addition, if it is contrived to reduce the overall size of the head-mounted display, the position where the liquid crystal shutter is installed comes close to the eye. Therefore, the liquid crystal shutter itself can be reduced in size. However, when the electronic image alone is to be viewed, that is, when the liquid crystal shutter is made opaque, if the opacity is not sufficiently high, the outside image may be seen through superimposed on the electronic image. Further, a pinhole may be present in a liquid crystal shutter. If the diameter of the pinhole is large, the outside image may be seen through the pinhole, which obstructs the vision of the electronic image. This is a third problem to be solved by the present invention.

SUMMARY OF THE INVENTION

In view of the above-described problems of the prior art, it is a first object of the present invention to define the arrangement of a liquid crystal shutter provided in a head-mounted see-through display, which can be retained on the observer's head or face.

It is a second object of the present invention to eliminate the problem that during observation of an electronic image an outside image is undesirably seen through the peripheral region of the electronic image in a head-mounted see-through display wherein when a liquid crystal shutter is made transparent, the outside image can be viewed, whereas, when the shutter is made opaque, the electronic image can be viewed.

It is a third object of the present invention to provide a head-mounted see-through display that employs a liquid crystal shutter designed so that it can be installed without any particular restriction; the effective viewing angle range is enlarged; the opacity is raised; and the presence of pinholes in the liquid crystal shutter causes no problem.

To attain the first object, the present invention provides a head-mounted see-through display having a device for displaying an image, an ocular optical system for projecting the image displayed by the image display device on an observer's eyeball, and a liquid crystal shutter for transmitting or intercepting an outside image led to the observer's eye to enable the outside image to be selectively observed. The liquid crystal shutter includes at least two polarizing plates having respective transmission axes perpendicularly intersecting each other, and at least two transparent substrates provided between the two polarizing plates. The liquid crystal shutter further includes alignment films provided on respective opposing surfaces of the two transparent substrates so that rubbing directions of the alignment films perpendicularly intersect each other, and a liquid crystal molecular layer sandwiched between the two transparent substrates so that the molecular axis is twisted approximately 90° between both ends thereof along the rubbing directions. The two transparent substrates are disposed between the two polarizing plates so that at each of the outer and eyeball sides of the liquid crystal shutter the transmission axis of the polarizing plate and the rubbing direction of the alignment film on the transparent substrate are either parallel or perpendicular to each other.

To attain the second object, the present invention provides a head-mounted see-through display having a device for displaying an image, an ocular optical system for projecting the image displayed by the image display device on an observer's eyeball, and a liquid crystal shutter for transmitting or intercepting an outside image led to the observer's eye to enable the outside image to be selectively observed. The liquid crystal shutter includes at least two polarizing plates having respective transmission axes lying parallel to each other, and at least two transparent substrates provided between the two polarizing plates. The liquid crystal shutter further includes alignment films provided on respective opposing surfaces of the two transparent substrates so that rubbing directions of the alignment films perpendicularly intersect each other, and a liquid crystal molecular layer sandwiched between the two transparent substrates so that the molecular axis is twisted approximately 90° between both ends thereof along the rubbing directions. The two transparent substrates are disposed between the two polarizing plates so that at one of the outer and eyeball sides of the liquid crystal shutter the transmission axis of the polarizing plate and the rubbing direction of the alignment film on the transparent substrate are parallel to each other, and at the other of the outer and eyeball sides of the liquid crystal shutter the transmission axis and the rubbing direction are perpendicular to each other.

To attain the third object, the present invention provides a head-mounted see-through display having a plurality of liquid crystal shutters each arranged as described above. The liquid crystal shutters are disposed in opposing relation to each other by being rotated through approximately 180° relative to each other about the axis of light from the outside so that the liquid crystal shutters are stacked in reverse relation to each other in terms of the viewing angle direction. Alternatively, the liquid crystal shutters are disposed in opposing relation to each other by being rotated through approximately 180° relative to each other about an axis lying in the viewing angle direction of the liquid crystal shutter so that the liquid crystal shutters are stacked in upside down relation to each other. With such an arrangement, the viewing angle characteristics in each of the vertical and horizontal directions become approximately symmetric. Accordingly, when the present invention is applied to a viewing device, for example, a head-mounted display, the restriction on the angle at which the device is installed with respect to the observer's eye is minimized. In addition, the effective viewing angle range of the shutter when opaque enlarges, and at the same time, the opacity increases. Accordingly, it becomes more unlikely that the outside image will be undesirably seen through the shutter. Even if pinholes are present in two liquid crystal shutters which are to be stacked, there is substantially no possibility of the pinholes coinciding with each other when the two shutters are stacked. Therefore, the presence of pinholes causes no problem.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 shows characteristics of the relationship between the viewing angle and transmittance of a negative type liquid crystal shutter when opaque.

FIGS. 6(a) and 6(b) show a second way of stacking two negative type liquid crystal shutters.

FIGS. 11(a) and 11(b) show that the opacity of a positive type liquid crystal shutter when opaque is asymmetric in the vertical direction.

FIGS. 12(a) and 12(b) show that the opacity of a positive type liquid crystal shutter when opaque is approximately symmetric in the horizontal direction.

FIG. 17 shows the directions of the transmission axes of polarizing plates in a stack of liquid crystal shutters.

FIG. 18 shows exemplarily characteristics of relationship between the viewing angle and transmittance of a stack of liquid crystal shutters when opaque.

FIGS. 41(a)–(c) are sectional views showing examples of a method of attaching a polarizing sheet.

FIGS. 42(a)–(c) are sectional views showing examples of a modification of the method of attaching a polarizing sheet.

DESCRIPTION OF THE PREFERRED EMBODIMENTS

The first head-mounted display of the present invention employs a negative type liquid crystal shutter, which has small viewing angle dependence when it is opaque. In the head-mounted display with see-through function that employs a negative type liquid crystal shutter, a change in the viewing angle $\Theta_0$ or $\Theta_1$ during the observation of an electronic image causes only a small change in the opacity over the whole electronic image from a region close to the center of the electronic image to the peripheral region thereof. Therefore, the display is free from the problem that an outside image is undesirably seen through the peripheral region of the electronic image.

If no adequate opacity can be obtained with a single negative type liquid crystal shutter, a stack of a plurality of negative type liquid crystal shutters may be used. Further, a negative type liquid crystal shutter consumes no electric power during observation of the electronic image. Further, even if the liquid crystal shutter has deteriorated, there is no adverse effect on the observation of the electronic image. In addition, there is no particular restriction on the installation of the liquid crystal shutter.

The arrangement of the negative type liquid crystal shutter will first be explained. In the following, an example of the arrangement of a negative type TN liquid crystal shutter will be shown.

Figure 3A:
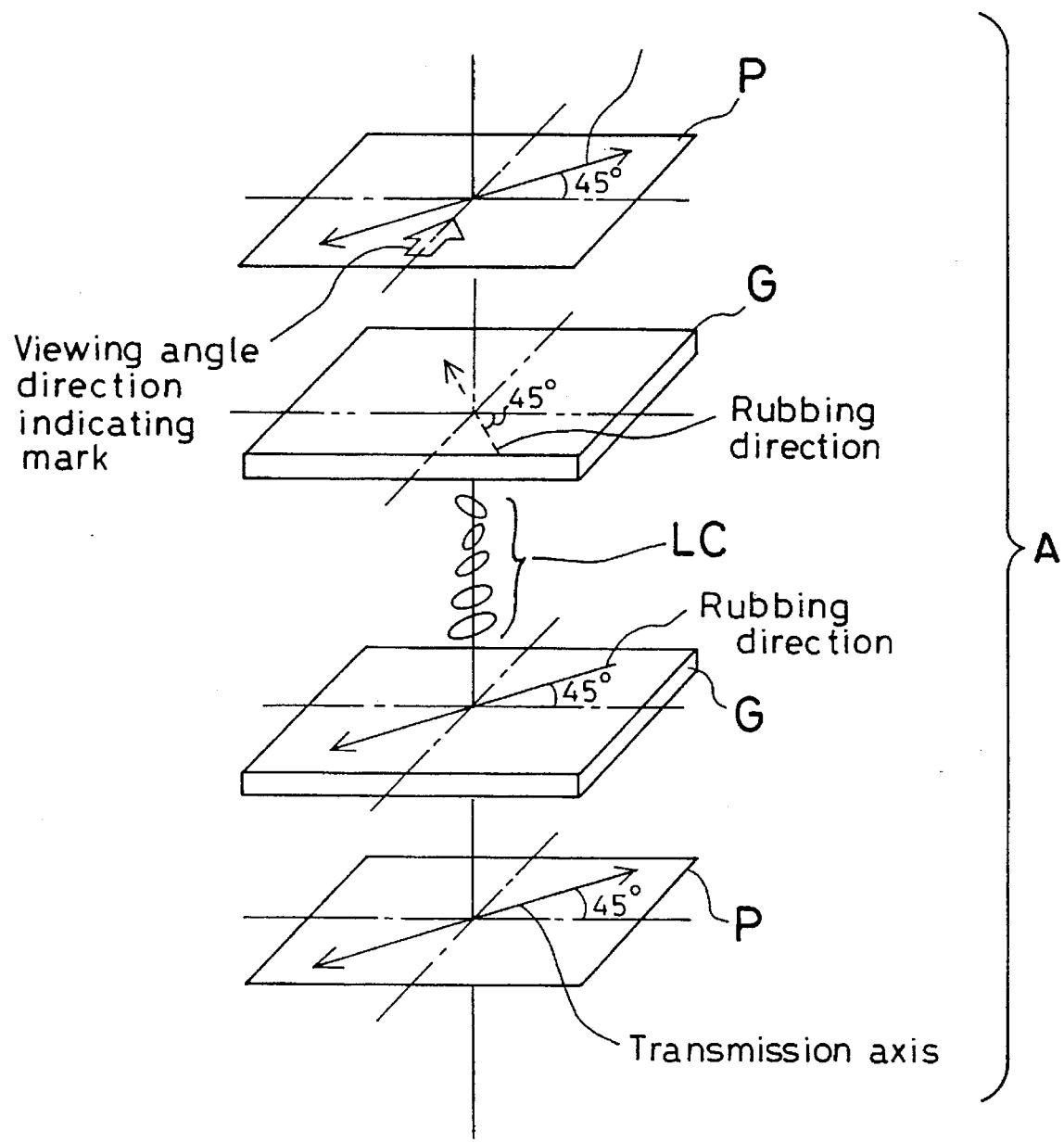
FIGS. 3(a) and 3(b) are exploded perspective views of illustrating a negative type liquid crystal shutter.
Figure 3B:
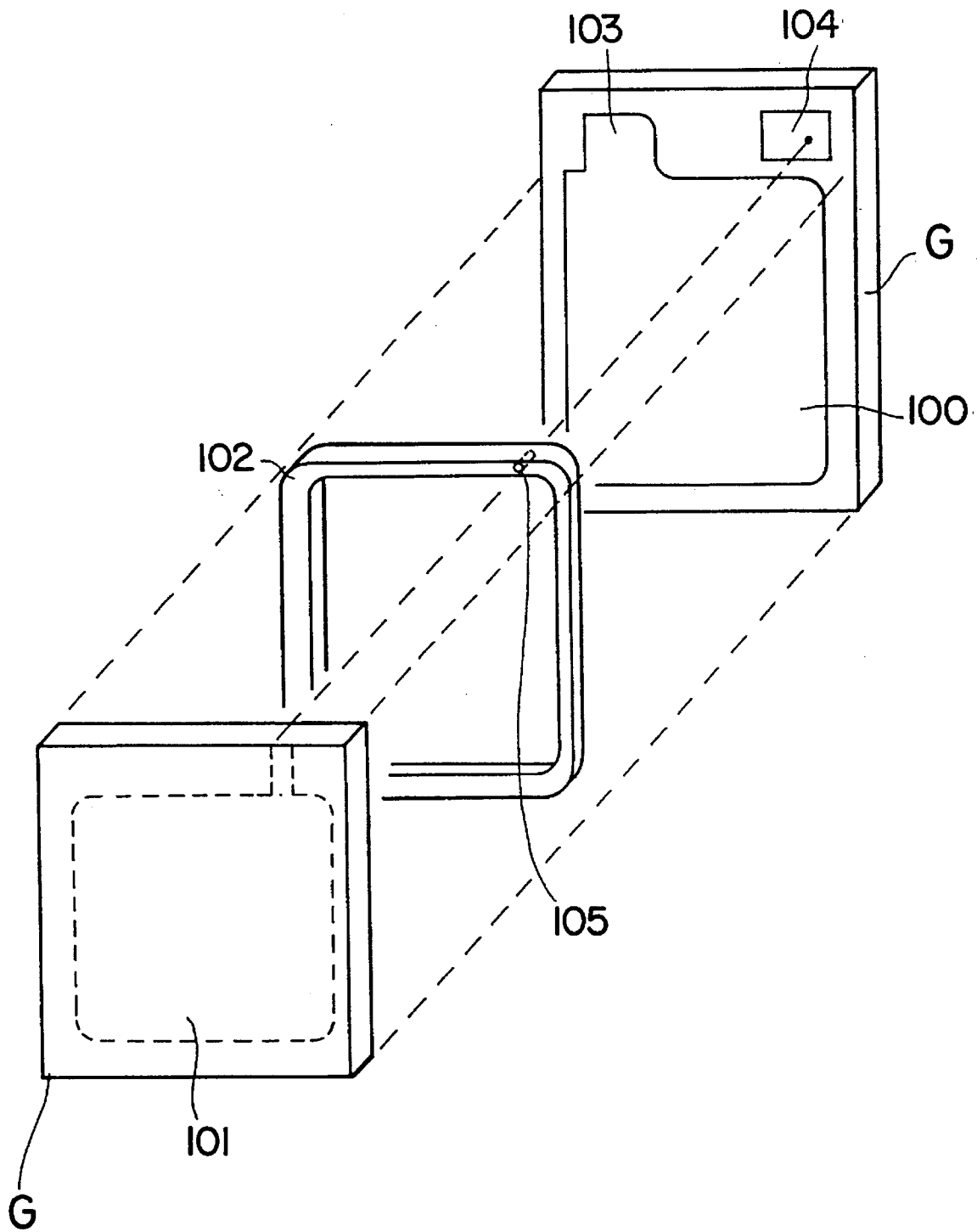
Figure 4:
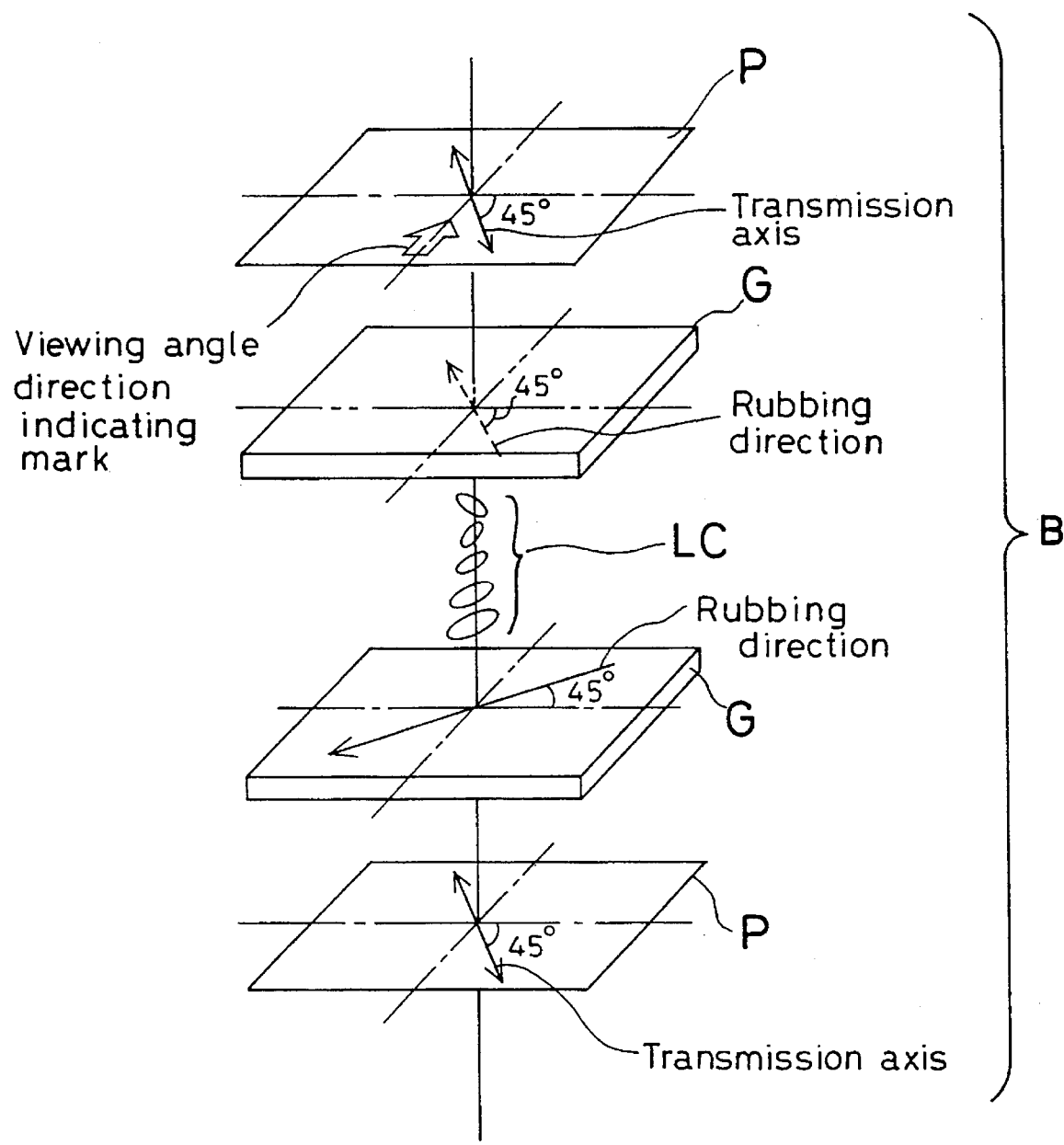
FIG. 4 is an exploded perspective view of another negative type liquid crystal shutter.
Figure 5A:
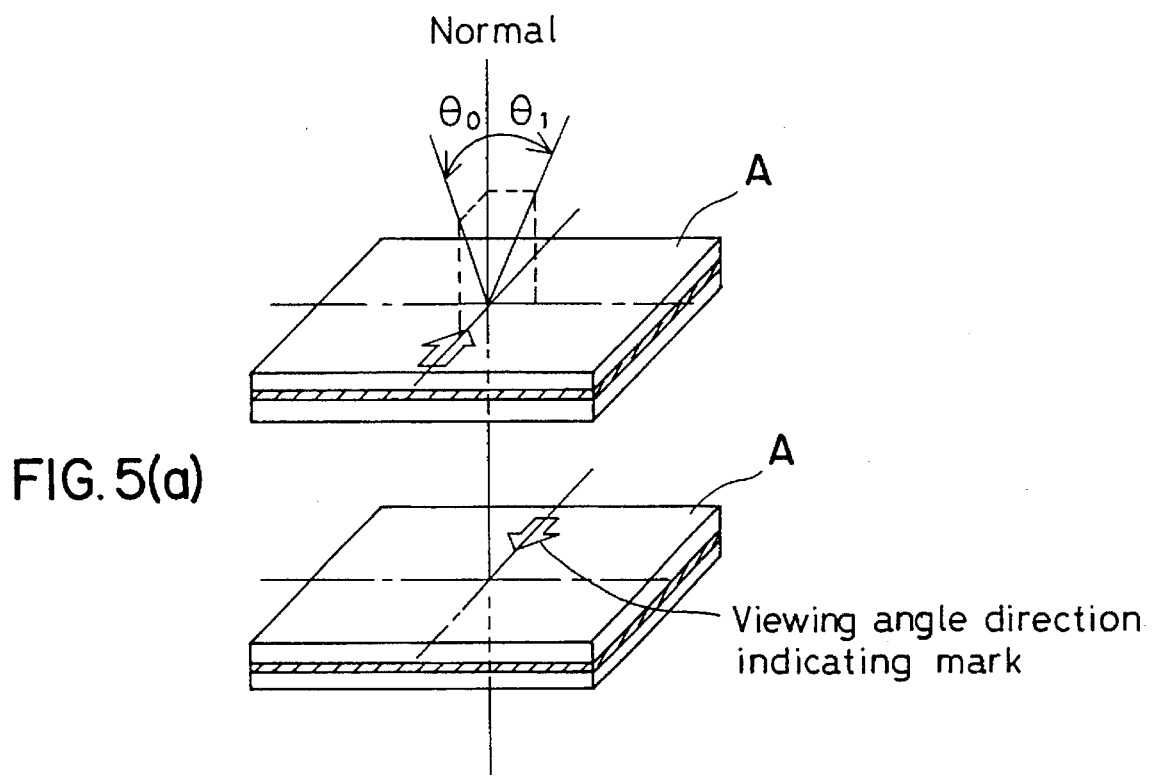
FIG. 5(a), 5(b), 5(c), and 5(d) show a first way of stacking two negative type liquid crystal shutters.
Figure 5B:
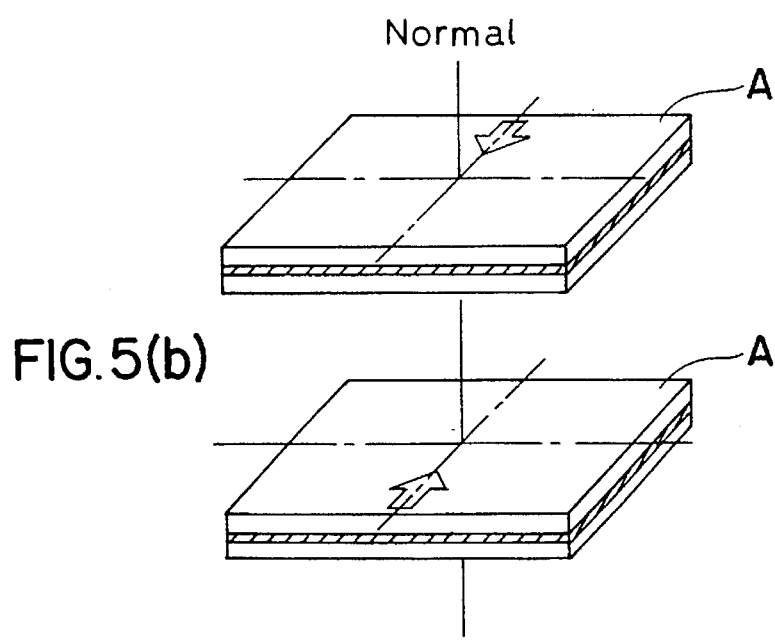
Figure 5C:
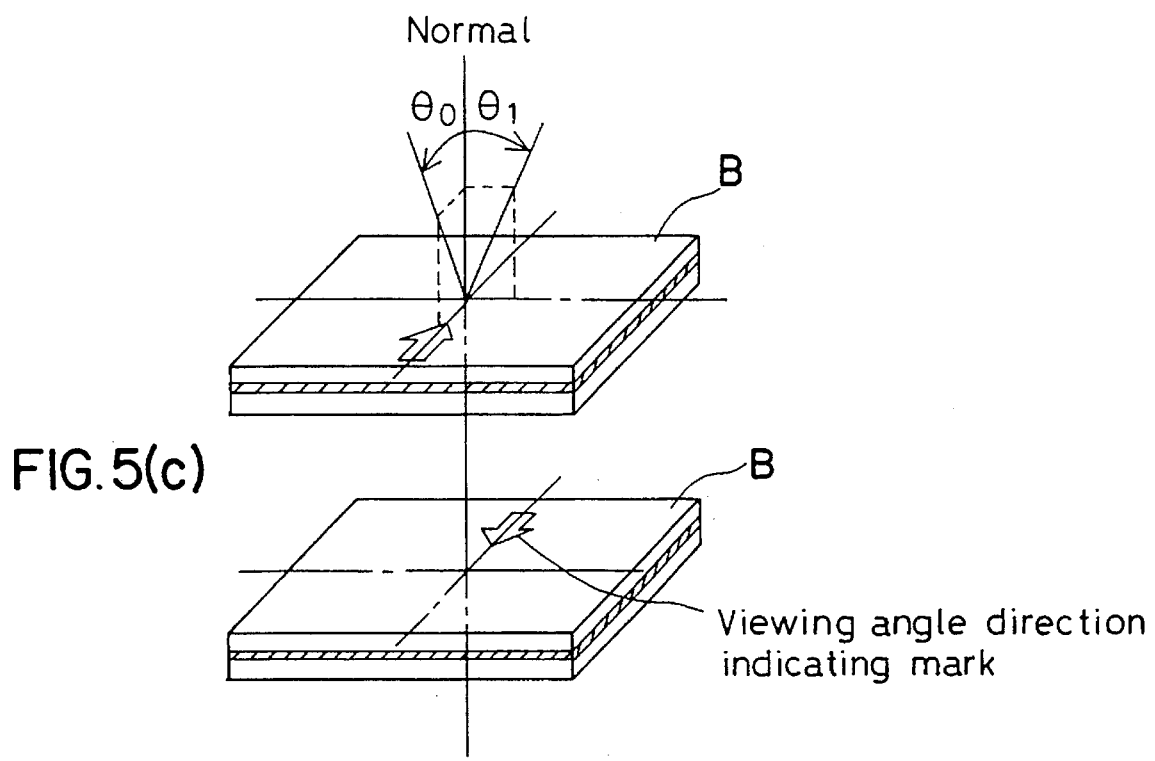
Figure 5D:
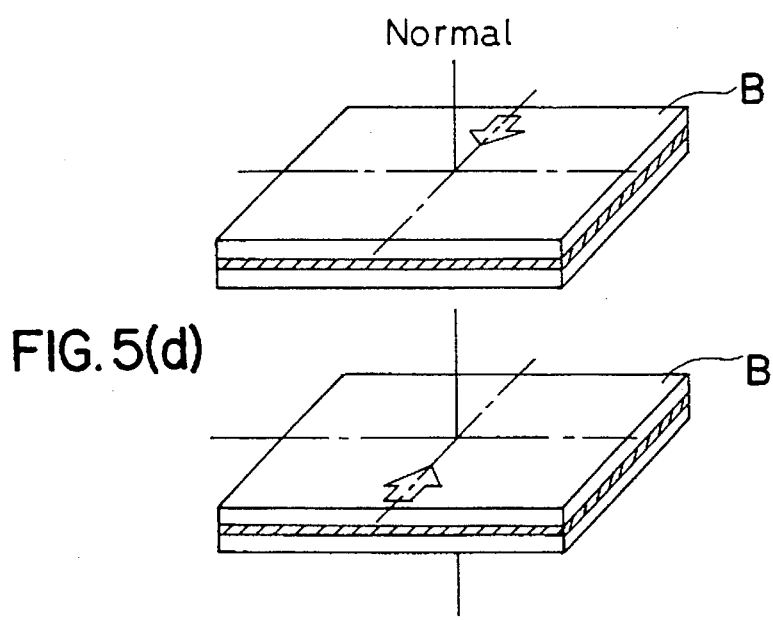

As shown in FIGS. 3(a), 3(b), and 4, a transparent electrode film is formed on each of two glass substrates G. An alignment film is coated on the transparent electrode film and then rubbed in one direction. As shown in FIGS. 3(a) and 4, a liquid crystal molecular layer LC is sandwiched between the two glass substrates G which are disposed to face each other so that the rubbing directions of the alignment films on the glass substrates G perpendicularly intersect each other.

This arrangement will be explained below with reference to FIG. 3(b). One of the two glass substrates G is formed on the inner side thereof with a single segment electrode 100 made of a transparent electrically conductive material, e.g., indium oxide. The other of the glass substrates G is formed on the inner side thereof with a common electrode 101 made of the above-described transparent electrically conductive material so that the common electrode is substantially coincident with the segment electrode. Further, between the glass substrates G respectively having the segment and common electrodes, a sealing member 102 is provided to control the spacing between the glass substrates G to a predetermined level and to form a space for injecting a liquid crystal material. The glass substrate G having the segment electrode is formed with a lead electrode 103 for the segment electrode and a lead electrode for the common electrode 104. The lead electrode for the common electrode is electrically connected to the common electrode through a conductor 105 which is provided in a part of the sealing member.

Further, polarizing plates P are attached to the respective outer sides of the glass substrates G so that the transmission axes of the plates P are parallel to each other. The transmission axes of the polarizing plates P are made coincident with the rubbing direction of either of the alignment films. In FIGS. 3(a) and 3(b), the transmission axes of the polarizing plates P are made coincident with the rubbing direction of the alignment film on the lower glass substrate G (liquid crystal shutter A). In FIG. 4, the transmission axes of the polarizing plates P are made coincident with the rubbing direction of the alignment film on the upper glass substrate G (liquid crystal shutter B).

When no voltage is applied to such a negative type liquid crystal shutter, the liquid crystal molecules remain twisted 90°, as illustrated. Therefore, light that is linearly polarized through one polarizing plate P has the polarization direction thereof twisted 90° while passing through the liquid crystal molecular layer LC. Accordingly, the light cannot pass through the other polarizing plate P. Thus, the liquid crystal shutter is opaque. When a voltage is applied to the liquid crystal shutter, the liquid crystal molecules rise to extend in a direction perpendicular to the glass substrates G. Therefore, light that is linearly polarized through the first polarizing plate P passes through the liquid crystal molecular layer LC as it is without changing the polarization direction. Accordingly, the light can pass through the second polarizing plate P. Thus, the liquid crystal shutter is transparent.

Next, embodiment 1 of the present invention which employs such a negative liquid crystal shutter will be explained.

Figure 1A:
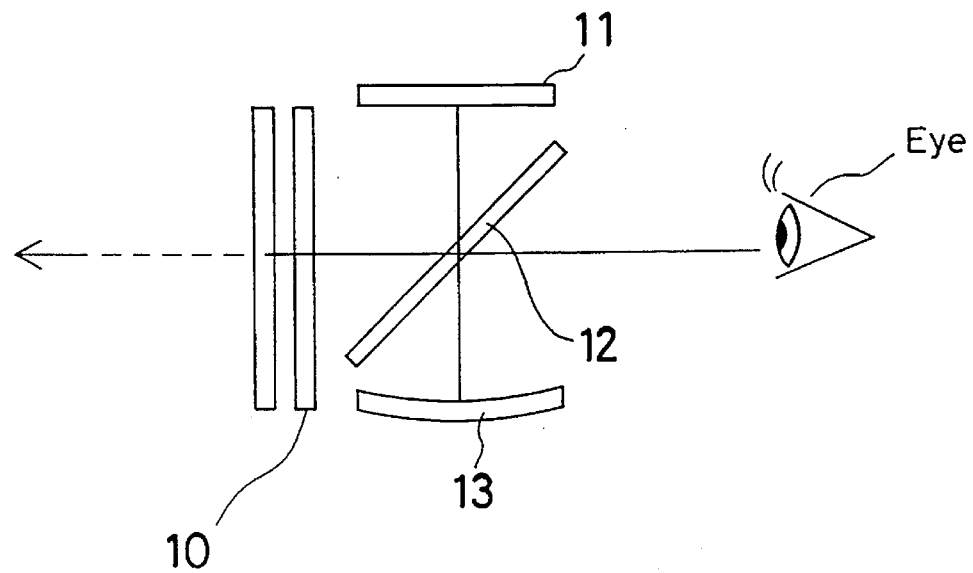
FIGS. 1(a) and 1(b) show the arrangement of the first embodiment of the head-mounted display according to the present invention.
Figure 1B:
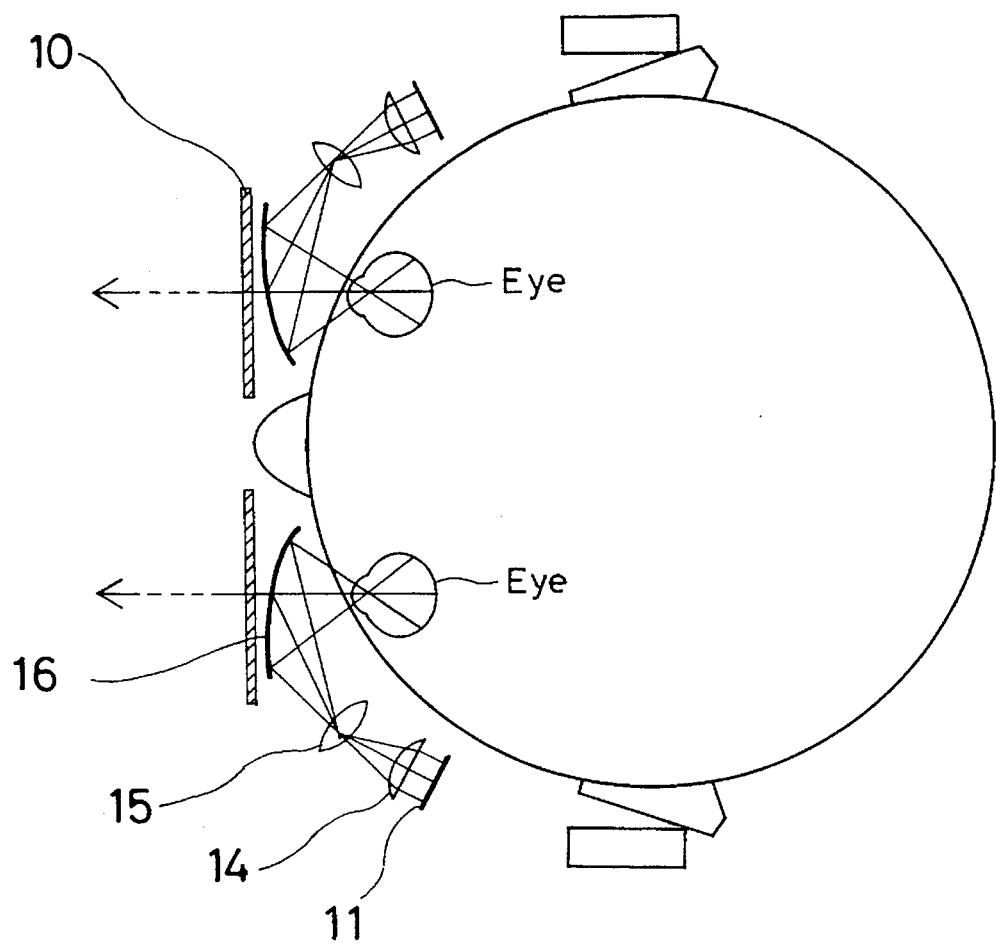

The head-mounted display having see-through function according to the first aspect of the present invention is typically arranged as shown in FIG. 1. In the arrangement shown in FIG. 1(a), display light from an electronic image of a two-dimensional display device 11 such as a liquid crystal display device, which is disposed outside the visual field, is first transmitted by a half-mirror 12, which is obliquely disposed in front of the observer's eye, and the transmitted light is reflected by a concave mirror 13, which is disposed to face the two-dimensional display device 11 across the half-mirror 12. Then, the reflected light is reflected by the half-mirror 12 so as to be led to the eye as an enlarged electronic image. In order to prevent the outside light from entering the eye through the half-mirror 12 during observation of the electronic image, a negative type liquid crystal shutter 10 formed by using a TN liquid crystal or an STN liquid crystal is disposed in front of the half-mirror 12. The transparent and opaque conditions of the liquid crystal shutter 10 are changed over from one to the other in such a way that when the electronic image is to be viewed, the shutter 10 is made opaque, whereas, when an outside image is to be viewed, the shutter 10 is made transparent. In the arrangement shown in FIG. 1(b), display light from an electronic image of a two-dimensional display device 11, which is disposed outside the visual field, is made incident on a concave half-mirror 16, which is disposed in front of each of the user's right and left eyes, through lenses 14 and 15, and the incident light is reflected by the concave half-mirror 16 so as to be led to the eye as an enlarged electronic image. In the same way as in the arrangement shown in FIG. 1(a), a liquid crystal shutter 10 which is similar to the above is disposed in front of the concave half-mirror 16 in order to prevent the outside light from entering the eye through the concave half-mirror 16 during observation of the electronic image. When the electronic image is to be viewed, the shutter 10 is made opaque, whereas, when the outside image is to be viewed, the shutter 10 is made transparent.

The negative type liquid crystal shutter 10 exhibits small viewing angle dependence for both the viewing angles $\Theta_0$ and $\Theta_1$ when it is opaque, as shown in FIG. 2. Therefore, it is free from the problem that the outside image is undesirably seen through the peripheral region of the electronic image.

In addition, the liquid crystal shutter 10 can be installed freely with respect to the observer's face without any particular restriction. Accordingly, the liquid crystal shutter 10 can be disposed, for example, vertically, that is, parallel to the observer's face, as shown in FIG. 1. Therefore, the liquid crystal shutter 10 can be disposed close to the eye. Thus, it is possible to reduce the overall size of the head-mounted display body.

Further, when it is intended to form a single, continuous liquid crystal shutter 10 for both the right and left eyes, since the liquid crystal shutter 10 can be disposed vertically, that is, parallel to the observer's face, it is possible to achieve a reduction in the overall size of the head-mounted display body with ease, which is a great merit of the present invention.

Further, the negative type liquid crystal shutter becomes transparent when a voltage is applied thereto, whereas, when no voltage is applied thereto, the shutter is opaque. Accordingly, no electric power is consumed by the liquid crystal shutter 10 during observation of the electronic image.

Even if the liquid crystal shutter 10 becomes inoperative due to deterioration during the use of the head-mounted display, since the shutter 10 remains opaque at all times, there is no adverse effect on the observation of the electronic image, although the outside image cannot be seen.

Next, embodiment 2 of the present invention which employs a negative type liquid crystal shutter will be explained. If no adequate opacity can be obtained with only one negative type liquid crystal shutter such as that used in the embodiment 1, a stack of a plurality of negative type liquid crystal shutters may be used. In such a case, a plurality of negative type liquid crystal shutters are stacked as follows. Two different types of TN liquid crystal shutter A and B are prepared which have the same 6-hour viewing angle direction but are 90° different from each other in terms of the transmission axes of the polarizing plates P attached thereto, as shown in the exploded perspective views of FIGS. 3 and 4. As shown in FIG. 2, the viewing angle characteristics (the relationship between the viewing angle and transmittance) of these shutters are approximately symmetric when they are opaque. However, when the shutters are transparent, the viewing angle characteristics are asymmetric in the vertical direction (the 12- to 6-hour direction, but they are approximately symmetric in the horizontal direction (the 3- to 9-hour direction).

These liquid crystal shutters may be stacked in either of the following two ways:

(1) Two liquid crystal shutters A or B are stacked in reverse relation to each other in terms of the vertical direction in which the viewing angle characteristics are asymmetric, as shown in FIGS. 5(a) to 5(d).

(2) One liquid crystal shutter A and one liquid crystal shutter B are stacked with one of them turned upside down about an axis of rotation which lies in the vertical direction in which the viewing angle characteristics are asymmetric, as shown in FIGS. 6(a) and 6(b).

Figure 7:
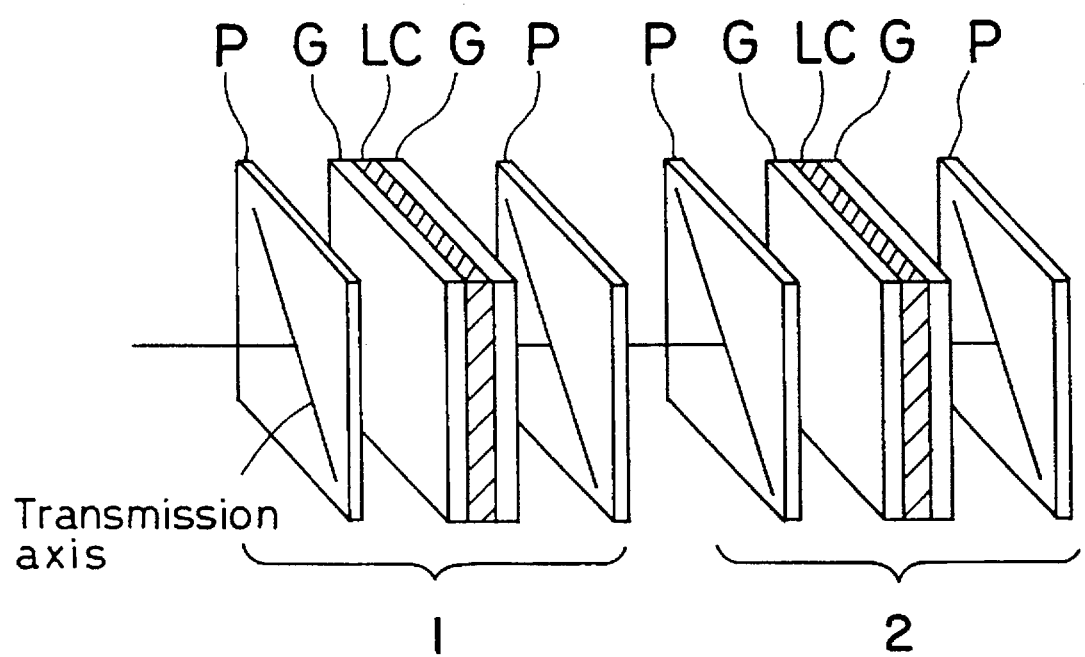
FIG. 7 shows the directions of the transmission axes of polarizing plates in a stack of negative type liquid crystal shutters.

In these arrangements, when a liquid crystal shutter 1 (liquid crystal shutter A or B) and a liquid crystal shutter 2 (liquid crystal shutter A or B) are stacked, the transmission axes of two polarizing plates P which are adjacent to each other in the center of the stack lie in the same direction, as shown in FIG. 7.

With such an arrangement, the opacity of the shutter when opaque becomes higher than in the case of a single negative type liquid crystal shutter. In addition, the transmittance in the vertical direction when the shutter is transparent can be made approximately symmetric with the shutter comprising two liquid crystal shutters, whereas it is asymmetric in the case of a single liquid crystal shutter.

Figure 8A:
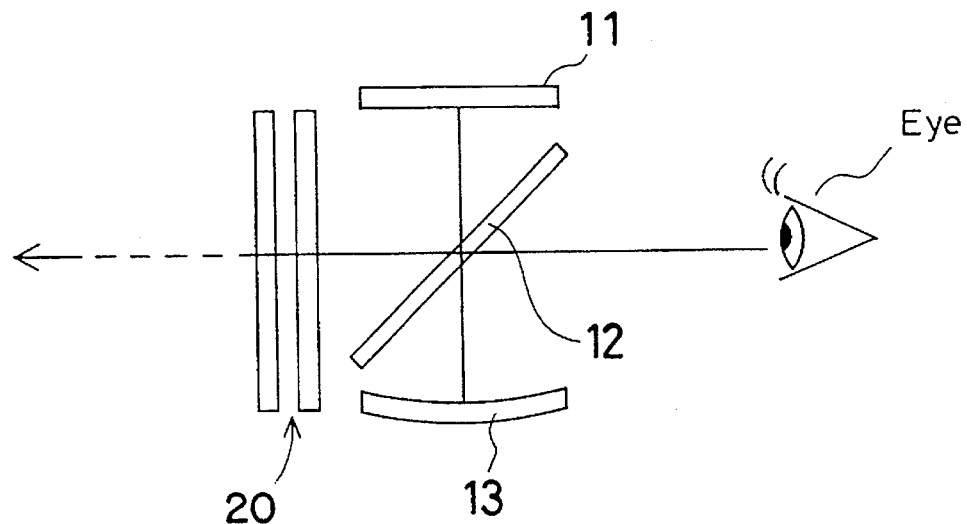
FIGS. 8(a) and 8(b) show the arrangement of a head-mounted display according to the second embodiment of the present invention.
Figure 8B:
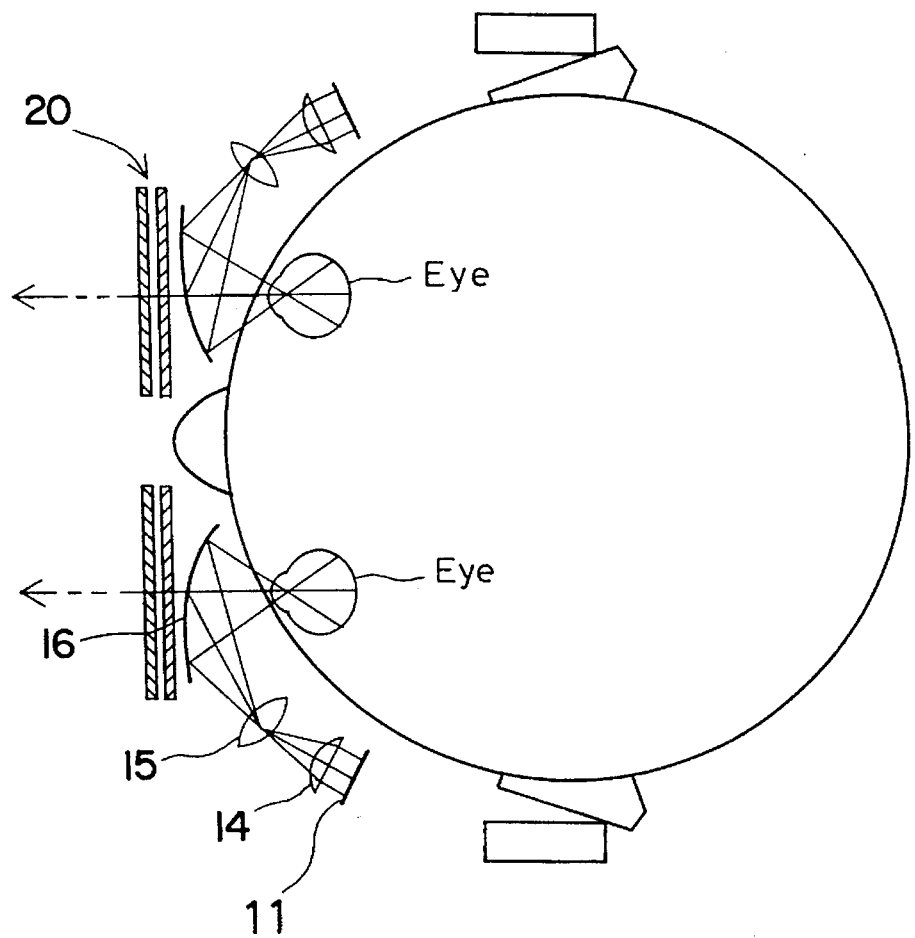

FIG. 8 shows a head-mounted display having see-through function, which is similar to the display shown in FIG. 1 and which employs a liquid crystal shutter 20 formed by stacking two negative type liquid crystal shutters as described above. The arrangement and operation of the head-mounted display shown in FIG. 8 are the same as those of the display shown in FIG. 1 except for the arrangement of the liquid crystal shutter.

In the case of the double-shutter arrangement also, when the shutter is opaque, the viewing angle dependence is small. Therefore, it is free from the problem that the outside image is undesirably seen through the peripheral region of the electronic image. Further, since the opacity of the shutter when opaque is higher than in the case of a single liquid crystal shutter as shown in FIG. 1, it is more unlikely that the outside image will be seen through the shutter.

In addition, the liquid crystal shutter 20 can be installed freely with respect to the observer's face without any particular restriction. Accordingly, the liquid crystal shutter 20 can be disposed, for example, vertically, that is, parallel to the observer's face, as shown in FIG. 8. Therefore, the liquid crystal shutter 20 can be disposed close to the eye. Thus, it is possible to reduce the overall size of the head-mounted display body.

Further, when it is intended to form a single, continuous liquid crystal shutter 20 for both the right and left eyes, since the liquid crystal shutter 20 can be disposed vertically, that is, parallel to the observer's face, it is possible to achieve a reduction in the overall size of the head-mounted display body with ease, which is a great merit of the present invention.

Further, the negative type liquid crystal shutter becomes transparent when a voltage is applied thereto, whereas, when no voltage is applied thereto, the shutter is opaque. Accordingly, no electric power is consumed by the liquid crystal shutter 20 during observation of the electronic image.

Even if the liquid crystal shutter 20 becomes inoperative due to deterioration during the use of the head-mounted display, since the shutter 20 remains opaque at all times, there is no adverse effect on the observation of the electronic image, although the outside image cannot be seen.

Further, even if pinholes are present in two shutter units constituting the liquid crystal shutter, the probability that the pinholes will coincide with each other when the two shutter units are stacked is low. Accordingly, the presence of pinholes causes no problem.

Although in this embodiment two liquid crystal shutters are stacked, three or more liquid crystal shutters may be stacked. In such a case, a higher opacity can be obtained.

In the case of the liquid crystal shutter 20, the thickness of the shutter increases correspondingly to the number of shutters stacked. However, since there is no change in the surface size, the thickness cannot be a factor against the reduction in overall size of the head-mounted display body.

Figure 9:
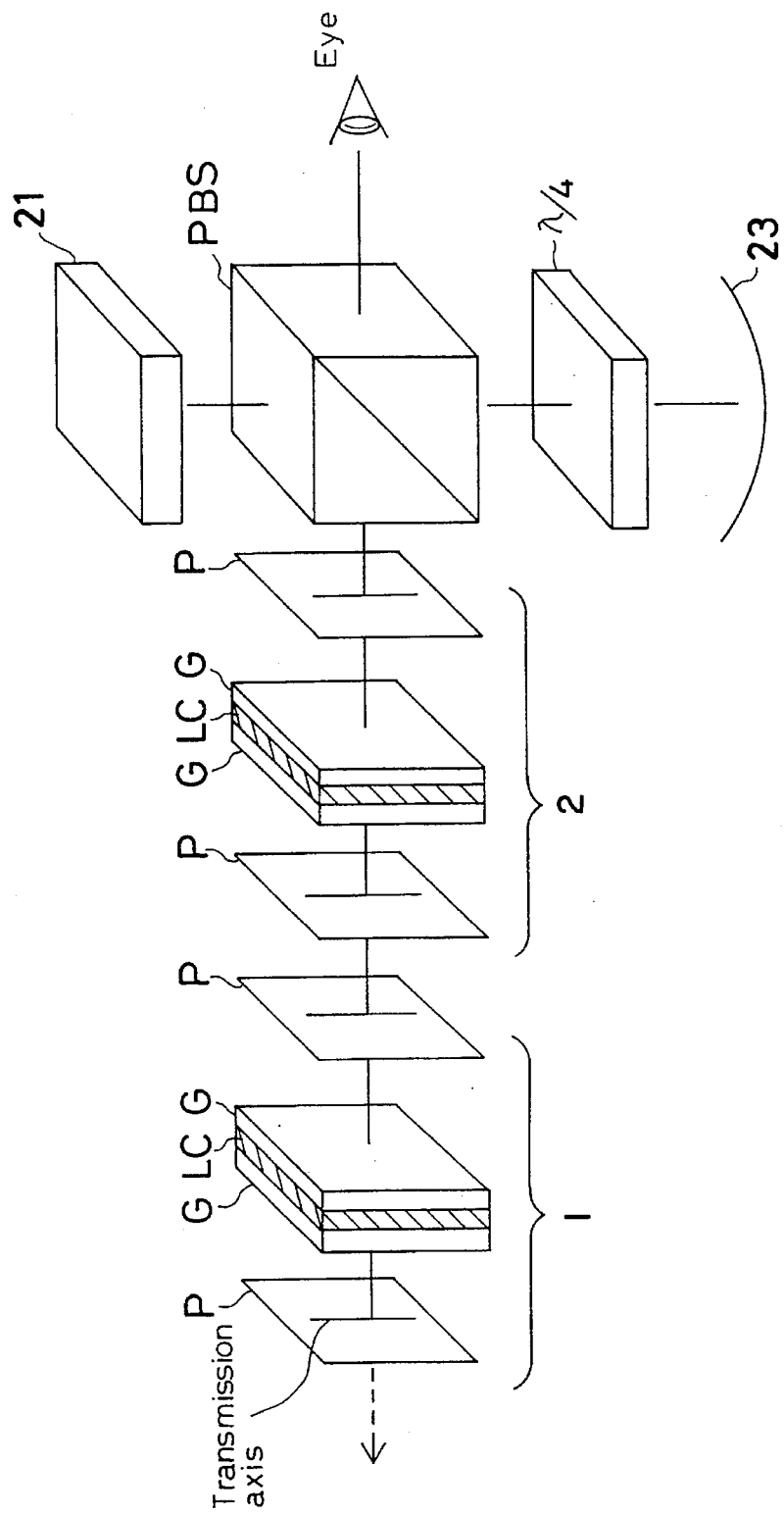
FIG. 9 shows the arrangement of a head-mounted display according to a third embodiment of the present invention.

Next, embodiment 3, which is a modification of the above-described embodiment 2, will be explained. In this embodiment also, a negative type liquid crystal shutter that is formed by using a TN or STN liquid crystal is used in a head-mounted display having see-through function to change over an electronic image and an outside image. This embodiment will be explained below by way of an example in which a negative type liquid crystal shutter 1 (liquid crystal shutter A or B) and a liquid crystal shutter 2 (liquid crystal shutter A or B) are stacked so that the transmission axes of two polarizing plates P which are adjacent to each other in the center of the stack lie in the same direction, as shown in FIG. 9. In this embodiment, a polarization beam splitter PBS is employed in place of a half-mirror. The two liquid crystal shutters 1 and 2 are disposed so that the transmission axis of the polarization beam splitter-side polarizing plate P of the liquid crystal shutter 2, which is adjacent to the polarization beam splitter PBS, lies in such a direction that light passing through this polarizing plate P always becomes p-polarized light with respect to the polarization beam splitter PBS. By doing so, the quantity of outside light reaching the observer's eye can be maximized in the arrangement that employs two negative type liquid crystal shutters 1 and 2. Accordingly, it is possible to observe a bright outside image. It should be noted that the polarization beam splitter-side polarizing plate P of the liquid crystal shutter 2, which is adjacent to the polarization beam splitter PBS, may be removed.

A liquid crystal display unit 21 for displaying an electronic image is also disposed so that light from the liquid crystal display unit 21 is p-polarized light with respect to the polarization beam splitter PBS. Thus, light from the electronic image displayed on the liquid crystal display unit 21 once passes through the polarization beam splitter PBS and further passes through a quarter-wave plate $\lambda/4$. Then, the light is reflected by a concave mirror 23 of a projection optical system which is disposed at the back of the quarter-wave plate $\lambda/4$. The reflected light passes through the quarter-wave plate $\lambda/4$ in the reverse direction to the above, thereby being converted into s-polarized light. Then, the s-polarized light enters the polarization beam splitter PBS where all the light is reflected toward the observer's eye, thus enabling the observer to view a bright electronic image displayed by the liquid crystal display unit 21.

In this embodiment also, when the outside image is to be viewed, the liquid crystal shutters 1 and 2 are made transparent, whereas, when the electronic image is to be viewed, the shutters 1 and 2 are made opaque, in the same way as in the embodiment 2. Since a stack of two negative type liquid crystal shutters is used, the viewing angle dependence is small when the shutters are opaque. Therefore, there is no possibility that the outside image will be seen through the peripheral region of the electronic image. Further, since the opacity of the stack of liquid crystal shutters 1 and 2 when opaque is higher than in the case of a single liquid crystal shutter, it is more unlikely that the outside image will be seen through it.

In addition, the liquid crystal shutters can be installed freely with respect to the observer's face without any particular restriction. Accordingly, the liquid crystal shutters 1 and 2 can be disposed, for example, vertically, that is, parallel to the observer's face, as shown in FIG. 9. Therefore, the liquid crystal shutters 1 and 2 can be disposed close to the eye. Thus, it is possible to reduce the overall size of the head-mounted display body.

Further, when it is intended to form a single, continuous liquid crystal shutter for both the right and left eyes, since the stack of liquid crystal shutters 1 and 2 can be disposed vertically, that is, parallel to the observer's face, it is possible to achieve a reduction in the overall size of the head-mounted display body with ease, which is a great merit of the present invention.

Further, the negative type liquid crystal shutter becomes transparent when a voltage is applied thereto, whereas, when no voltage is applied thereto, the shutter is opaque. Accordingly, no electric power is consumed by the liquid crystal shutters 1 and 2 during observation of the electronic image.

Even if the liquid crystal shutters 1 and 2 become inoperative due to deterioration during the use of the head-mounted display, since the shutters 1 and 2 remain opaque at all times, there is no adverse effect on the observation of the electronic image, although the outside image cannot be seen.

Further, even if pinholes are present in the liquid crystal shutters 1 and 2, the probability that the pinholes will coincide with each other when the two shutters 1 and 2 are stacked is low. Accordingly, the presence of pinholes causes no problem.

Although in this embodiment two liquid crystal shutters are stacked, three or more liquid crystal shutters may be stacked. In such a case, a higher opacity can be obtained.

Although the thickness of the liquid crystal shutter increases correspondingly to the number of shutters stacked, since there is no change in the surface size, the thickness cannot be a factor against the reduction in overall size of the head-mounted display body.

Figure 10:
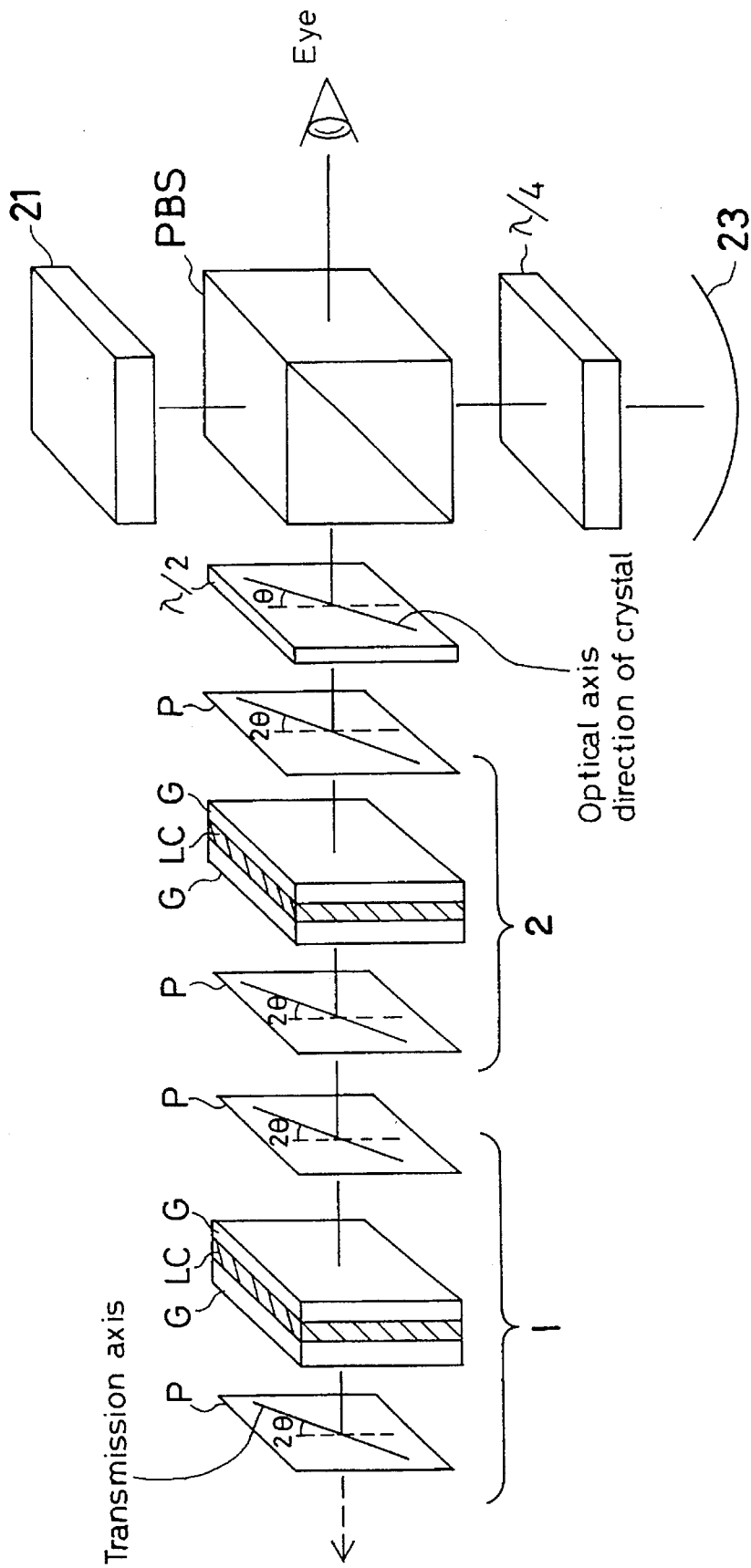
FIG. 10 shows the arrangement of a head-mounted display according to a fourth embodiment of the present invention.

Next, a fourth embodiment of the present invention, which is a modification of the embodiment 3, will be explained with reference to FIG. 10. In this embodiment also, a negative type liquid crystal shutter 1 (liquid crystal shutter A or B) and a liquid crystal shutter 2 (liquid crystal shutter A or B) are stacked so that the transmission axes of two polarizing plates P which are adjacent to each other in the center of the stack lie in the same direction. Further, a polarization beam splitter PBS is employed in place of a half-mirror. In addition, a halfwave plate λ/2 is disposed in between the liquid crystal shutter 2 and the polarization beam splitter PBS. Assuming that the transmission axis of the polarization beam splitter-side polarizing plate P of the liquid crystal shutter 2, which is adjacent to the polarization beam splitter PBS, lies at an angle 2Θ to the plane of incidence the polarization beam splitter PBS, the halfwave plate λ/2 is disposed so that the optical axis direction of crystal of the halfwave plate λ/2 is at an angle Θ to the incidence plane of the polarization beam splitter PBS. With this arrangement, the outside light that passes through the liquid crystal shutters 1 and 2 and the halfwave plate λ/2 becomes p-polarized light, so that it is possible to maximize the quantity of outside light reaching the observer's eye and hence possible to view a bright outside image in the same way as in the embodiment shown in FIG. 9. As to the electronic image provided from the liquid crystal display unit 21, a bright electronic image can be viewed in the same way as in the embodiment 3. It should be noted that the transmission axis of the polarizing plate P which is adjacent to the halfwave plate λ/2 may lie in any desired direction and that the optical axis direction of crystal of the halfwave plate λ/2 may be adjusted as described above after this polarizing plate P has been installed. In this embodiment also, the polarizing plate P which is adjacent to the halfwave plate λ/2 may be removed. The other features of this embodiment are the same as those of the embodiment 3. In addition, a stack of three or more liquid crystal shutters may be used in place of the stack of two liquid crystal shutters.

Although in the foregoing embodiments 1 to 4 a TN liquid crystal is used as a liquid crystal for the negative type liquid crystal shutter, an STN liquid crystal may also be used, as a matter of course.

Although the head-mounted display according to the first aspect of the present invention has been described by way of some embodiments, it should be noted that the present invention is not necessarily limited to these embodiments and that various changes and modifications may be imparted thereto. For example, the two polarizing plates P which are adjacent to each other in the center of the stack of two liquid crystal shutters 1 and 2 may be replaced by a single polarizing plate P.

The following is a description of embodiments of the second head-mounted display according to the present invention, which employs a positive type liquid crystal shutter.

In the case, for example, of a positive type liquid crystal shutter (the term "positive type" denotes a type of liquid crystal shutter which becomes opaque when a voltage is applied thereto) of 6-hour viewing angle in which the viewing angle direction is the 6-hour direction, as shown generally indicated at 107 in FIG. 11(a), the relationship between the viewing angle $\Theta_0$ in the vertical direction (the 12- to 6-hour direction) and transmittance of the liquid crystal shutter when a voltage is applied thereto, that is, when the shutter is opaque, exhibits characteristics as shown in FIG. 11(b). The relationship between the viewing angle $\Theta_1$ in the horizontal direction (the 3- to 9-hour direction) and the transmittance at that time is such as that shown in FIG. 12(b). As will be clear from FIGS. 11(b) and 12(b), the region where a favorable opaque condition is available is approximately symmetric in the horizontal direction, but it is asymmetric in the vertical direction.

Figure 13:
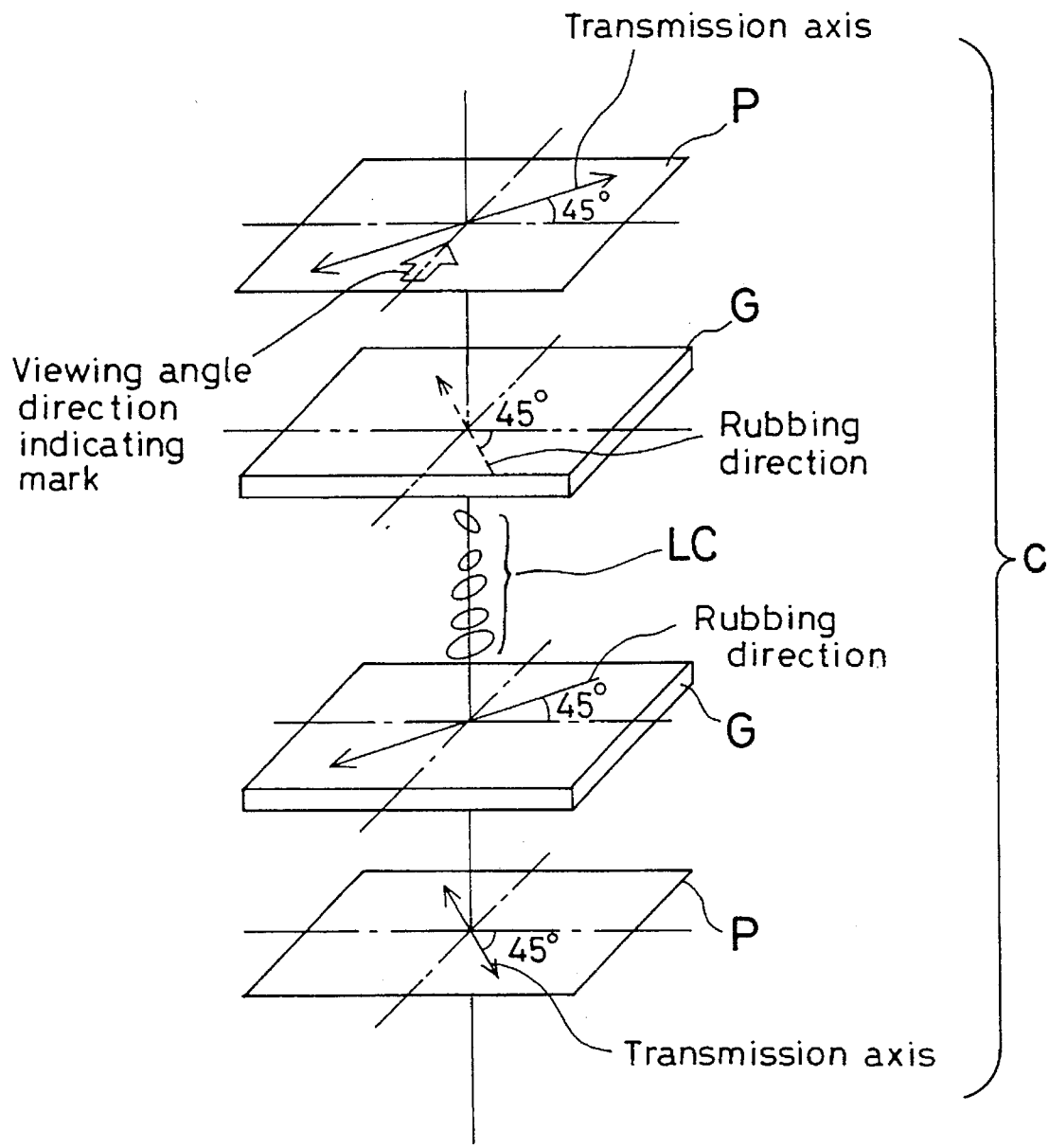
FIG. 13 is an exploded perspective view of one of a pair of positive type liquid crystal shutters.
Figure 14:
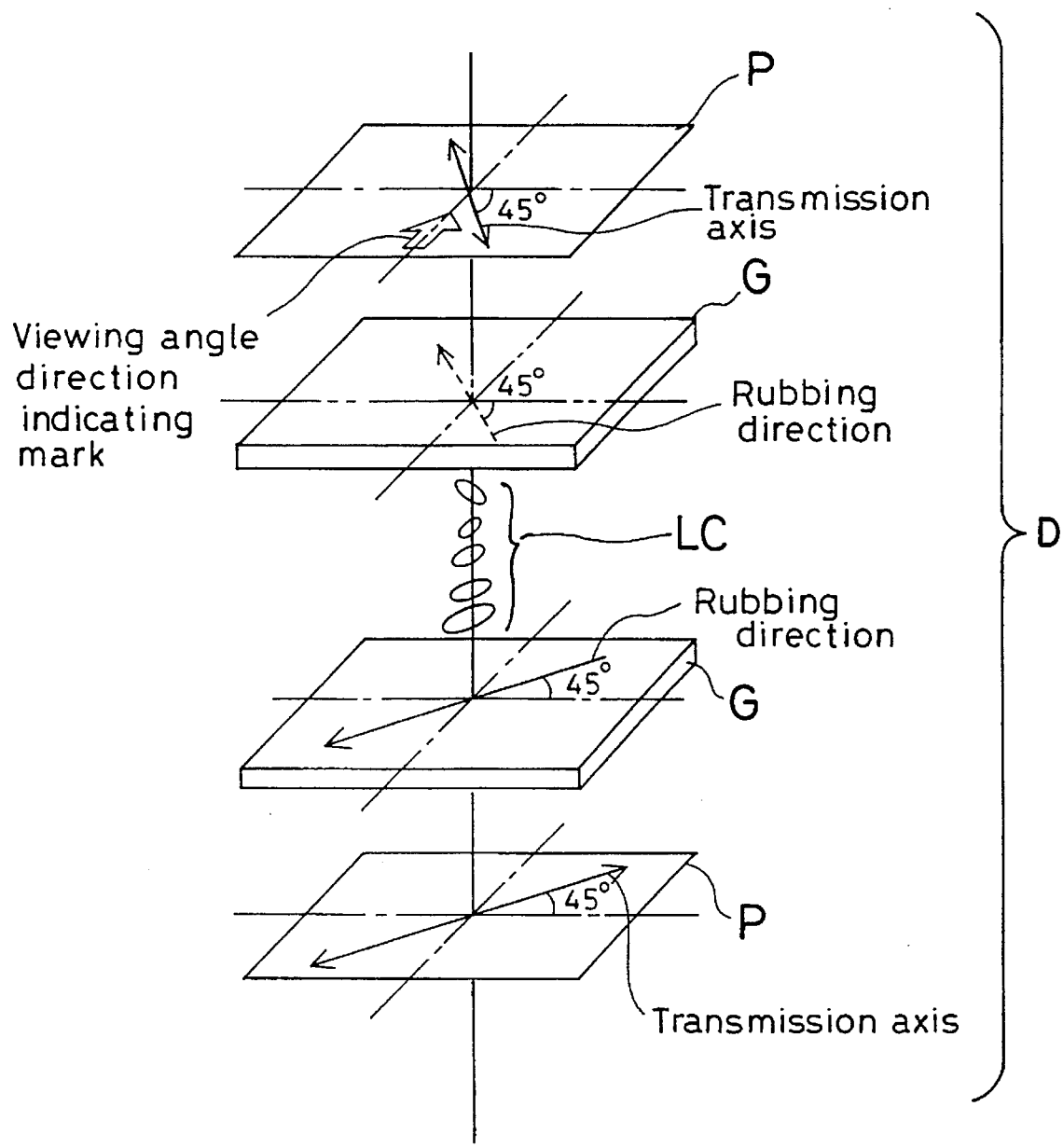
FIG. 14 is an exploded perspective view of the other of a pair of positive type liquid crystal shutters.
Figure 15A:
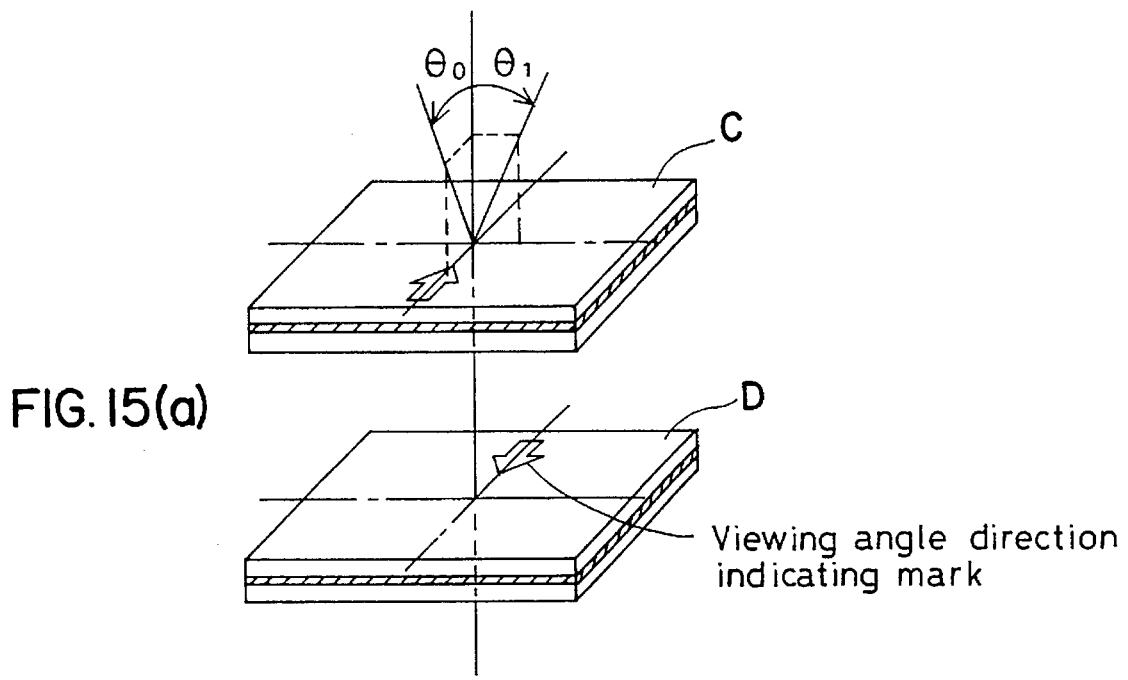
FIGS. 15(a) and 15(b) show a way of stacking two liquid crystal shutters.
Figure 15B:
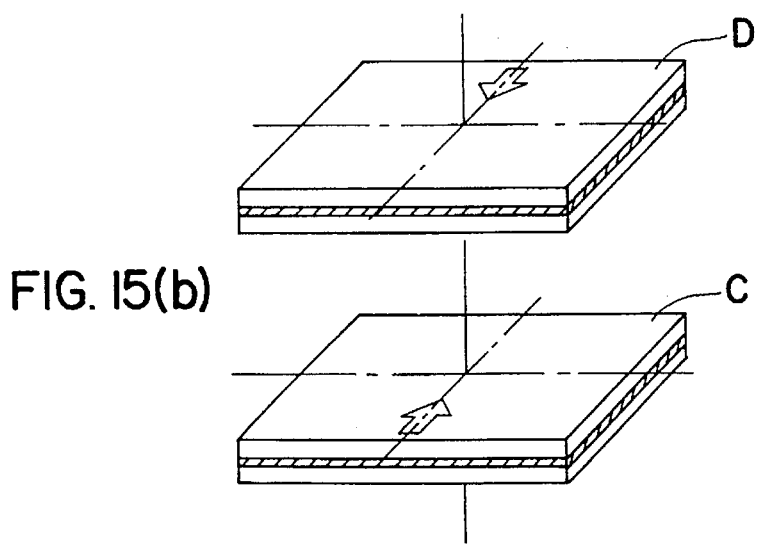

Two different types of TN liquid crystal shutter C and D are prepared which have the same 6-hour viewing angle direction but are 90° different from each other in terms of the transmission axes of polarizing plates P attached thereto, as shown in the exploded perspective views of FIGS. 13 and 14. These liquid crystal shutters may be stacked in either of the following two ways:

(1) The liquid crystal shutters C or D are stacked in reverse relation to each other in terms of the vertical direction in which the viewing angle characteristics are asymmetric, as shown in FIGS. 15(a) or 15(b).

Figure 16A:
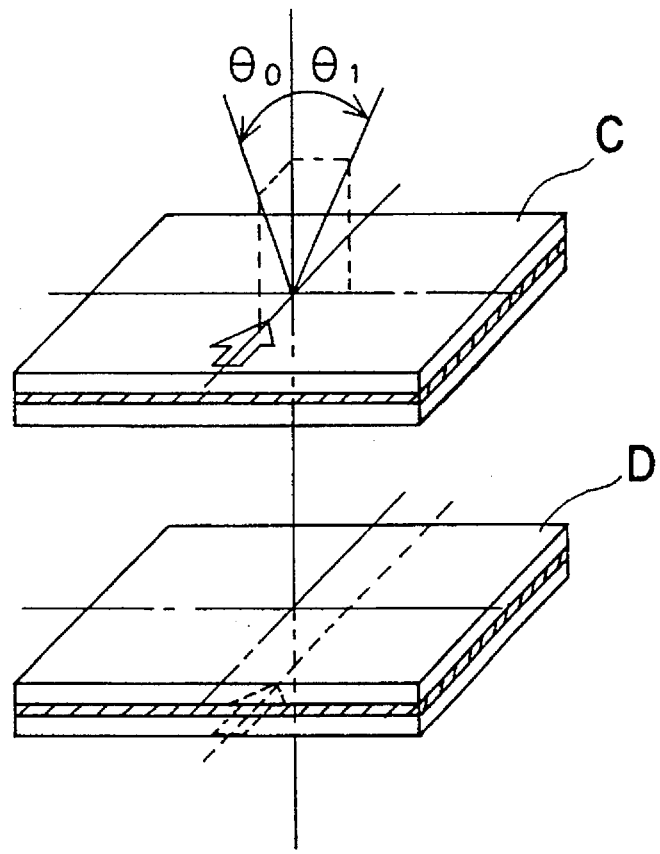
FIGS. 16(a) and 16(b) show another way of stacking two liquid crystal shutters.
Figure 16B:
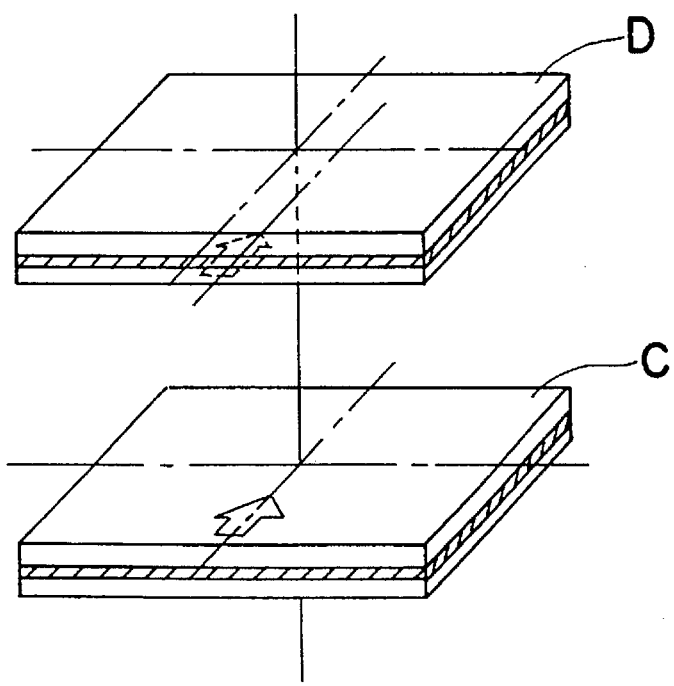

(2) The liquid crystal shutters C and D are stacked with one of them turned upside down about an axis of rotation which lies in the vertical direction in which the viewing angle characteristics are asymmetric, as shown in FIG. 16(a) or 16(b).

In these arrangements, when a liquid crystal shutter 1' (liquid crystal shutter C or D) and a liquid crystal shutter 2' (liquid crystal shutter D or C) are stacked, the transmission axes of two polarizing plates P which are adjacent to each other in the center of the stack lie in the same direction, as shown in FIG. 17. In these figures, glass substrates of the liquid crystal shutters are denoted by G, and a liquid crystal molecular layer is denoted by LC.

With such an arrangement, the characteristics of relationship between the viewing angle and opacity when the shutter is opaque are approximately symmetric in both the vertical direction (viewing angle $\Theta_0$) and the horizontal direction (viewing angle $\Theta_1$), as shown exemplarily in FIG. 18. In addition, the range in which the opacity is favorable becomes wider than in the case of a single liquid crystal shutter.

Thus, the viewing angle characteristics in both the vertical and horizontal directions are made approximately symmetric by stacking two liquid crystal shutters having the same viewing angle direction in reverse relation to each other in terms of the viewing angle direction, or by stacking two liquid crystal shutters having the same viewing angle direction such that one of the shutters is rotated through 180° about an axis lying in the viewing angle direction and this shutter is laid on the upper or lower side of the other shutter in upside down relation to each other. Accordingly, it is possible to minimize the restriction on the angle at which the liquid crystal shutter is installed with respect to the observer's eye, and it is also possible to increase the effective viewing angle range available when the shutter is opaque. Embodiments of a head-mounted display that employs a liquid crystal shutter having the above-described characteristics will be explained below.

Figure 19A:
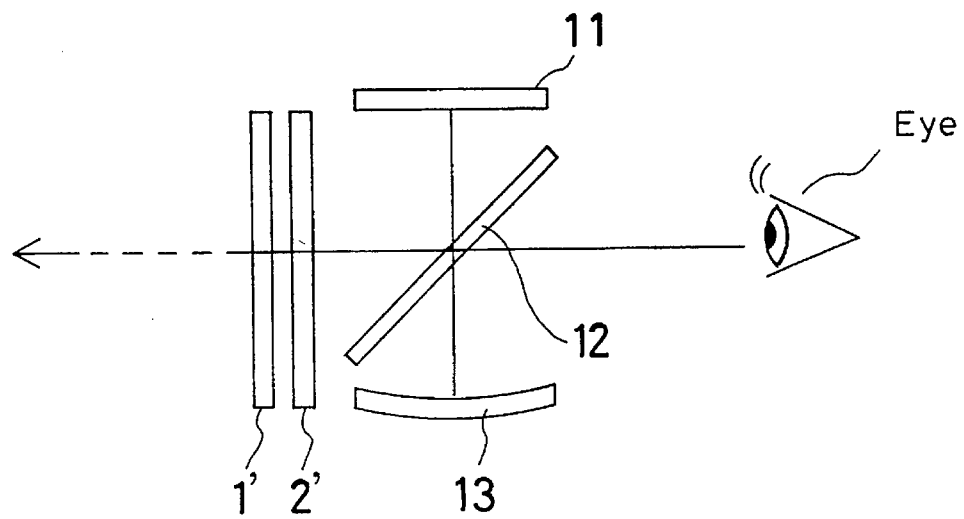
FIGS. 19(a) and 19(b) show a typical arrangement of a head-mounted display according to a fifth embodiment of the present invention.
Figure 19B:
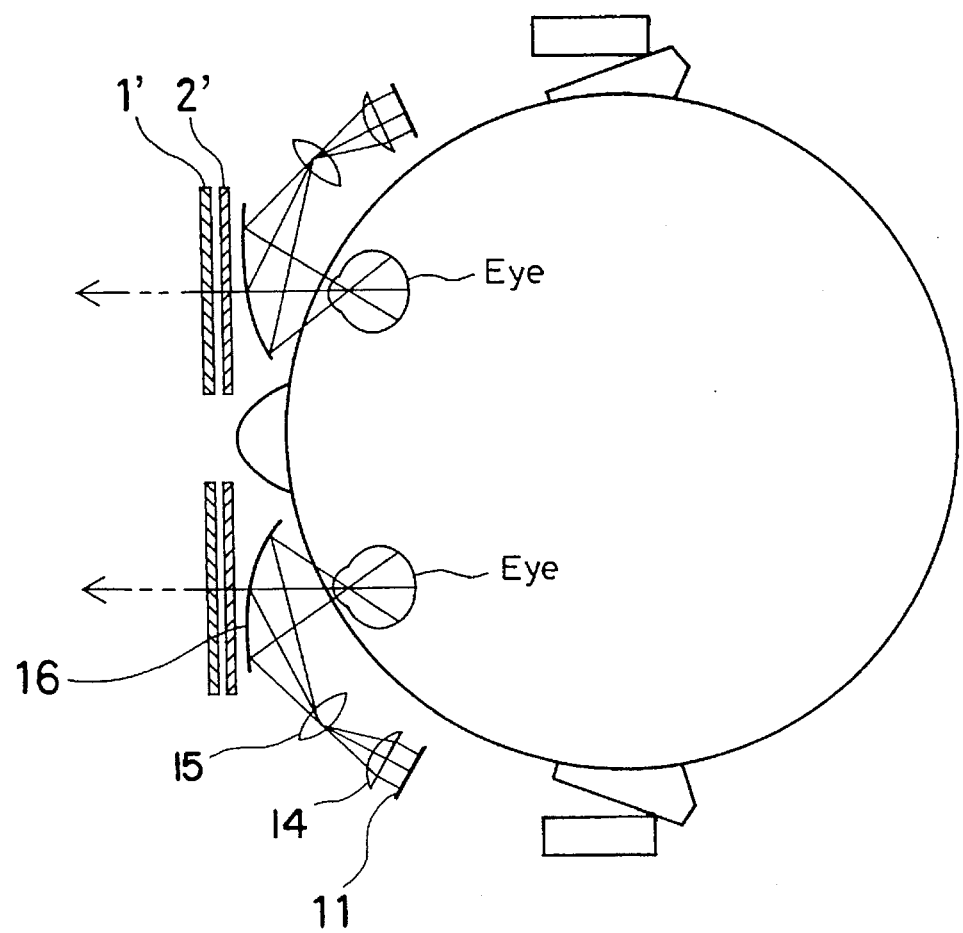

The head-mounted display of embodiment 5 is typically arranged as shown in FIG. 19. In the arrangement shown in FIG. 19(a), display light from an electronic image of a two-dimensional display device 11, which is disposed outside the visual field, is first transmitted by a half-mirror 12, which is obliquely disposed in front of the observer's eye, and the transmitted light is reflected by a concave mirror 13, which is disposed to face the two-dimensional display device 11 across the half-mirror 12. Then, the reflected light is reflected by the half-mirror 12 so as to be led to the eye as an enlarged electronic image. In order to prevent the outside light from entering the eye through the half-mirror 12 during observation of the electronic image, a shutter which comprises liquid crystal shutters 1' and 2' as described above is disposed in front of the half-mirror 12. The transparent and opaque conditions of the shutter are changed over from one to the other in such a way that when the electronic image is to be viewed, the shutter is made opaque, whereas, when an outside image is to be viewed, the shutter is made transparent. In the arrangement shown in FIG. 19(b), display light from an electronic image of a two-dimensional display device 11, which is disposed outside the visual field, is made incident on a concave half-mirror 16, which is disposed in front of each of the user's right and left eyes, through lenses 14 and 15, and the incident light is reflected by the concave half-mirror 16 so as to be led to the eye as an enlarged electronic image. In the same way as in the arrangement shown in FIG. 19(a), a shutter comprising liquid crystal shutters 1' and 2' as described above is disposed in front of the concave half-mirror 16 in order to prevent the outside light from entering the eye through the concave half-mirror 16 during observation of the electronic image. When the electronic image is to be viewed, the shutter is made opaque, whereas, when the outside image is to be viewed, the shutter is made transparent.

The liquid crystal shutters 1' and 2' are formed by using a twisted nematic (TN) liquid crystal or a super-twisted nematic (STN) liquid crystal. The liquid crystal shutters 1' and 2' are positive type liquid crystal shutters each having a display cell which comprises a solid cell (the whole comprises a single cell). As the liquid crystal shutters 1' and 2', two liquid crystal shutters which have the same viewing angle direction but are 90° different from each other in terms of the transmission axes of polarizing plates P attached thereto (see FIGS. 13 and 14) are used, and these liquid crystal shutters are stacked in reverse relation to each other in terms of the viewing angle direction (see FIG. 15). Alternatively, the two liquid crystal shutters are stacked in upside-down relation to each other (see FIG. 16). With such an arrangement, the range in which the opacity is favorable is approximately symmetric in both the vertical and horizontal directions, and at the same time it becomes wider than in the case of a single liquid crystal shutter, as described above.

With the above-described arrangement, the liquid crystal shutters 1' and 2' can be disposed perpendicularly to the line of sight of the eye when seeing forward. Accordingly, it is possible to reduce the overall size of the display body.

With regard to the direction of the liquid crystal shutters 1' and 2' with respect to the eye, since the horizontal field angle of the eye is wider than the vertical field angle, it is preferable to dispose the liquid crystal shutters 1' and 2' so that either the vertical or horizontal direction thereof in which the viewing angle range where the opacity is favorable is wider than that in the other is coincident with the horizontal field angle direction of the eye. However, the present invention is not necessarily limited thereto.

In addition, when two liquid crystal shutters are stacked to form a shutter, the opacity of the resulting shutter when opaque increases. Therefore, it becomes unlikely that the outside image will be seen through superimposed on the electronic image when the shutter is made opaque.

Further, even if pinholes are present in two shutter units constituting the liquid crystal shutter, the probability that the pinholes will coincide with each other when the two shutter units are stacked is low. Accordingly, the presence of pinholes causes no problem.

Although in this embodiment the stack of liquid crystal shutters is disposed perpendicularly to the line of sight of the eye, it may be tilted from the perpendicular position. However, when the stack of liquid crystal shutters is tilted, it must be disposed so that the angle at which the eye views the liquid crystal shutter will not exceed the viewing angle range of the liquid crystal shutter in which a favorable opaque condition is obtainable.

Further, in this embodiment, the display cell is a single solid cell and hence driven statically. Accordingly, the opacity can be raised higher than in the case of a display cell which is driven dynamically, which is another advantageous feature of this embodiment.

Although in this embodiment two liquid crystal shutters are stacked, three or more liquid crystal shutters may be stacked. In such a case, a higher opacity can be obtained, and the viewing angle range in which the opacity is favorable further enlarges.

Although the thickness of the liquid crystal shutter increases correspondingly to the number of shutters stacked, since there is no change in the surface size, the thickness cannot be a factor against the reduction in overall size of the head-mounted display body.

Further, when it is intended to form a single, continuous liquid crystal shutter for both the right and left eyes, since the liquid crystal shutter can be disposed perpendicularly to the line of sight of the eye when seeing forward, it is possible to achieve a reduction in the overall size of the head-mounted display body with ease, which is a great merit of the present invention.

Figure 20:
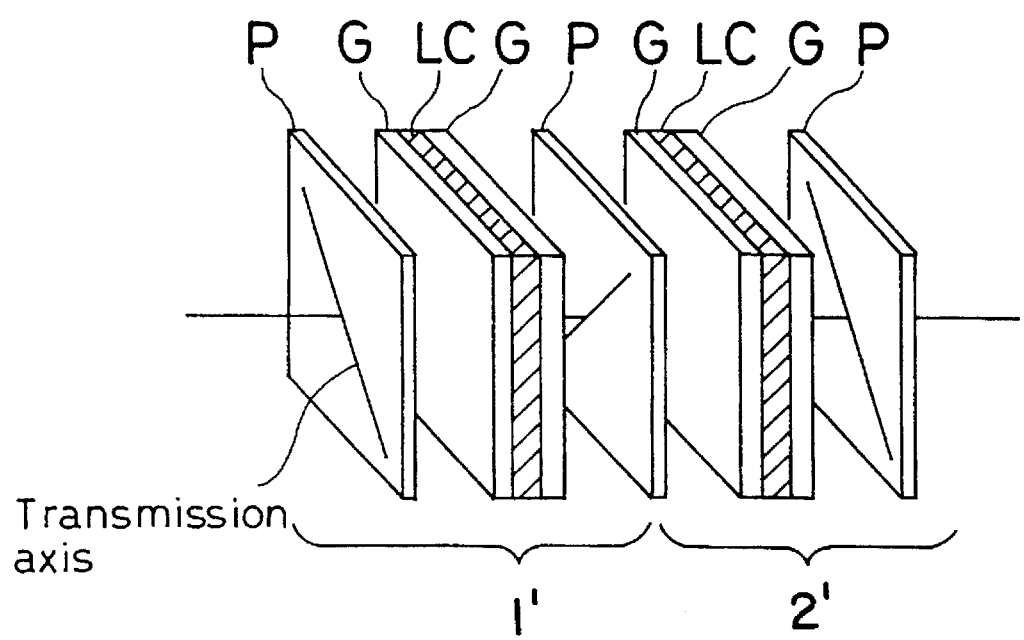
FIG. 20 shows the arrangement of a sixth embodiment of the present invention, in which the liquid crystal shutters in the fifth embodiment are modified.

Embodiment 6 of the present invention is a modification of the embodiment 5. Unlike the arrangement shown in FIG. 17, in which two liquid crystal shutters are stacked such that the transmission axes of two polarizing plates which are adjacent to each other in the center of the stack lie in the same direction, the embodiment 6 is arranged such that a single polarizing plate is disposed in between the two liquid crystal shutters in place of the two adjacent polarizing plates in the center of the stack of two liquid crystal shutters, as shown in FIG. 20, thereby comprising the whole arrangement of the following elements: polarizing plate P—glass substrate G—liquid crystal molecular layer LC—glass substrate G—polarizing plate P—glass substrate G—liquid crystal molecular layer LC—glass substrate G—polarizing plate P. In this arrangement also, when the outside image is to be viewed, the liquid crystal shutter is made transparent, whereas, when the electronic image is to be viewed, the liquid crystal shutter is made opaque. The other arrangements, functions and advantageous effects of this embodiment are the same as those in the embodiment 5. In this embodiment, however, since the number of polarizing plates used is smaller than that in the embodiment 5 by one, the transmittance of the shutter when transparent improves correspondingly, and the thickness of the shutter can also be reduced correspondingly.

Figure 21B:
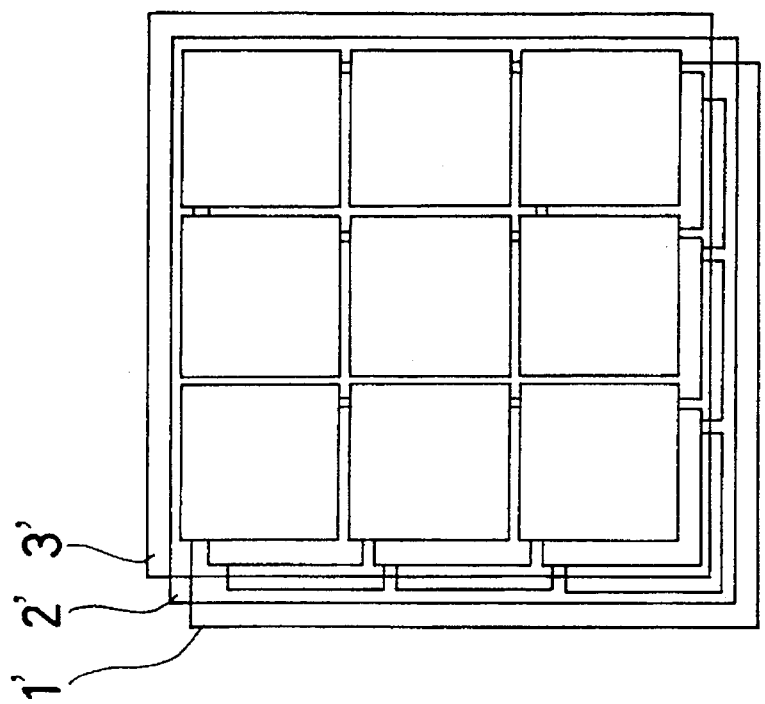
FIGS. 21(a) and 21(b) show a seventh embodiment of the present invention which uses a stack of liquid crystal shutter units having a matrix cell structure.
Figure 21A:
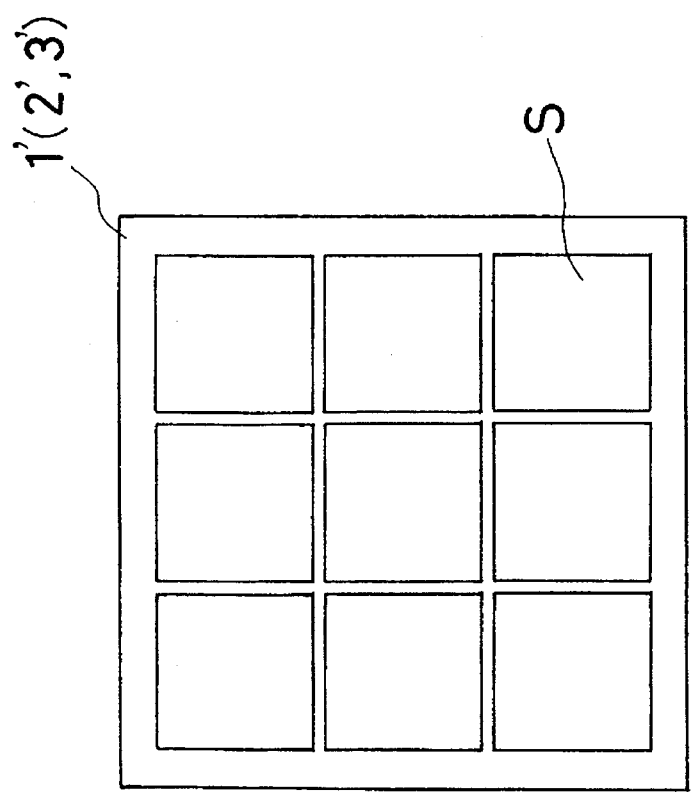

Embodiment 7 of the present invention is a modification of the embodiments 5 and 6, and it differs from the embodiments 5 and 6 in the arrangement of the cell part of the liquid crystal shutter. As shown in FIG. 21(a), each of the liquid crystal shutters 1' (2' and 3') which are to be stacked is comprised of a positive type liquid crystal shutter having cells S arranged in a matrix. Since the liquid crystal shutter is disposed close to the observer's eye, if a liquid crystal shutter having cells S arranged in a matrix as described above is used, the required opacity cannot be ensured for electrode lines between the cells S when the shutter is made opaque, so that there is a likelihood that the outside image will be seen through the electrode lines between the cells S, obstructing the vision of the electronic image. Therefore, the liquid crystal shutters 1', 2' and 3' are offset sideways with respect to each other so that the respective electrode lines will not lie one on top of another, thereby enabling the shutters to compensate for each other's incapability of intercepting light at the electrode lines. That is, as shown in FIG. 21(b), at least two liquid crystal shutters 1' and 2' which are stacked in reverse relation to each other in terms of the viewing angle direction are offset sideways with respect to each other. Alternatively, at least three liquid crystal shutters 1', 2' and 3', including two liquid crystal shutters stacked in upside down relation to each other, are stacked offset sideways with respect to each other. By doing so, the electrode portions of one shutter are covered by the cell portions of another. Hence, there is no portion where light cannot be intercepted. Thus, the range in which the opacity is favorable enlarges. In this arrangement also, when the outside image is to be viewed, the liquid crystal shutter is made transparent, whereas, when the electronic image is to be viewed, the liquid crystal shutter is made opaque. The other arrangements, functions and advantageous effects of this embodiment are the same as those in the embodiment 5.

Incidentally, in the case, for example, of a stack of two positive type liquid crystal shutters C and D as shown in FIG. 15(a), the transmittance-viewing angle characteristics of the shutter when opaque are such as those shown in FIG. 18. It will be understood from the figure that in a range where the viewing angles $\Theta_0$ and $\Theta_1$ are small, a sufficiently high opacity can be obtained in both the vertical and horizontal directions (i.e., the transmittance is sufficiently low).

Thus, even if a plurality of liquid crystal shutters are stacked, the viewing angle range where a favorable opaque condition is obtainable is actually about ±15° in terms of the viewing angles $\Theta_0$ and $\Theta_1$. Therefore, in the case of a head-mounted display having a structure in which a plurality of liquid crystal shutters 1' and 2' are disposed in front of the observer's face, as shown in FIG. 19, the outside observable range is about 30° in terms of the field angle.

However, if it is intended to make an electronic image displayed by a two-dimensional display device wide in field angle as in the case of wide vision and to enlarge the outside observable range correspondingly, that is, if it is intended to increase the field angle at which the outside image is observable, then no adequate opacity can be obtained at the peripheral region of the observation range. This problem arises due to the fact that at the peripheral region of the outside image the viewing angles $\Theta_0$ and $\Theta_1$ exceed the viewing angle range in which a favorable opaque condition of the liquid crystal shutters 1' and 2' is obtainable.

Accordingly, the following embodiments 8 to 10 of the present invention are designed to enlarge the viewing angle range in which a favorable opaque condition is obtainable. The basic principle of the embodiments 8 to 10 is as follows: A liquid crystal shutter that is employed for a head-mounted display is curved or comprised of a plurality of flat liquid crystal shutters which are connected to each other in such a manner as to bend through joints so that the angle between the line of sight and the line normal to the liquid crystal shutter at a point where the line of sight intersects the liquid crystal shutter, that is, at least either of the viewing angles $\Theta_0$ and $\Theta_1$ in the vertical and horizontal directions, is made smaller than in the case of a single flat liquid crystal shutter, thereby preventing the viewing angle from exceeding the viewing angle range where a favorable opaque condition of the liquid crystal shutter is obtainable even at the peripheral region of the observation range.

Figure 22:
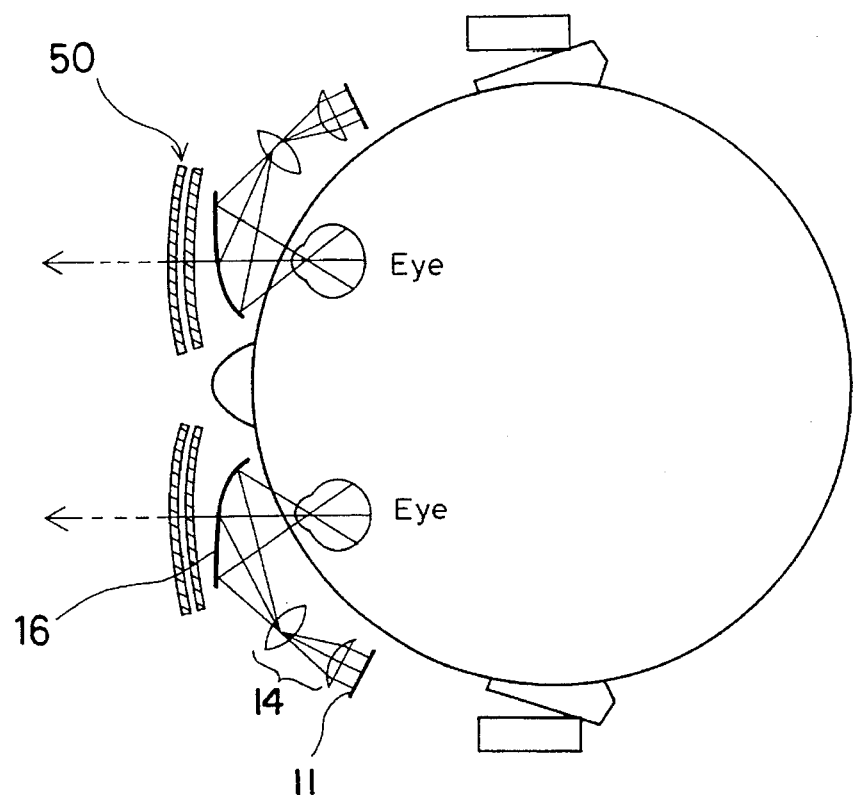
FIG. 22 is a plan view of a head-mounted display according to a eighth embodiment of the present invention.

FIG. 22 is a plan view of the head-mounted display according to the embodiment 8. In the same way as in the conventional display, light from electronic images displayed on a pair of left and right two-dimensional display devices 11, e.g., liquid crystal display devices, is transmitted by respective lens systems 14 and then reflected by respective concave half-mirrors 16, which are eccentrically disposed, so as to be led to the user's left and right eyes. In addition, light from an outside image is led to the left and right eyes through the respective concave half-mirrors 16, thereby being displayed superimposed on the electronic image as a composite image. Alternatively, the outside image alone is viewed by turning off the display of the two-dimensional display devices 11, or the electronic image is selectively displayed by intercepting the outside light by a pair of left and right liquid crystal shutters 50 disposed in front of the concave half-mirrors 16. In this embodiment, each liquid crystal shutter 50 comprises a stack of two positive type liquid crystal shutters, as shown in FIG. 13 and 14. That is, two positive type liquid crystal shutters, which have the same viewing angle direction but are 90° different from each other in terms of the transmission axes of two polarizing plates attached thereto, are stacked in reverse relation to each other in terms of the viewing angle direction or in upside relation to each other. When the outside image is to be viewed, the liquid crystal shutter 50 is made transparent, whereas, when the electronic image is to be viewed, the liquid crystal shutter 50 is made opaque.

Each liquid crystal shutter used to constitute the liquid crystal shutter 50 is a film liquid crystal shutter formed by using, for example, a plastic film which is unbreakable even if it is bent, and it is bent in the shape of such a curved surface that among angles made between the line of sight and the line normal to the liquid crystal shutter at a point where the line of sight intersects the liquid crystal shutter, at least either the viewing angle $\Theta_0$ in the vertical direction or the viewing angle $\Theta_1$ in the horizontal direction is smaller than in the case of a single flat liquid crystal shutter. In the arrangement shown in FIG. 22, each liquid crystal shutter is bent in the shape of a cylindrical surface which is curved in the horizontal direction so that the center of curvature lies on the user's head side as in the case of wide vision. With such a surface configuration, the viewing angles $\Theta_0$ and $\Theta_1$ can be reduced and adjusted so as not to exceed the viewing angle range where a favorable opaque condition of the liquid crystal shutter 50 is obtainable. It should be noted that the surface configuration is not necessarily limited to the above and that each liquid crystal shutter may also be curved in the vertical direction.

Although in the above-described embodiment the liquid crystal shutter 50 comprises a stack of two liquid crystal shutters, it may comprise only one liquid crystal shutter if the curved configuration and installation condition of the liquid crystal shutter 50 can be adjusted so that the viewing angles $\Theta_0$ and $\Theta_1$ fall within the viewing angle range of the liquid crystal shutter and the whole outside observable range can be sufficiently screened from light with only one liquid crystal shutter. Further, the liquid crystal shutter 50 may also comprise a stack of three or more liquid crystal shutters. It is also possible to employ a single negative type liquid crystal shutter or a stack of a plurality of negative type liquid crystal shutters in place of positive type liquid crystal shutters.

In this embodiment, since the liquid crystal shutter 50 is formed by using plastic film, the shutter can be reduced in both thickness and weight in comparison to the conventional liquid crystal shutter that use a glass plate. Further, since the liquid crystal shutter 50 can be formed in a curved configuration, the display can be made compact. It should be noted that the material of the liquid crystal shutter 50 need not be limited to a plastic material and that it is possible to use any material which can be curved. A curved glass plate may also be used.

Figure 23:
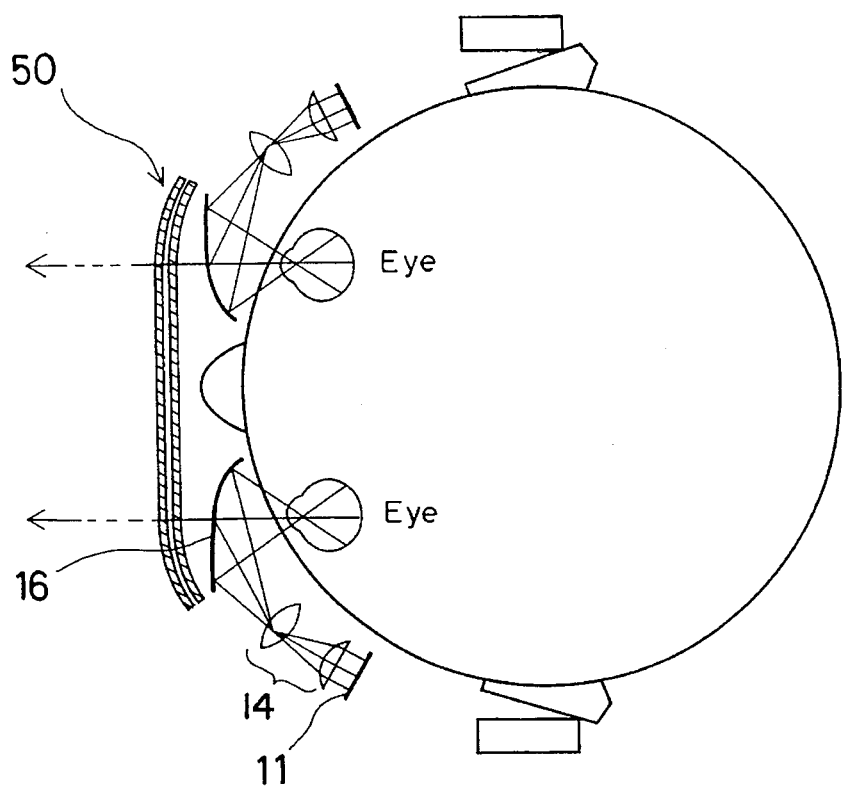
FIG. 23 is a plan view of a ninth embodiment of the present invention, which is a modification of the embodiment shown in FIG. 22.

FIG. 23 shows embodiment 9 of the present invention, which is a modification of the embodiment shown in FIG. 22. In the embodiment 9, a single liquid crystal shutter 50 which is common to the user's left and right eyes is used instead of disposing the liquid crystal shutter 50 for each of the left and right eyes. In this case also, the liquid crystal shutter 50 is formed in such a curved configuration that among angles made between the line of sight of each of the user's left and right eyes and the line normal to the liquid crystal shutter 50, at least either the viewing angle $\Theta_0$ in the vertical direction or the viewing angle $\Theta_1$ in the horizontal direction is smaller than in a case where a single flat liquid crystal shutter is employed as the liquid crystal shutter 50. In the arrangement shown in FIG. 23, the liquid crystal shutter 50 is curved at each end thereof in the horizontal direction so that the center of curvature lies on the user's head side.

Figure 24:
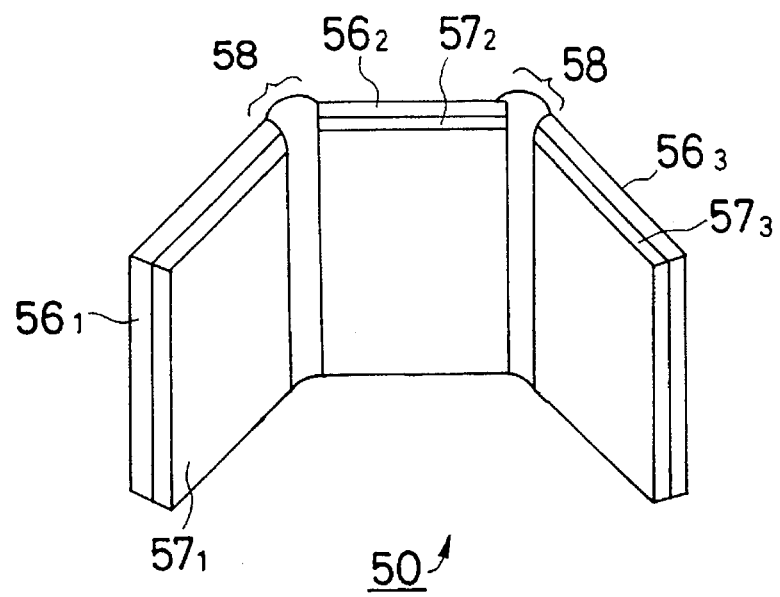
FIG. 24 is a perspective view of a liquid crystal shutter which is employed in a tenth embodiment of the present invention.
Figure 25:
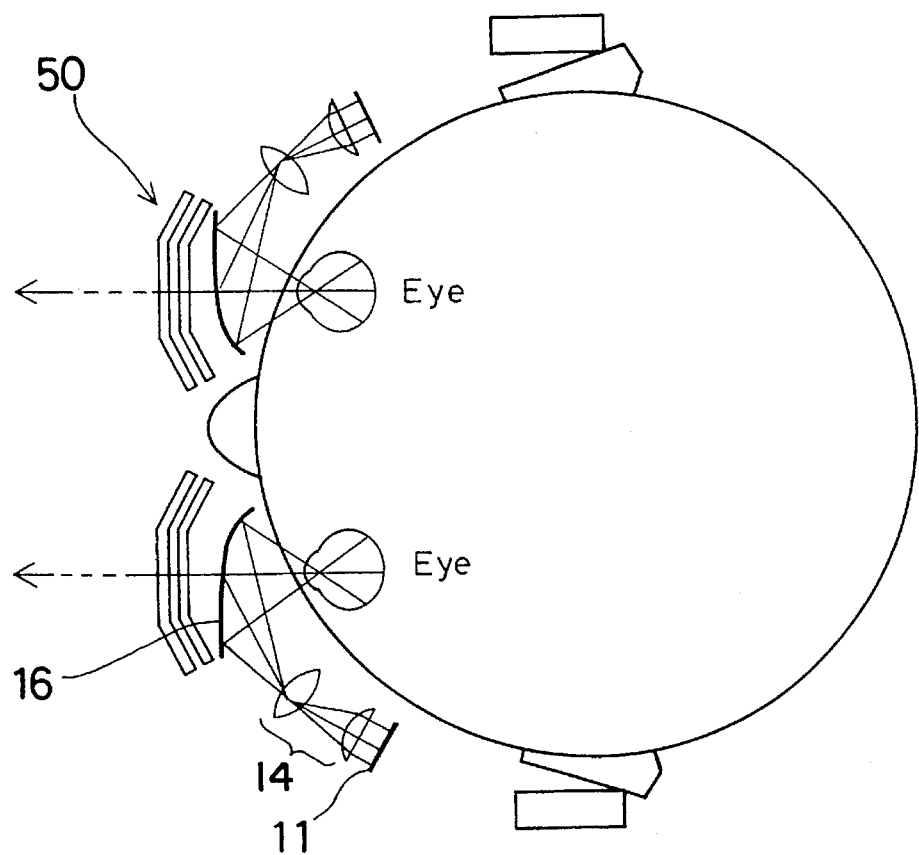
FIG. 25 is a plan view of the tenth embodiment.

FIG. 24 is a perspective view of a liquid crystal shutter 50 that is employed in embodiment 10 of the present invention. In this embodiment, the liquid crystal shutter 50 comprises a stack of two bent shutters each formed by connecting together three flat liquid crystal shutters $56_1$ to $56_3$ ($57_1$ to $57_3$) in such a manner that these shutters are bent through joints 58. As shown in FIG. 25, the liquid crystal shutter 50 is installed in front of a concave half-mirror 16 for each of the user's left and right eyes. The joints 58 must be formed using a light-screening material. The joints 58 are made as thin as possible so as not to obstruct the vision of the observed image. If the liquid crystal shutter 50 is disposed so close to each eye that the eye cannot be focused on the liquid crystal shutter surface, the joints 58 themselves cannot obstruct the visual field.

In this embodiment also, each liquid crystal shutter 50 comprises a stack of two positive type liquid crystal shutters which have the same viewing angle direction but are 90° different from each other in terms of the transmission axes of two polarizing plates attached thereto. These two liquid crystal shutters are stacked in reverse relation to each other in terms of the viewing angle direction or in upside down relation to each other. When the outside image is to be viewed, the shutter 50 is made transparent, whereas, when the electronic image is to be viewed, the shutter 50 is made opaque.

If the liquid crystal shutter 50, shown in FIG. 24, is disposed for each of the user's left and right eyes, as shown in FIG. 25, angles $\Theta_0$ and $\Theta_1$ made between the line of sight and the line normal to the liquid crystal shutter 50 at a point where the line of sight intersects the liquid crystal shutter 50 will not become large even at the peripheral region of the observable range of the outside image and hence can be adjusted so as not to exceed the viewing angle range in which a favorable opaque condition of the liquid crystal shutter 50 is obtainable.

Although in this embodiment also the liquid crystal shutter 50 comprises a stack of two liquid crystal shutters, it may comprise only one liquid crystal shutter if the installation condition of the liquid crystal shutter 50 can be adjusted so that the viewing angles $\Theta_0$ and $\Theta_1$ fall within the viewing angle range of the liquid crystal shutter and the whole outside observable range can be sufficiently screened from light with only one liquid crystal shutter. Further, the liquid crystal shutter 50 may also comprise a stack of three or more liquid crystal shutters. It is also possible to employ a single negative type liquid crystal shutter or a stack of a plurality of negative type liquid crystal shutters in place of positive type liquid crystal shutters.

Although in this embodiment three liquid crystal shutters are connected together to constitute each liquid crystal shutter 50, it should be noted that the number of liquid crystal shutters used is not necessarily limited to three and that two or four or more liquid crystal shutters may be used.

In the foregoing embodiments 1 to 10, a negative or positive type liquid crystal shutter is disposed to form either of two different types of head-mounted see-through display. In a comparison between positive and negative type liquid crystal shutters of 6-hour viewing angle in which the viewing angle direction is the 6-hour direction in terms of the transmittance of the shutters when opaque, the relationship between the viewing angle $\Theta_0$ in the vertical direction (the 12- to 6-hour direction) and the viewing angle $\Theta_1$ in the horizontal direction (the 3- to 9-hour direction) on the one hand and, on the other, transmittance of the positive type liquid crystal shutter is such as that shown in FIGS. 11 and 12, whereas the relationship between the viewing angles $\Theta_0$ and $\Theta_1$ and transmittance of the negative type liquid crystal shutter is such as that shown in FIG. 2. As will be clear from the figures, the positive type liquid crystal shutter has viewing angle dependence but exhibits a higher opacity than that of the negative type liquid crystal shutter in a small viewing angle range. On the other hand, the negative type liquid crystal shutter exhibits small viewing angle dependence.

Since there are two types of liquid crystal shutter having different characteristics as described above, two different types of head-mounted see-through display may be selectively used for each particular purpose. For example, if the user uses a head-mounted display as a terminal unit for seeing a design drawing at a construction site or the like or he or she uses it outdoors, for example, in a moving electric train or bus, it is preferable that the outside should also be seen through the shutter to a certain extent during the observation of the electronic image with a view to preventing danger and ensuring safety. Accordingly, a head-mounted see-through display that incorporates a positive type liquid crystal shutter, in which the opacity is low in the peripheral region of the electronic image, is suitable for such use application.

On the other hand, if a head-mounted see-through display is to be used indoors as a display for audio-visual equipment, for example, it is preferable that the outside should not be seen through the shutter during the observation of the electronic image with a view to enabling the display to be used for the electronic image intensively. Accordingly, a head-mounted see-through display that incorporates a negative type liquid crystal shutter, in which the opacity does not lower even at the peripheral region of the electronic image, is suitable for such use application.

However, the user of the conventional head-mounted display must select either of the two different types of display according to each use application, and it has heretofore been impossible to give a single head-mounted display the characteristics of both the two types of display.

Incidentally, when the shutter comprises a single liquid crystal shutter, the opacity may be insufficient. In such a case, if a stack of a plurality of liquid crystal shutters is used as in the embodiments 2 to 10, the effective viewing angle range of the shutter when opaque increases and, at the same time, the opacity rises in comparison to the shutter comprising a single liquid crystal shutter. Accordingly, it becomes more unlikely that the outside image will be seen through the shutter. When the viewing angle range is small, the positive type liquid crystal shutter is superior to the negative one in the opacity. However, as the viewing angle range enlarges, the opacity lowers to some extent. On the other hand, the negative type liquid crystal shutter exhibit small viewing angle dependence.

It may be considered that many of displays that incorporate a stack of two liquid crystal shutters are intensively used for the electronic image because of the characteristics that the stack of two liquid crystal shutters is superior in opacity to a single liquid crystal shutter.

In the case of a stack of two liquid crystal shutters also, two different types of head-mounted see-through display are available. When the electronic image is viewed (i.e., the liquid crystal shutter is opaque), there will be the following difference in characteristics between head-mounted displays respectively incorporating two different types of liquid crystal shutter, depending upon the service environment:

If a head-mounted display that incorporates positive type liquid crystal shutters is used in an environment where the whole outside is uniformly bright, the outside image may be seen through the peripheral region of the electronic image. In the case of a head-mounted display that incorporates negative type liquid crystal shutters, if an object of high luminance is present in the outside, it may be seen through the shutters.

Thus, depending upon the kind of electronic image under observation by the user of the head-mounted display, the electronic image may be difficult to view or obstructed by the outside image.

In this case also, the user of the conventional head-mounted display must select either of the two different types of display according to each use application, and it has heretofore been impossible to give a single head-mounted display the characteristics of both the two types of display.

Accordingly, the present invention makes it possible to use either a positive or negative type liquid crystal shutter which is the most suitable for a particular use application or service environment by changing over the two difference types of liquid crystal shutter from one to the other.

Figure 26:
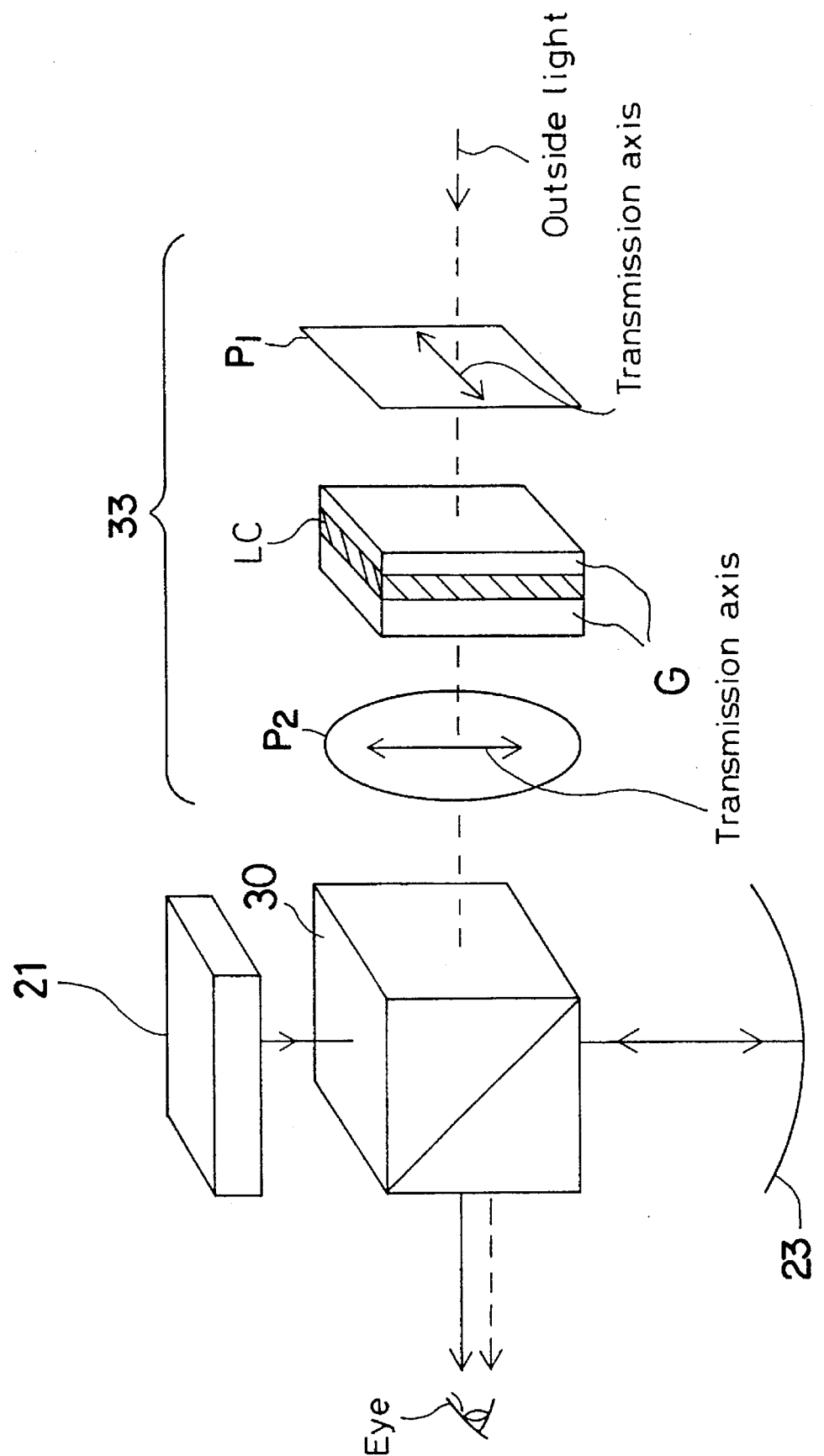
FIG. 26 is a perspective view showing the arrangement of a head-mounted display according to an eleventh embodiment of the present invention.

FIG. 26 is a perspective view of embodiment 11 of the present invention, showing the arrangement of a head-mounted see-through display that employs a shutter comprising a single liquid crystal shutter. The display of this embodiment basically comprises a beam splitter (hereinafter referred to as "BS") 30 disposed in front of the observer's eye, a two-dimensional display device 21, e.g., a liquid crystal display device, which is disposed above the top of the BS 30 outside the visual field so as to extend substantially along the line of sight of the eye, a concave mirror 23 disposed to face the two-dimensional display device 21 across the BS 30, and a liquid crystal shutter 33 disposed in front of the BS 30 forwardly thereof as viewed in the direction of the line of sight. In this arrangement, the eye views an image of the two-dimensional display device 21 through an optical path in which light from the two-dimensional display device 21 is first transmitted by the BS 30 and reflected by the concave mirror 23 and then reflected by the BS 30. Since the concave mirror 23 is disposed in the optical path, an electronic image displayed by the two-dimensional display device 21 can be viewed as an enlarged image. Such an optical system is disposed for each of the observer's left and right eyes.

When the electronic image alone is to be viewed, the liquid crystal shutter 33 is made opaque. On the other hand, when the outside image alone is to be viewed, the display of the electronic image by the two-dimensional display device 21 is turned off, and the liquid crystal shutter 33 is made transparent. If the display of the electronic image is not turned off at this time, both the outside and electronic images can be observed simultaneously.

Incidentally, the liquid crystal shutter 33 comprises a liquid crystal molecular layer LC disposed between a pair of glass substrates G, and two polarizing plates respectively disposed at the outer sides of the glass substrates G. Of the two polarizing plates, one polarizing plate $P_1$ is fixedly attached to one glass substrate G, whereas the other polarizing plate $P_2$ is rotatable 90° about the optical axis. The rotation of the polarizing plate $P_2$ may be made, for example, by a manual operation using a projection provided on a part of the outer periphery of the polarizing plate $P_2$. Alternatively, the polarizing plate $P_2$ may be rotated by a geared motor through gear teeth cut in the entire outer periphery of the polarizing plate $P_2$. Thus, the rotation of the polarizing plate $P_2$ may be made by any of mechanical and electrical methods.

If the user uses this head-mounted display as a terminal unit to see a design drawing at a construction site or the like and hence it is necessary for the outside to be also seen through the shutter 33 to a certain extent during the observation of the electronic image for the purpose of preventing danger and ensuring safety, he or she uses the liquid crystal shutter 33 as a positive type liquid crystal shutter, in which the transmission axes of the two polarizing plates $P_1$ and $P_2$ are perpendicular to each other. If it is preferable that the outside should not be seen through the shutter 33 during the observation of the electronic image, the user uses the liquid crystal shutter 33 as a negative type liquid crystal shutter, in which the transmission axes of the two polarizing plates $P_1$ and $P_2$ are parallel to each other.

Thus, the liquid crystal shutter 33 can be used as the most suitable type of shutter for each particular use application.

It should be noted that the substrates G are not necessarily limited to glass and that films of a plastic material, for example, may be used as the substrates G. In addition, the transmission axis of the fixed polarizing plate $P_1$ is not necessarily limited to the direction as shown in FIG. 26, but it may lie in any direction. Further, either of the two polarizing plates, which are respectively close to and remote from the BS 30, may be defined as a fixed polarizing plate.

Figure 27:
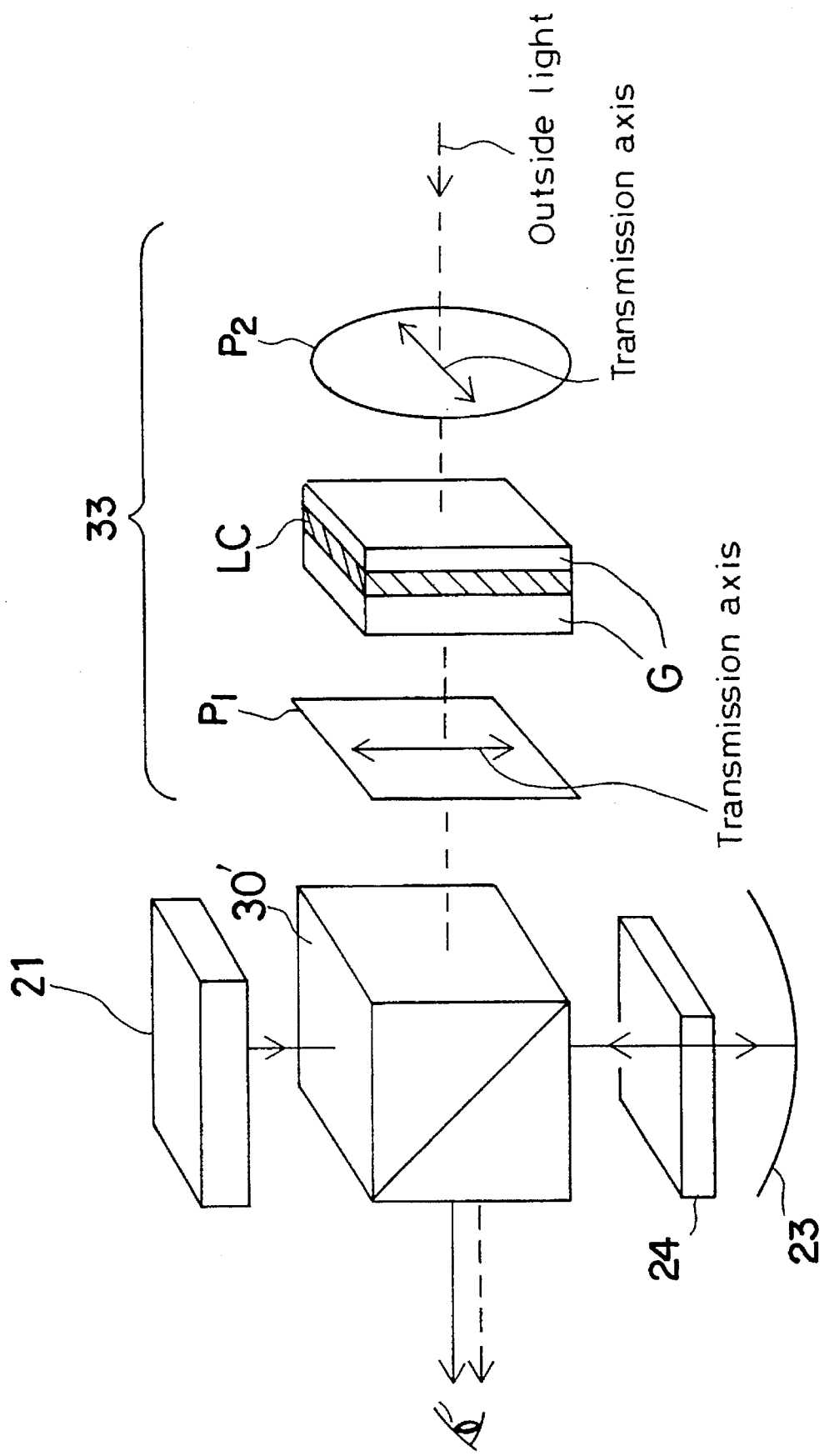
FIG. 27 is a perspective view showing the arrangement of a modification of the eleventh embodiment.

In this embodiment, a polarization beam splitter (hereinafter referred to as "PBS") 30' may be used in place of the BS 30, as shown in the perspective view of FIG. 27. In this case, the rotatable polarizing plate $P_2$ is restricted to the polarizing plate that is remote from the PBS 30'. The transmission axis of the fixed polarizing plate $P_1$ needs to be parallel to the plane of incidence of light on the PBS 30', as shown in FIG. 27. In this case, a quarter-wave plate λ/4 24 is disposed in between the PBS 30' and the concave mirror 23 to rotate the plane of polarization through 90° so that light from the two-dimensional display device 21 that passes through the PBS 30' is reflected by the PBS 30' after being reflected by the concave mirror 23.

Figure 28:
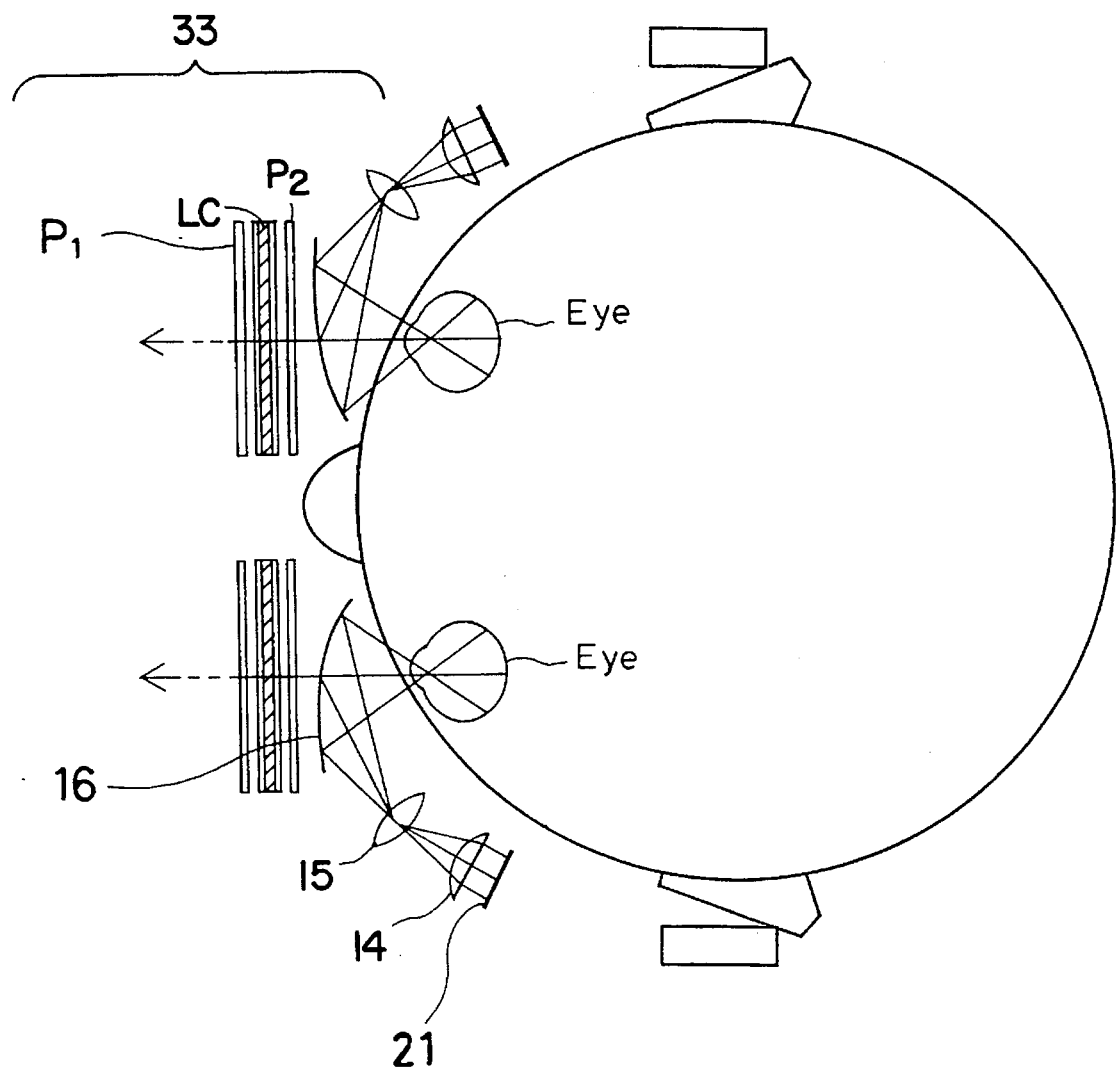
FIG. 28 is a sectional view showing the arrangement of another modification of the eleventh embodiment.

Further, the optical system for viewing the electronic image as an enlarged image is not necessarily limited to those shown in FIGS. 26 and 27, but various other optical systems may be effectively used, as a matter of course. For example, an optical system such as that shown in the sectional view of FIG. 28 may also be used. That is, an image of a two-dimensional display device 21, which is disposed outside the visual field, is projected on the observer's eye as an enlarged image by a concave half-mirror 16, which is disposed in front of each of the observer's left and right eyes, through lenses 14 and 15. A liquid crystal shutter 33 which is similar to the above is disposed in front of the concave half-mirror 16. In this case, the transmission axis of the fixed polarizing plate $P_1$ may lie in any direction. In addition, either of the two polarizing plates, which are respectively close to and remote from the concave half-mirror 16, may be defined as a fixed polarizing plate.

Next, embodiment 12 of the present invention will be explained with reference to FIG. 29. This embodiment is a head-mounted see-through display which is improved in the opacity during the observation of the electronic image by using a stack of two liquid crystal shutters. The basic arrangement is the same as that shown in FIG. 26. The embodiment 12 differs from the embodiment 11, shown in FIG. 26, only in that the liquid crystal shutter, which is disposed in front of the BS 30 forwardly thereof as viewed in the direction of the line of sight, comprises two liquid crystal shutters 41 and 42. In this arrangement, the eye views an image of the two-dimensional display device 21 through an optical path in which light from the two-dimensional display device 21 is first transmitted by the BS 30 and reflected by the concave mirror 23 and then reflected by the BS 30. Since the concave mirror 23 is disposed in the optical path, an electronic image displayed by the two-dimensional display device 21 can be viewed as an enlarged image. Such an optical system is disposed for each of the observer's left and right eyes.

When the electronic image alone is to be viewed, the liquid crystal shutter, which comprises a combination of two liquid crystal shutters 41 and 42, is made opaque. On the other hand, when the outside image alone is to be viewed, the display of the electronic image by the two-dimensional display device 21 is turned off, and the combined liquid crystal shutter is made transparent. If the display of the electronic image is not turned off at this time, both the outside and electronic images can be observed simultaneously.

In this embodiment, the liquid crystal shutters 41 and 42 are stacked so that the viewing angle dependence is minimized, by either of the following two methods:

(1) The two liquid crystal shutters 41 and 42 are stacked in reverse relation to each other in terms of the viewing angle direction (see FIGS. 5 and 15).

(2) The two liquid crystal shutters 41 and 42 are stacked in such a manner that one of them is rotated through 180° about an axis lying in the viewing angle direction and this shutter is laid on the upper or lower side of the other shutter in upside down relation to each other (see FIGS. 6 and 16).

The rotatable polarizing plate $P_2$, which is disposed in between the two liquid crystal shutters 41 and 42, comprises two polarizing plates which are sandwiched between the two shutters 41 and 42. Both the two polarizing plates are rotatable. The two polarizing plates $P_2$ may be replaced by a single rotatable polarizing plate. The rotation of each polarizing plate $P_2$ may be made, for example, by a manual operation using a projection provided on a part of the outer periphery of the polarizing plate $P_2$. Alternatively, the polarizing plate $P_2$ may be rotated by a geared motor through gear teeth cut in the entire outer periphery of the polarizing plate $P_2$. Thus, the rotation of the polarizing plate $P_2$ may be made by any of mechanical and electrical methods.

If the user uses this head-mounted display in an environment where the whole outside is uniformly bright, for example, he or she uses the liquid crystal shutter as a negative type liquid crystal shutter, in which the transmission axes of the rotatable polarizing plates $P_2$ are parallel to those of the fixed polarizing plates $P_1$. If an object of high luminance is present in the outside, the user uses the liquid crystal shutter as a positive type liquid crystal shutter, in which the transmission axes of the rotatable polarizing plates $P_2$ are perpendicular to those of the fixed polarizing plates $P_1$.

Thus, the liquid crystal shutter can be used as the most suitable type of liquid crystal shutter for the particular occasion whereby the vision of the electronic image is unlikely to be influenced by the outside environment. Accordingly, it becomes easier to view the electronic image.

It should be noted that the substrates G are not necessarily limited to glass and that films of a plastic material, for example, may be used as the substrates G. In addition, the transmission axis of each fixed polarizing plate $P_1$ is not necessarily limited to the direction shown in FIG. 29, but it may lie in any direction. Further, the illustrated positional relationship between the fixed and rotatable polarizing plates $P_1$ and $P_2$ may be reversed.

In this embodiment also, a polarization beam splitter (hereinafter referred to as "PBS") 30' may be used in place of the BS 30, as shown in the perspective view of FIG. 30, in the same way as in the case of FIG. 27. In this case, the rotatable polarizing plates $P_2$ are restricted to the polarizing plates that are sandwiched between the two liquid crystal shutters 41 and 42. The transmission axis of each fixed polarizing plate $P_1$ needs to be parallel to the plane of incidence of light on the PBS 30', as shown in FIG. 30.

Figure 29:
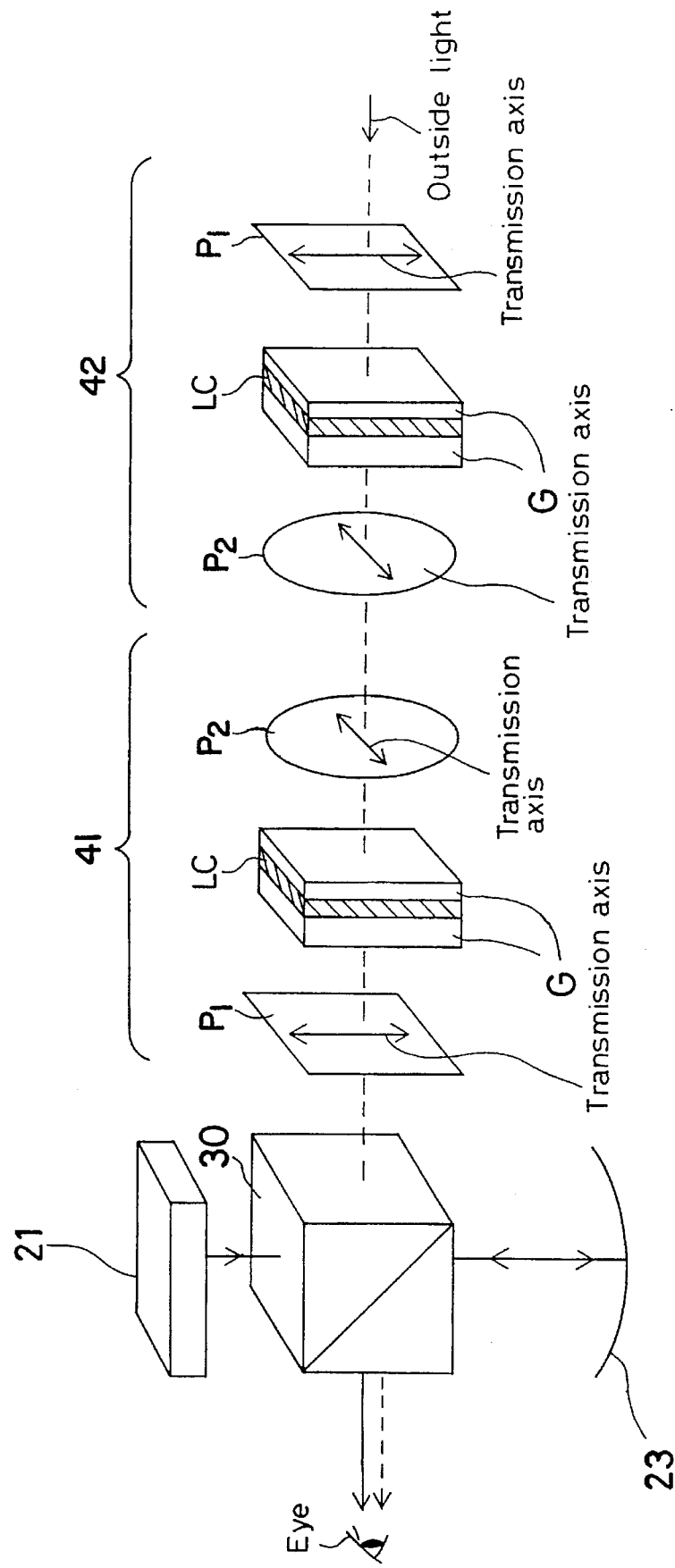
FIG. 29 is a perspective view showing the arrangement of twelfth embodiment of the present invention.
Figure 30:
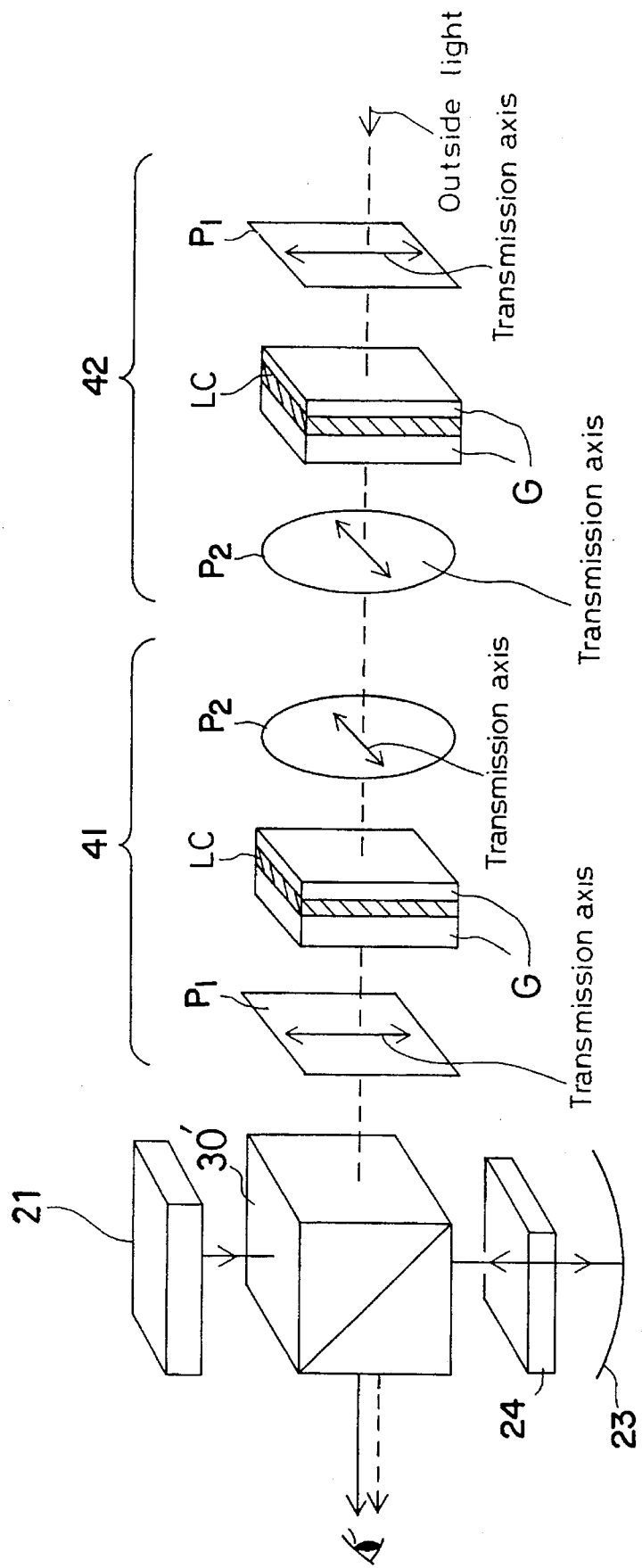
FIG. 30 is a perspective view showing the arrangement of a modification of the twelfth embodiment.
Figure 31:
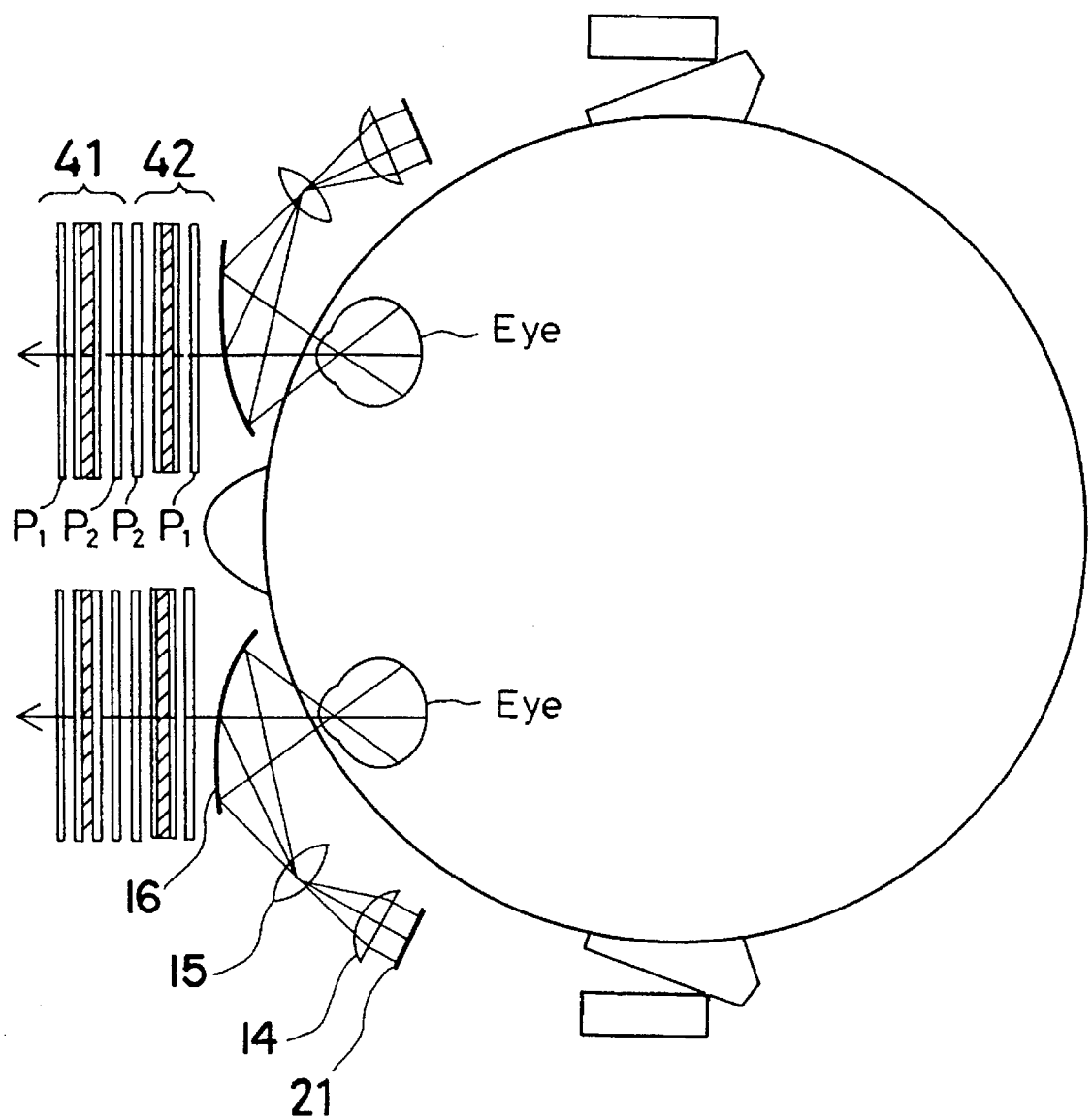
FIG. 31 is a sectional view showing the arrangement another modification of the twelfth embodiment.

Further, the optical system for viewing the electronic image as an enlarged image is not necessarily limited to those shown in FIGS. 29 and 30, but various other optical systems may be effectively used, as a matter of course. For example, an optical system such as that shown in the sectional view of FIG. 31 may also be used. That is, an image of a two-dimensional display device 21, which is disposed outside the visual field, is projected on the observer's eye as an enlarged image by a concave half-mirror 16, which is disposed in front of each of the observer's left and right eyes, through lenses 14 and 15. Liquid crystal shutters 41 and 42 which are similar to the above are disposed in front of the concave half-mirror 16. In this case, the transmission axis of each fixed polarizing plate $P_1$ may lie in any direction.

Figure 32:
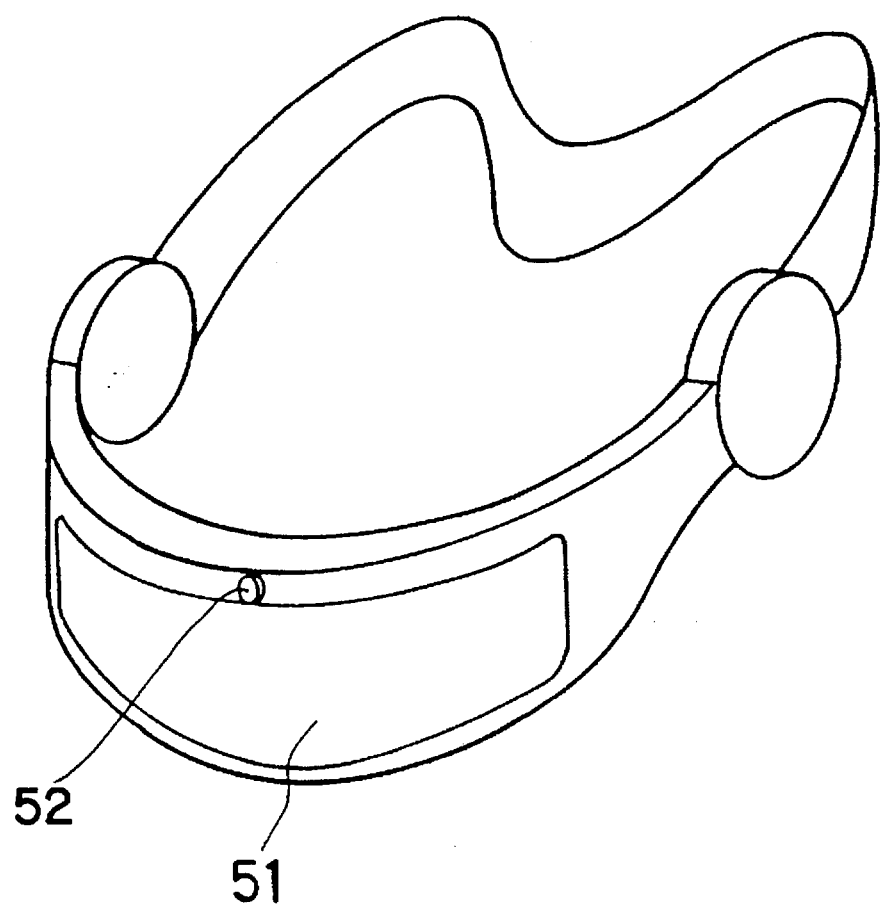
FIG. 32 shows the external appearance of a head-mounted display body in a thirteenth embodiment of the present invention.

Next, embodiment 13 of the present invention, which is a modification of the embodiment 12, will be explained. In this embodiment, the rotation of a rotatable polarizing plate is automatically made in accordance with the condition of brightness of the outside. As shown in FIG. 32, which shows the external appearance of this embodiment, a small-sized CCD camera 52 for monitoring the outside is provided in the center of the front surface of a head-mounted display body 51 according to this embodiment. The head-mounted display of this embodiment further has an image processing means for judging an outside image in front of the user, which is taken in by the CCD camera 52, as to whether an object of high luminance is present in front of the user or the whole outside is uniformly bright. As such an image processing means, it is possible to use, for example, a processing circuit which calculates a deviation of the output of each pixel of a CCD, and which judges that an object of high luminance is present when the deviation exceeds a predetermined threshold value, and judges that the whole outside is uniformly bright when the deviation is lower than the threshold value. If it is judged that an object of high luminance is present in front of the user as a result of the above-described image processing, the liquid crystal shutters 41 and 42, which are the same as those used in the embodiment 12, are brought into the condition of the positive type of liquid crystal shutter. If it is judged that the outside in front of the user is uniformly bright, the liquid crystal shutters 41 and 42 are brought into the condition of the negative type of liquid crystal shutter.

The following is a description of an embodiment of the head-mounted display according to the present invention, which is capable of displaying an electronic image independent of light from the outside at any desired position and in any desired range by using either a negative or positive type liquid crystal shutter as described above and which is small in size and light in weight and also comfortably mounted on the user's head.

Figure 33:
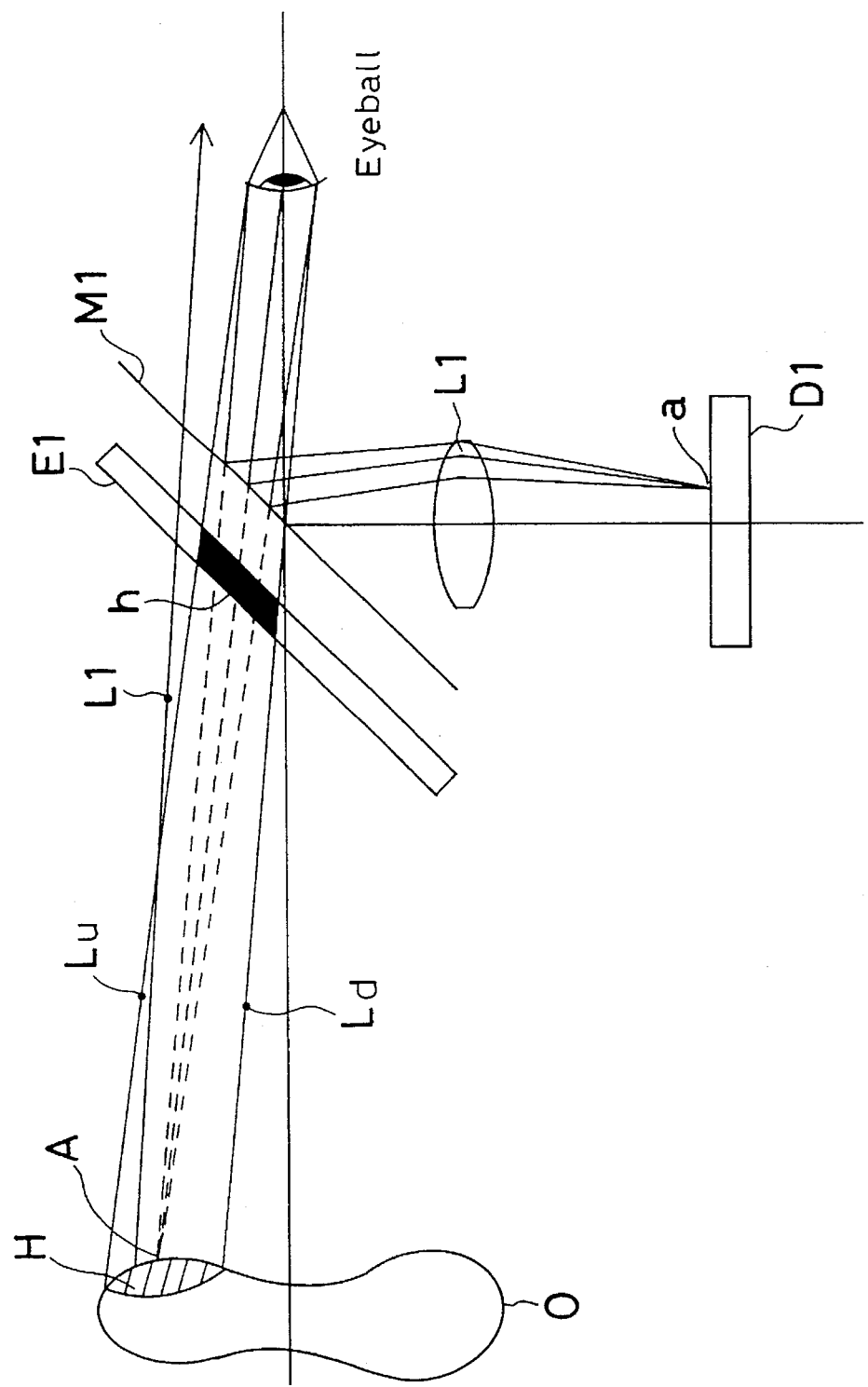
FIG. 33 shows a basic arrangement of a head-mounted display according to a fourteenth embodiment of the present invention.

FIG. 33 shows the basic arrangement of a head-mounted display according to embodiment 14 of the present invention. An electronic image displayed on a two-dimensional display device D1 is seen as if it were at the position of an outside image O by the action of an imaging lens L1 and a half-mirror M1. More specifically, an object that is displayed at a point a on the display device D1 is seen as if it were at a point A on the outside image O. A transmissive liquid crystal panel E1 is disposed immediately in front of the half-mirror M1. The liquid crystal panel E1 comprises either a negative or positive type liquid crystal shutter as described above and is designed to intercept light most efficiently at an angle of incidence made when it is disposed obliquely in parallel to the half-mirror M1, thereby intercepting light in the range h of the transmissive liquid crystal panel E1. Consequently, beams of light in between light rays Lu and Ld, e.g., a light beam L1, cannot enter the eyeball. Accordingly, the range H on the outside image O cannot be seen. In other words, an electronic image which is not affected by the outside light can be projected in the range H. If a dot-matrix liquid crystal panel is used as the transmissive liquid crystal panel E1, the range h in which light is intercepted can be changed in accordance with a change in the position where the electronic image is displayed. Although the boundary line of the light intercepting range looks blurred, there is no problem in practical application unless the range in which light is intercepted is made extremely narrow.

Thus, an electronic image which is not affected by the outside light can be displayed at any desired position by disposing the transmissive liquid crystal panel E1, which is capable of changing the light intercepting region as desired, in front of the half-mirror M1. In addition, a compact and lightweight head-mounted display can be obtained.

Figure 34:
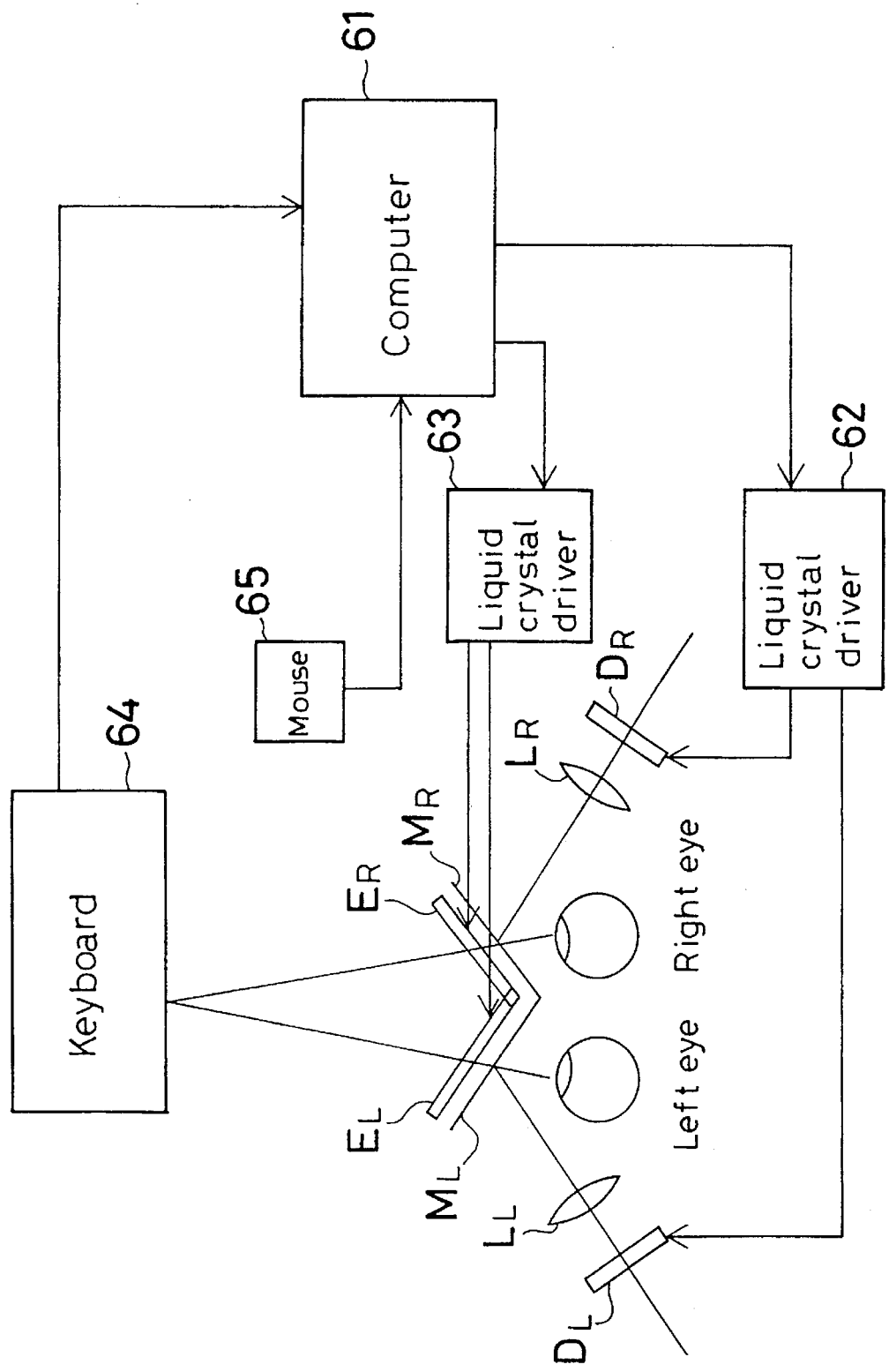
FIG. 34 shows the arrangement of a fifteenth embodiment of the present invention.

Next, embodiment 15 of the present invention will be explained with reference to FIG. 34. In this embodiment, the head-mounted display of the present invention is practically used as a display of office automation (OA) equipment, e.g., a computer, a word processor, etc. To input information on characters to a word processor or the like, a keyboard is used. However, considerable skill is needed to input character information without looking at the keyboard. Many of ordinary people input character information while looking at the keyboard. To cope with this problem, an image from a computer 61 is displayed on liquid crystal display devices $D_L$ and $D_R$ through a liquid crystal driver 62 in such a manner that the image is seen in the upper half of the visual field of the head-mounted display, and transmissive liquid crystal panels $E_L$ and $E_R$ are driven through another liquid crystal driver 63 so that the upper half of each liquid crystal panel is opaque, while the lower half thereof is transparent. In FIG. 34, reference symbols $M_L$ and $M_R$ denote half-mirrors, while $L_L$ and $L_R$ denote imaging lenses. The suffices L and R represent the left eye and the right eye, respectively. With this arrangement, the user can confirm the image from the computer 61 in the upper half of the visual field through the liquid crystal display devices $D_L$ and $D_R$ and, while doing so, he or she can input the required information while looking at the keyboard 64 through the lower half of each of the transmissive liquid crystal panels $E_L$ and $E_R$.

To input figures, a mouse 65 is generally used. Since the mouse 65 can be operated without looking at it, it is preferable to enlarge the display screen with a view to enabling the whole figure to be observed and to facilitating construction. In the case of inputting a figure, therefore, an image from the computer 61 is displayed on the whole surfaces of the liquid crystal display devices $D_L$ and $D_R$, and the lower halves of the transmissive liquid crystal panels $E_L$ and $E_R$ are also made opaque, thereby allowing the user to input a figure while looking at the image from the computer 61 that is projected on the whole visual field. Thus, it becomes easier to input a figure.

Transmission of signals from the computer 61 to the liquid crystal display devices $D_L$ and $D_R$ and the transmissive liquid crystal panels $E_L$ and $E_R$ may be made through wire, as shown in FIG. 34. However, if the signals are transmitted by radio, the user can do another work with the display mounted on his/her head. At this time, the transmissive liquid crystal panels $E_L$ and $E_R$ are wholly made transparent so that the outside can be clearly seen through them.

Thus, the head-mounted display of this embodiment can be used with the electronic and outside images being changed over from one to the other so that the display is convenient for each particular use.

The transmissive liquid crystal panels $E_L$ and $E_R$ may be dot-matrix liquid crystal panels. However, if a combination of a pair of upper and lower liquid crystal shutters is used as each transmissive liquid crystal panel, the arrangement of the driver circuit can be simplified. Further, the image from the computer 61 can be made easy to see by controlling the transmittance of the transparent portions of the transmissive liquid crystal panels $E_L$ and $E_R$ in accordance with the brightness in the outside.

Figure 35:
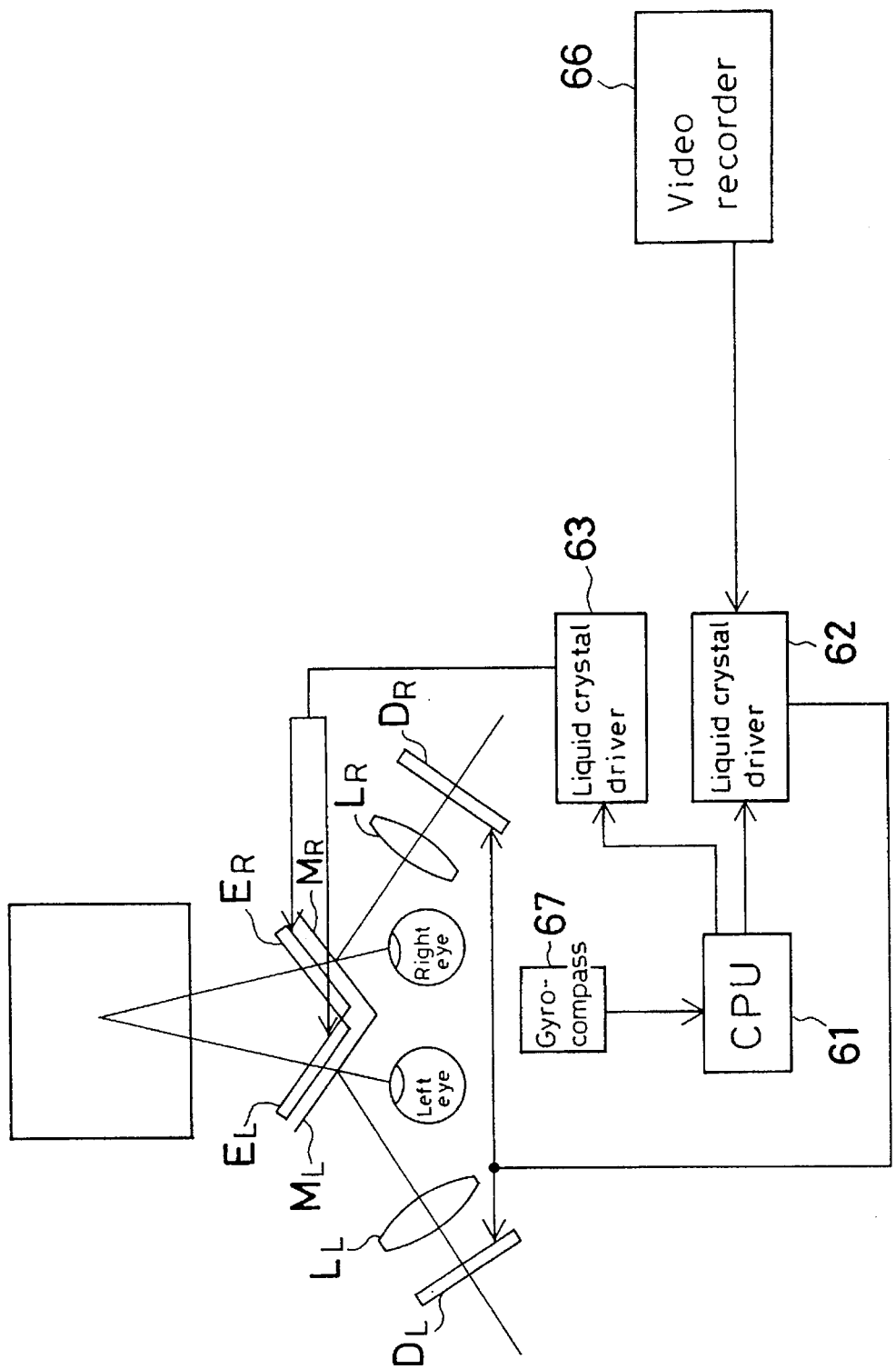
FIG. 35 shows the arrangement of a sixteenth embodiment of the present invention.
Figure 36A:
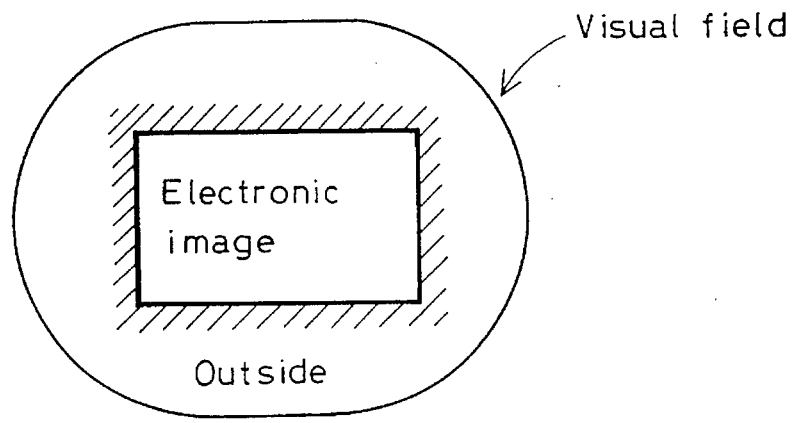
FIGS. 36(a)–36(e) show the way in which an electronic image and an outside image are seen in the visual field in the sixteenth embodiment.
Figure 36B:
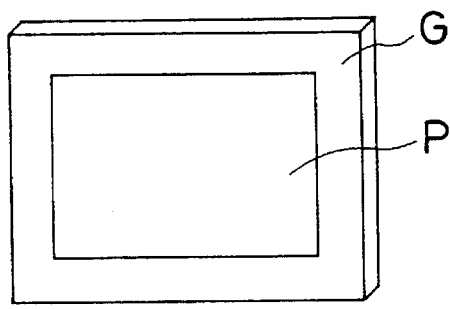
Figure 36D:
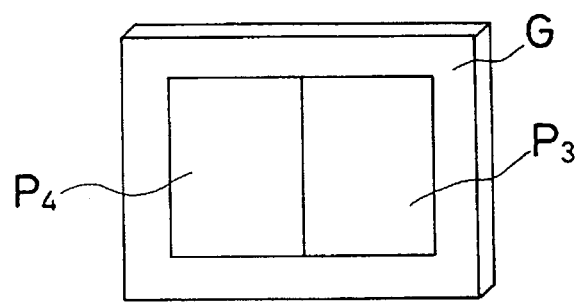
Figure 36C:
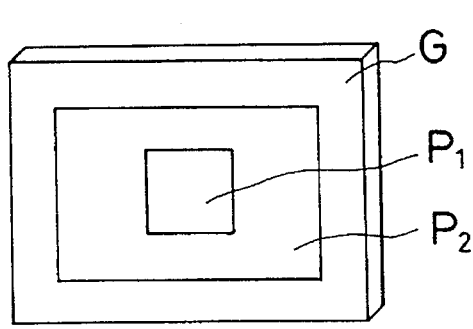
Figure 36E:
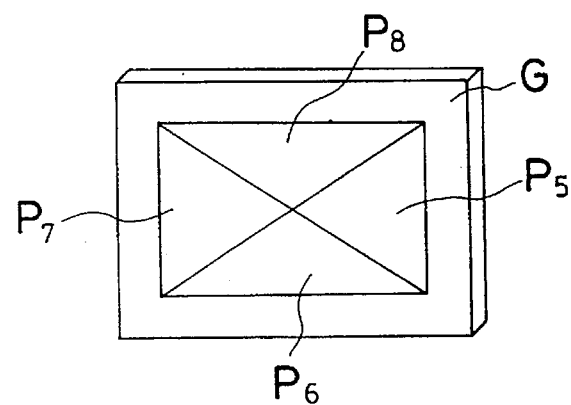

FIG. 35 shows embodiment 16 of the present invention. In this embodiment, the display of the present invention is applied to a monitor for a TV, a video system, etc. An image from a video recorder 66 is displayed on liquid crystal display devices $D_L$ and $D_R$ through a liquid crystal driver 62 so that the image is projected in the center of the visual field. In addition, the central portions of dot-matrix transmissive liquid crystal panels $E_L$ and $E_R$ are made opaque through a liquid crystal driver 63. Consequently, the electronic image from the video system is seen in the center of the visual field, while the outside is seen in the peripheral region of the visual field, as shown in FIG. 36(a). This arrangement will be explained below with reference to FIGS. 36(b) and 36(c). The liquid crystal shutter is arranged as shown in FIGS. 3(a) and 3(b), as has already been described in the embodiment 1. When the segment electrode comprises a single electrode, as shown in FIG. 36(b), the configuration of an outside light transmitting or screening region P that is formed by the segment electrode is determined by the configuration of the electrode. Accordingly, in the embodiment 16, segment electrodes are formed as a central region $P_1$ and a peripheral region $P_2$, as shown in FIG. 36(*c*). Consequently, there are two regions $P_1$ and $P_2$ which are made transparent or opaque by on-off controlling the power supply, as shown in FIG. 36(*c*). Thus, the region $P_1$ can be made opaque with the region $P_2$ made transparent to the outside light. The movement of the user's head with this display mounted thereon is measured by a gyrocompass 67, for example, and a CPU 61 moves image display positions on the liquid crystal display devices $D_L$ and $D_R$ and light-screening positions on the transmissive liquid crystal panels $E_L$ and $E_R$ in accordance with the signal from the gyrocompass 67, thereby enabling the image to be fixed even if the user's head moves. Accordingly, if the user turns his/her head right or left, the image completely disappears from the visual field, and the outside alone is seen. With this arrangement, the user can enjoy the same feeling as he or she would have when viewing an image projected on a screen hung on the wall. Thus, even if a dangerous situation occurs in the outside, i.e., the real world, the user can cope with it immediately. The way of dividing the region P is not necessarily limited to that shown in FIG. 36(*c*). For example, the region P may be divided as shown in FIGS. 36(*d*) and 36(*e*). In such a case, segment electrodes may be shaped as shown by reference symbols $P_3$, $P_4$, $P_5$, $P_6$, $P_7$ and $P_8$ in the same way as in FIG. 36(*c*).

Figure 37:
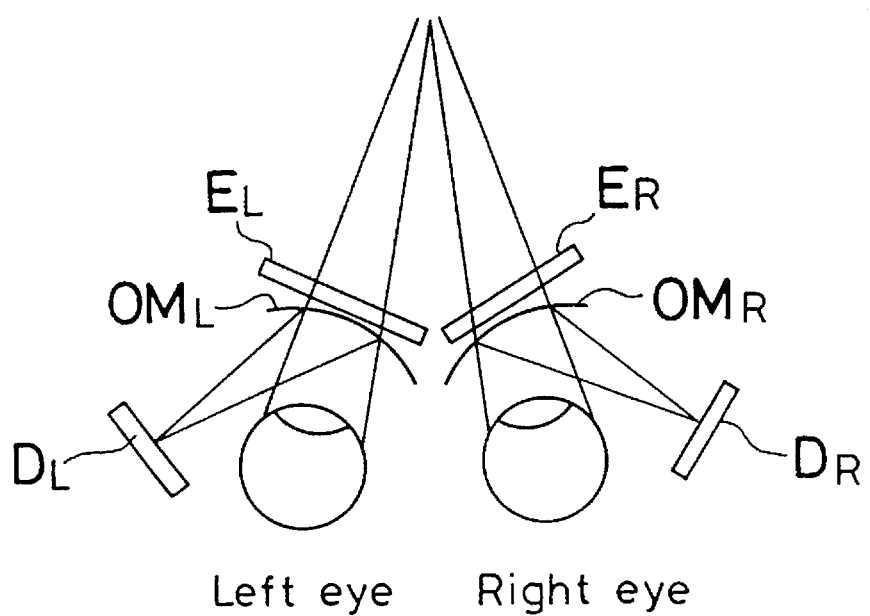
FIG. 37 shows essential parts in the arrangements of modifications of the sixteenth embodiment.

If the half-mirrors in the arrangement shown in FIG. 35 are replaced by concave mirrors $OM_L$ and $OM_R$ as shown in FIG. 37, no imaging lenses are needed. Accordingly, it is possible to further reduce the overall size and weight of the display.

The following is a description of an embodiment of the present invention, which uses thin glass substrates for a liquid crystal shutter in the above-described head-mounted see-through display to reduce the overall weight thereof and which is arranged to prevent breakage of the glass substrates by collision with a thing.

Figure 38:
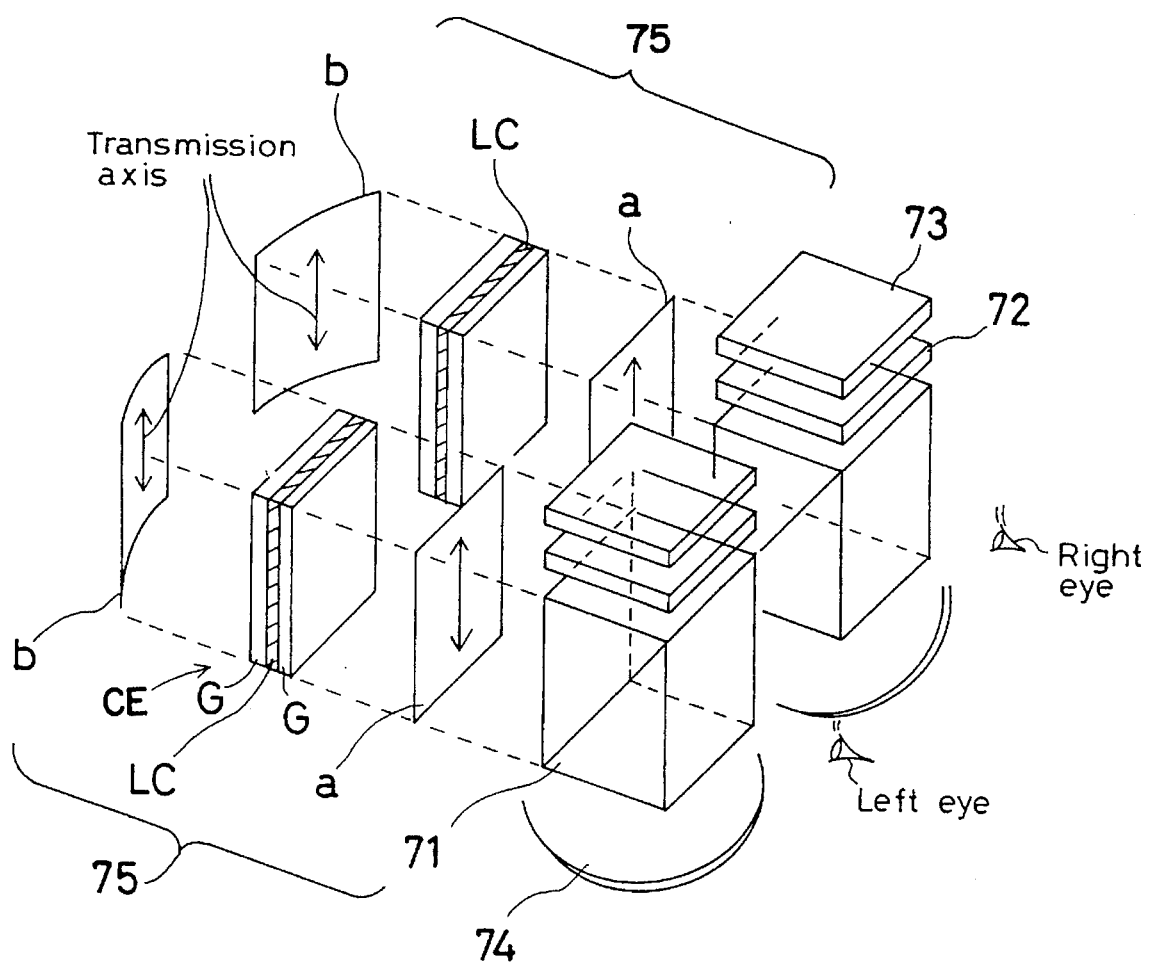
FIG. 38 is a perspective view showing the arrangement of a head-mounted display according to seventeenth embodiment of the present invention.

FIG. 38 is a perspective view of a head-mounted see-through display according to embodiment 17 which uses a single liquid crystal shutter. The display of this embodiment basically comprises a beam splitter (hereinafter referred to as "BS") 71 disposed in front of each of the observer's left and right eyes, a two-dimensional display unit including a liquid crystal display device (hereinafter referred to as "LCD") 72 disposed above the top of the BS 71 outside the visual field so as to extend substantially along the line of sight of each eye and a back light 73 disposed at the back of the LCD 72, a concave mirror 74 disposed to face the LCD 72 across the BS 71, and a liquid crystal shutter 75 (in the figure L and R represent left and right, respectively) disposed in front of the BS 71 forwardly thereof as viewed in the direction of the line of sight. In this arrangement, each eye sees an image of the LCD 72 through an optical path in which light from the LCD 72 is first transmitted by the BS 71 and reflected by the concave mirror 74 and then reflected by the BS 71. Since the concave mirror 74 is disposed in the optical path, an electronic image displayed by the LCD 72 can be viewed as an enlarged image.

When the electronic image alone is to be viewed, the liquid crystal shutter 75 is made opaque. On the other hand, when the outside image alone is to be viewed, the display of the electronic image by the LCD 72 is turned off, and the liquid crystal shutter 75 is made transparent. If the display of the electronic image is not turned off at this time, both the outside and electronic images can be observed simultaneously.

Incidentally, the left and right liquid crystal shutters 75 each comprise a polarizing sheet b, a liquid crystal cell CE, and a polarizing sheet a, which are disposed in the mentioned order from the outer side. In the arrangement shown in FIG. 38, each liquid crystal shutter 75 is of the negative type, in which the transmission axes of the polarizing sheets a and b are parallel to each other. The liquid crystal cell CE comprises a liquid crystal molecular layer LC which is sandwiched between a pair of glass substrates G. The polarizing sheet a is attached to the liquid crystal cell CE, whereas the polarizing sheet b is spaced apart from the liquid crystal cell CE.

Accordingly, even if a thing collides with the liquid crystal shutter unit 75, irrespective of whether the display is actually used or not, it comes into contact with the polarizing sheet b, causing the sheet b alone to be deformed, but it does not collide with either of the glass substrates G. Therefore, there is no likelihood of the glass substrates G being broken.

The polarizing sheet b, which originally has a planar configuration, may be attached as it is. However, it may also be bent in a curved configuration. If the polarizing sheet b is attached so as to be convex toward the outside, as shown in FIG. 38, even if it is deformed by collision with a thing, it is automatically restored to the previous state, advantageously. It should be noted that the two polarizing sheets b of the left and right liquid crystal shutter units (L) 75 and (R) 75 may be formed as a single continuous polarizing sheet.

Although in the arrangement shown in FIG. 38 each liquid crystal shutter 75 is a negative type liquid crystal shutter, as described above, a positive type liquid crystal shutter may also be used. In the case of a positive type liquid crystal shutter, the polarizing sheets a and b are disposed so that the transmission axes of these polarizing sheets are perpendicular to each other. In either case, once the transmission axis of the polarizing sheet a is determined, the transmission axis of the polarizing sheet b is naturally determined. The directions of the transmission axes of the polarizing sheets a and b are not necessarily limited to those shown in FIG. 38. The transmission axes may lie in any desired direction, provided that the relationship between the two transmission axes satisfies the requirement.

Figure 39:
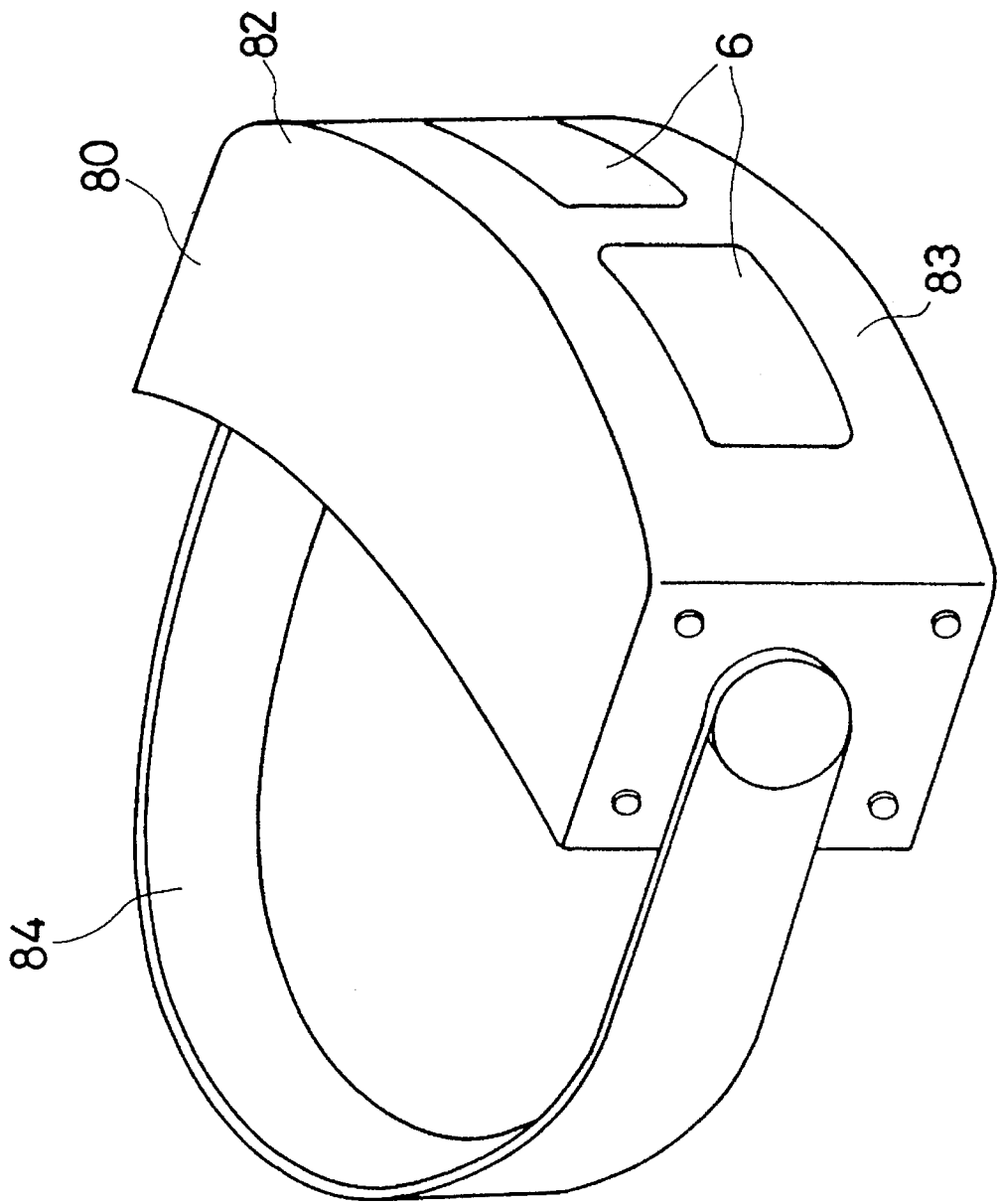
FIG. 39 is a perspective view of one example of a head-mounted display body.
Figure 40:
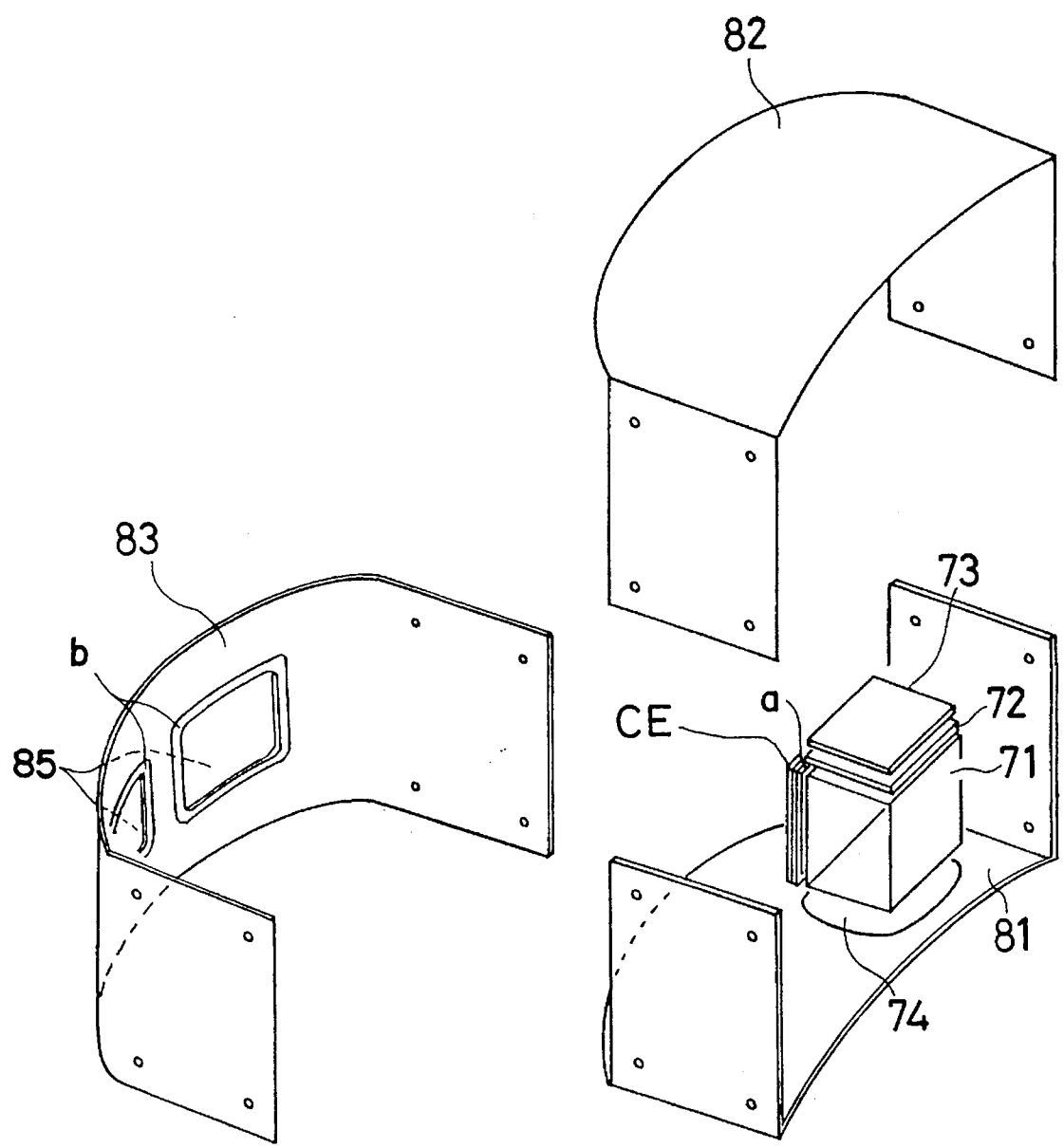
FIG. 40 is an exploded perspective view of the head-mounted display body shown in FIG. 39.

A method of attaching the polarizing sheet b to the head-mounted display body will be explained below. FIG. 39 is a perspective view of the head-mounted display body. FIG. 40 is an exploded perspective view of the head-mounted display body. The head-mounted display comprises a head-mounted display body 80, a head band 84 for supporting the body 80 on the observer's head, and a controller (not shown). The body 80 comprises a body substrate 81 for mounting the BS 71, the LCD 72, the back light 73, the polarizing sheet a and the liquid crystal cell CE, a top cover 82, and a front cover 83. The polarizing sheets b are attached to respective openings 85 provided in the front cover 83. The body substrate 81, the top cover 82 and the front cover 83 are assembled together to complete the body 80.

FIG. 41 shows examples of a method of attaching each polarizing sheet b to the opening 85. FIG. 41(*a*) shows an example in which the polarizing sheet b is bonded to the periphery of the opening 85 by using an adhesive 86. The adhesive 86 used in this example is preferably an adhesive material which is highly viscous even after it has become set. If such an adhesive material is used, the polarizing sheet b is not readily destroyed even if a thing collides with it. FIG. 41(*b*) shows an example in which the polarizing sheet b is inserted into a groove provided in the periphery of the opening 85. FIG. 41(*c*) shows an example in which the polarizing sheet b is fixed by using a polarizing sheet retainer 87 and screws 88. In this case, screw receiving holes in the polarizing sheet b preferably have a slightly larger diameter than the screw diameter. With this arrangement, even if a thing collides with the polarizing sheet b, the polarizing sheet b is not readily destroyed.

If the polarizing sheet b is attached by the method described in any of the above examples, even if a thing collides with the liquid crystal shutter, it comes into contact with the polarizing sheet b, causing the sheet b to be deformed. At this time, the impact force is applied to the polarizing sheet b or the periphery of the opening 85 in the front cover 83, but it is not applied to either of the glass substrates G. Therefore, the likelihood of the glass substrates G being broken is reduced.

FIG. 42 shows a modification of the method of attaching the polarizing sheet b. That is, in each of the examples shown in FIG. 41, the polarizing sheet b may be attached to the front cover 83, together with a transparent plate 89, e.g., a transparent plastic plate, a thin tempered glass plate, etc. By doing so, the polarizing sheet b can be protected from damage or deformation.

Figure 43:
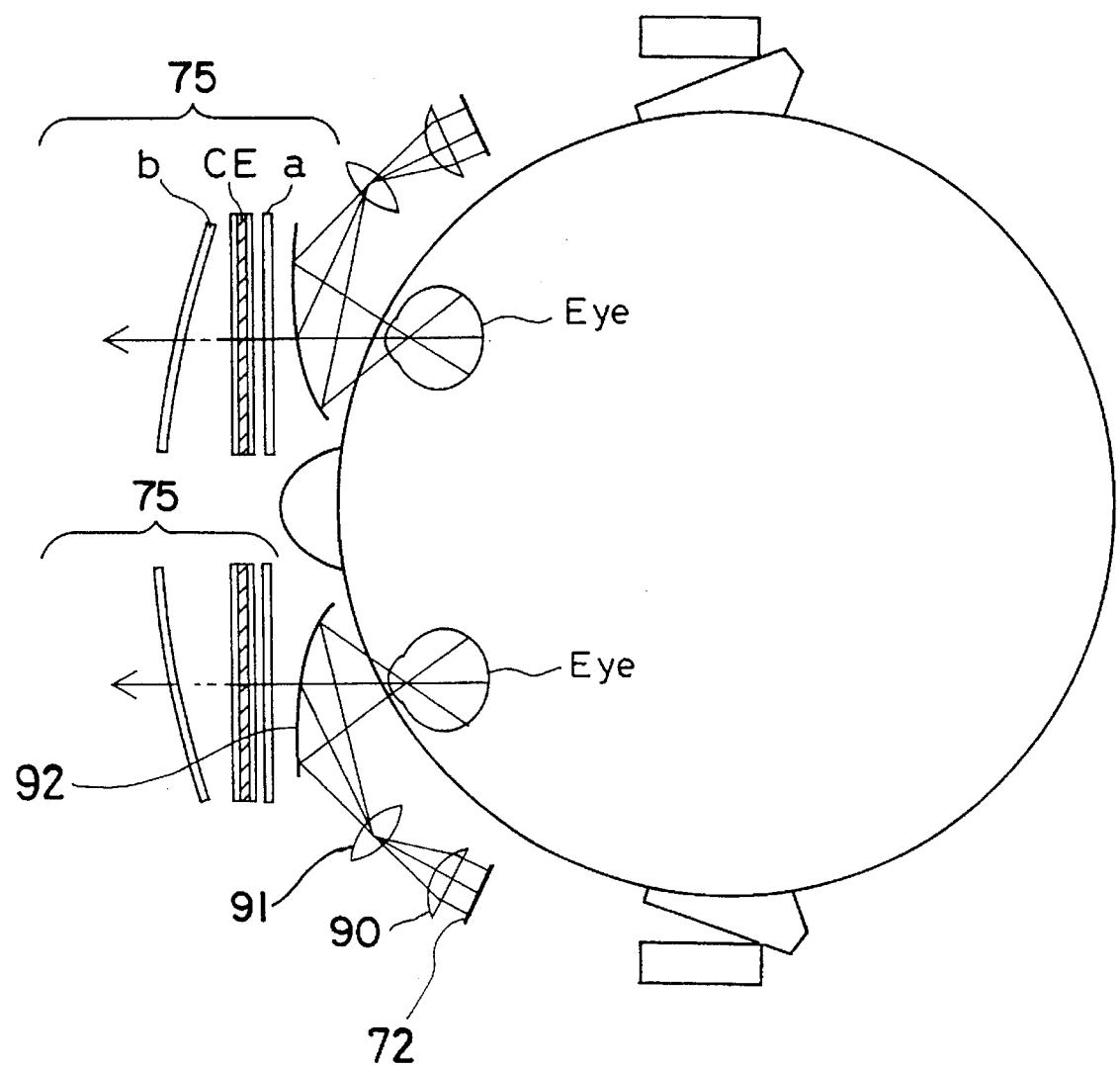
FIG. 43 is a sectional view showing the arrangement of a modification of the seventeenth embodiment.

Further, the optical system for viewing the electronic image as an enlarged image is not necessarily limited to that shown in FIG. 38, but various other optical systems may be effectively used, as a matter of course. For example, an optical system such as that shown in the sectional view of FIG. 43 may also be used. That is, an image of an LCD 72, which is disposed outside the visual field, is projected on the observer's eye as an enlarged image by a concave half-mirror 92, which is disposed in front of each of the observer's left and right eyes, through lenses 90 and 91. A liquid crystal shutter 75 which is similar to the above is disposed in front of the concave half-mirror 92. In this case, the transmission axis of the polarizing sheet a may lie in any direction. In this case also, the two polarizing sheets b of the left and right liquid crystal shutter units (L) 75 and (R) 75 may be formed as a single continuous polarizing sheet.

Although the visual display of the present invention has been described by way of various embodiments in which it is applied to a head-mounted see-through display, it should be noted that the present invention is not necessarily limited to these embodiments and that various changes and modifications may be imparted thereto.

What we claim is:

1. A display apparatus adapted to be mounted on an individual's head and including a device for displaying an image, an ocular optical system for projecting the image displayed by said image display device towards at least one eye of the individual, and a liquid crystal shutter unit for selectively transmitting and intercepting an outside image in its path toward the observer's eye to enable said outside image to be selectively observed, wherein the improvement comprises said liquid crystal shutter unit having at least two liquid crystal shutters, each including two polarizing plates and a liquid crystal molecular layer provided therebetween, and each having a viewing angle direction defined by a direction in which a highest degree of viewing contrast is obtained, said at least two liquid crystal shutters being stacked one on top of another such that the viewing angle direction of one of said at least two liquid crystal shutters and the viewing angle direction of another of said at least two liquid crystal shutters are rotated relative to each other through approximately 180° in respective planes of said liquid crystal shutters so as to be opposite to each other.

2. A display apparatus according to claim 1, wherein said two liquid crystal shutters are arranged so that transmission axes of the polarizing plates which face each other are approximately parallel to each other.

3. A display apparatus according to claim 1, wherein the liquid crystal molecular layers of said two liquid crystal shutter have the same twist direction.

4. A display apparatus according to claim 1,
   wherein two of said liquid crystal shutters together comprise two polarizing plates, two liquid crystal molecular layers provided between said polarizing plates, and one polarizing plate provided between said liquid crystal molecular layers.

5. A display apparatus according to claim 1, wherein said liquid crystal shutter unit is arranged such that, when said liquid crystal shutter unit intercepts light, central and peripheral regions of said liquid crystal shutter unit maintain a substantially uniform opacity.

6. A display apparatus according to claim 1, wherein said liquid crystal shutter unit has a left liquid crystal shutter region which defines a single region that allows light from the outside world to enter a visual field in front of an observer's left eye, and has a right liquid crystal shutter region which is disposed in side-by-side relation to said left liquid crystal shutter region and defines a single region that allows light from the outside world to enter a visual field in front of an observer's right eye.

7. A display apparatus according to claim 5, wherein said liquid crystal shutter unit has a left liquid crystal shutter region which defines a single region that allows light from the outside world to enter a visual field in front of an observer's left eye, and has a right liquid crystal shutter region which is disposed in side-by-side relation to said left liquid crystal shutter region and defines a single region that allows light from the outside world to enter a visual field in front of an observer's right eye.

8. A display apparatus according to claim 1, wherein said liquid crystal shutter unit is constructed arranged such that when no voltage is applied to said liquid crystal shutter unit, an observer's field of view of the outside world is obstructed by a dark image and the image displayed by said image display device is superimposed upon said dark image.

9. A display apparatus according to claim 5, wherein said liquid crystal shutter unit is constructed arranged such that when no voltage is applied to said liquid crystal shutter unit, an observer's field of view of the outside world is obstructed by a dark image and the image displayed by said image display device is superimposed upon said dark image.

\* \* \* \* \*

UNITED STATES PATENT AND TRADEMARK OFFICE
CERTIFICATE OF CORRECTION

PATENT NO.      : 5,572,343

DATED           : November 5, 1996

INVENTOR(S)     : Okamura, et al.

It is certified that error appears in the above-identified patent and that said Letters Patent is hereby corrected as shown below:

On the title page, item [75] should read as follows:

[75] Inventor: Akiyoshi Tochigi, Tokyo, Japan

Please delete: "Toshiro Okamara, Seiichior Tabata, Naoto Shimnada, Keiichi Kuba, Masato Yasugaki, Yoichi Ibo, all of Tokyo, Japan."

Item [19] should read:

-- Tochigi --.

Signed and Sealed this

First Day of December, 1998

Attest:

BRUCE LEHMAN

*Attesting Officer*         *Commissioner of Patents and Trademarks*